US012669659B2

(12) United States Patent
Kim et al.

(10) Patent No.: US 12,669,659 B2
(45) Date of Patent: Jun. 30, 2026

(54) OPTICAL PACKAGING USING EMBEDDED-IN-MOLD (EIM) OPTICAL MODULE INTEGRATION

(71) Applicant: Intel Corporation, Santa Clara, CA (US)

(72) Inventors: Dowon Kim, Singapore (SG); Suohai Mei, Sunnyvale, CA (US); Pooya Tadayon, Portland, OR (US); Jason Michael Gamba, Gilbert, AZ (US); Sanka Ganesan, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 426 days.

(21) Appl. No.: 17/561,818

(22) Filed: Dec. 24, 2021

(65) Prior Publication Data

US 2023/0204879 A1     Jun. 29, 2023

(51) Int. Cl.
   *G02B 6/42* (2006.01)
(52) U.S. Cl.
   CPC ......... *G02B 6/4214* (2013.01); *G02B 6/4245* (2013.01); *G02B 6/4255* (2013.01)
(58) Field of Classification Search
   CPC .. G02B 6/4214; G02B 6/4245; G02B 6/4255; G02B 6/30; G02B 6/423; G02B 6/428; G02B 6/4249; G02B 6/4292
   See application file for complete search history.

(56) References Cited

U.S. PATENT DOCUMENTS

| | | | |
|---|---|---|---|
| 9,389,362 | B1 | 7/2016 | Brunschwiler et al. |
| 10,852,476 | B2 * | 12/2020 | Chen .................... G02B 6/1228 |
| 2017/0123173 | A1 | 5/2017 | Ji et al. |
| 2019/0137706 | A1 | 5/2019 | Xie |
| 2020/0271860 | A1 | 8/2020 | Chen et al. |
| 2020/0310052 | A1 | 10/2020 | Lim et al. |
| 2020/0393619 | A1 | 12/2020 | Mahalingam et al. |
| 2021/0132650 | A1 | 5/2021 | Lin et al. |
| 2021/0223489 | A1 | 7/2021 | Weng et al. |
| 2021/0286140 | A1 | 9/2021 | Winzer |

FOREIGN PATENT DOCUMENTS

| | | |
|---|---|---|
| EP | 4202516 A1 | 6/2023 |
| KR | 20170051140 A | 5/2017 |

OTHER PUBLICATIONS

PCT International Search Report and Written Opinion issued in PCT/US2022/051010, dated Apr. 3, 2023; 11 pages.
EPO; Extended European Search Report issued in EP Patent Application No. 22912256.9, dated Oct. 7, 2025; 10 pages.

* cited by examiner

*Primary Examiner* — John Bedtelyon
(74) *Attorney, Agent, or Firm* — Alliance IP, LLC

(57)     ABSTRACT

In one embodiment, an optical module includes an electronic integrated circuit, a photonic integrated circuit, and a pluggable optical coupling connector. The photonic integrated circuit sends or receives optical signals. The pluggable optical coupling connector is adjacent to the photonic integrated circuit and includes a pluggable interface to optically couple a fiber array to the photonic integrated circuit. Further, the electronic integrated circuit, the photonic integrated circuit, and the pluggable optical coupling connector are all embedded in a mold.

18 Claims, 46 Drawing Sheets

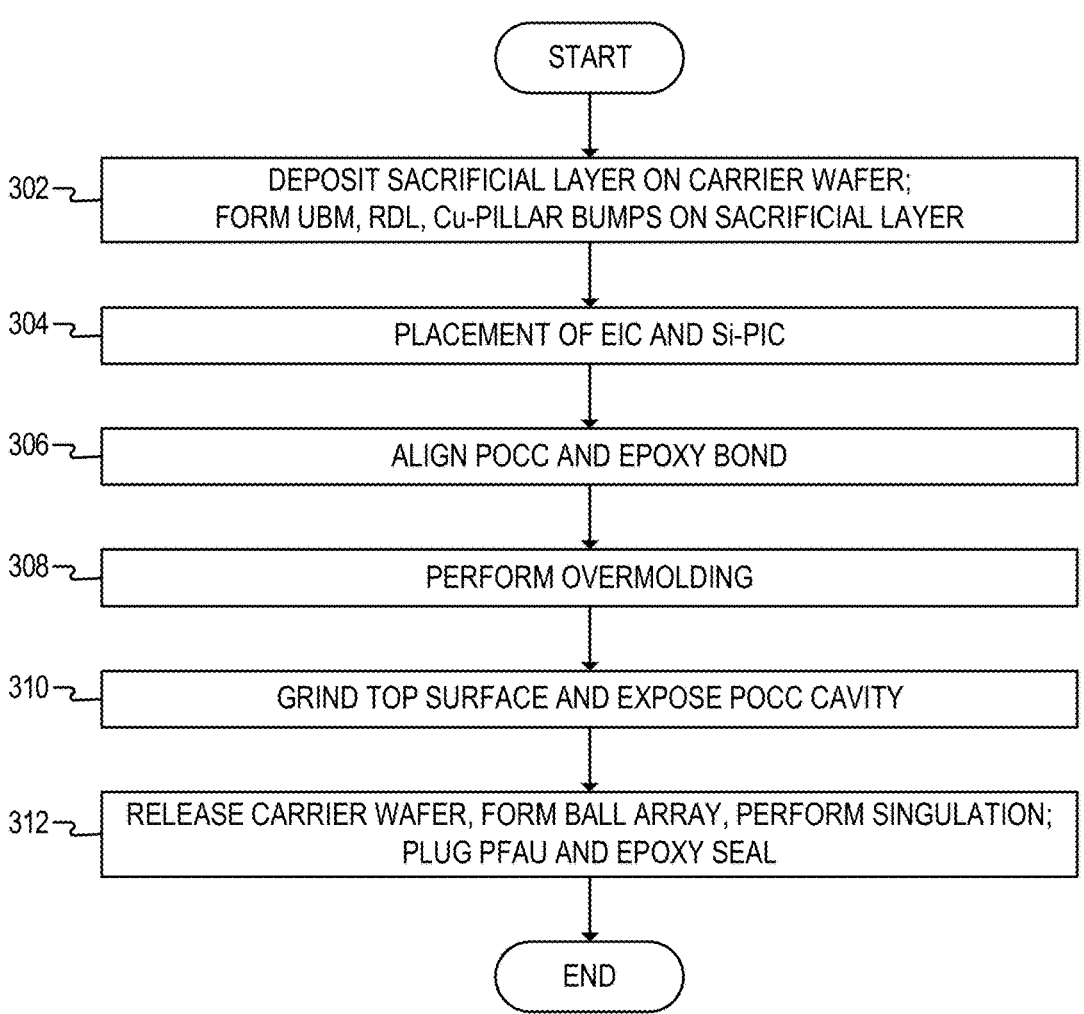
300
START
302 — DEPOSIT SACRIFICIAL LAYER ON CARRIER WAFER;
FORM UBM, RDL, Cu-PILLAR BUMPS ON SACRIFICIAL LAYER
304 — PLACEMENT OF EIC AND Si-PIC
306 — ALIGN POCC AND EPOXY BOND
308 — PERFORM OVERMOLDING
310 — GRIND TOP SURFACE AND EXPOSE POCC CAVITY
312 — RELEASE CARRIER WAFER, FORM BALL ARRAY, PERFORM SINGULATION;
PLUG PFAU AND EPOXY SEAL
END
FIG. 3

700

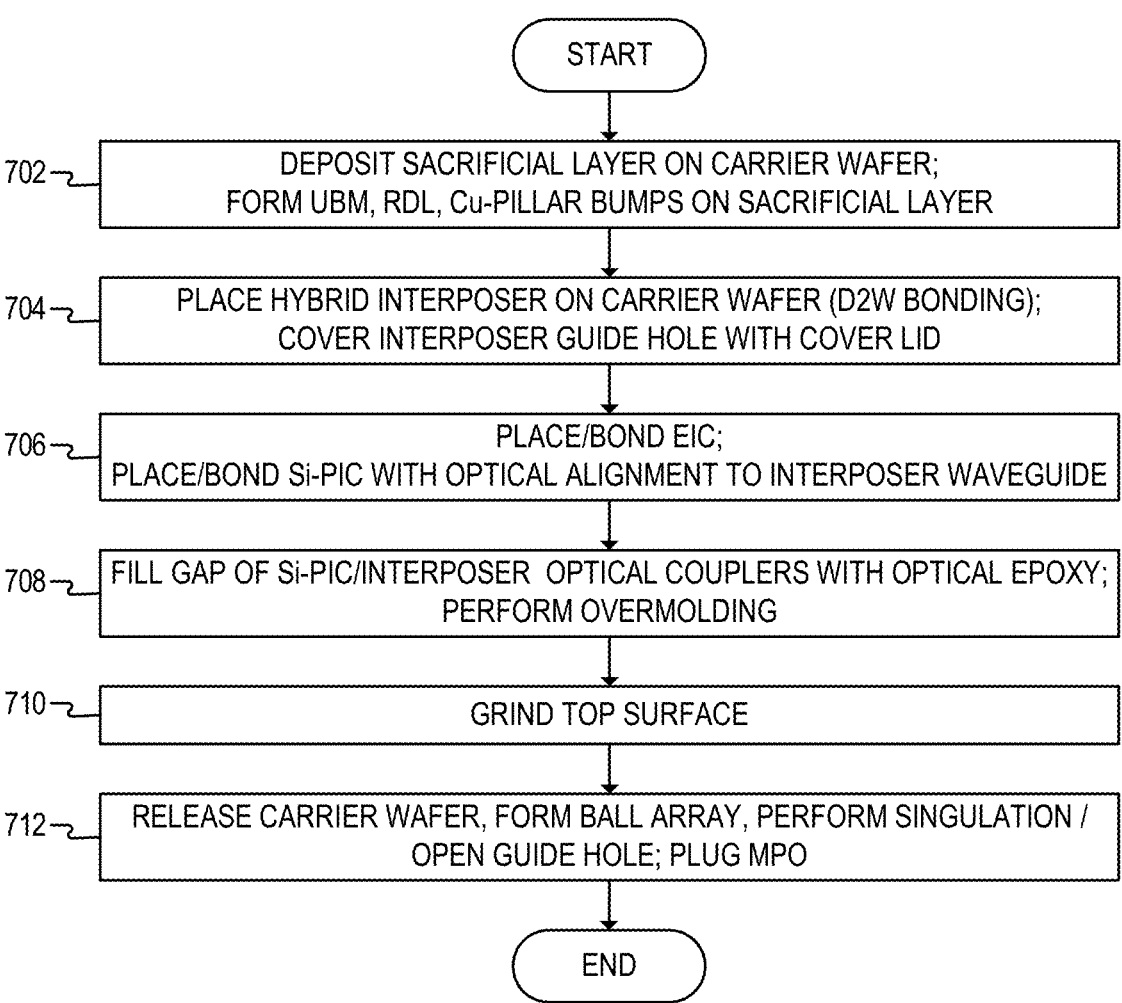

START

702 — DEPOSIT SACRIFICIAL LAYER ON CARRIER WAFER;
FORM UBM, RDL, Cu-PILLAR BUMPS ON SACRIFICIAL LAYER

704 — PLACE HYBRID INTERPOSER ON CARRIER WAFER (D2W BONDING);
COVER INTERPOSER GUIDE HOLE WITH COVER LID

706 — PLACE/BOND EIC;
PLACE/BOND Si-PIC WITH OPTICAL ALIGNMENT TO INTERPOSER WAVEGUIDE

708 — FILL GAP OF Si-PIC/INTERPOSER  OPTICAL COUPLERS WITH OPTICAL EPOXY;
PERFORM OVERMOLDING

710 — GRIND TOP SURFACE

712 — RELEASE CARRIER WAFER, FORM BALL ARRAY, PERFORM SINGULATION /
OPEN GUIDE HOLE; PLUG MPO

END

POCC
120

123
FUDICIALS
122
COLLIMATION LENS

122
COLLIMATION LENS
125
ANGLED TIR MIRROR

POCC
120

TOP COVER LID
126

ISOLATOR 133    FIBER ARRAY 138 IN V-GROOVES 134

PFAU

REFOCUSING LENS 132

130

ANGLED TIR MIRROR
135

132
REFOCUSING LENS

PFAU
130

POCC
120

1400

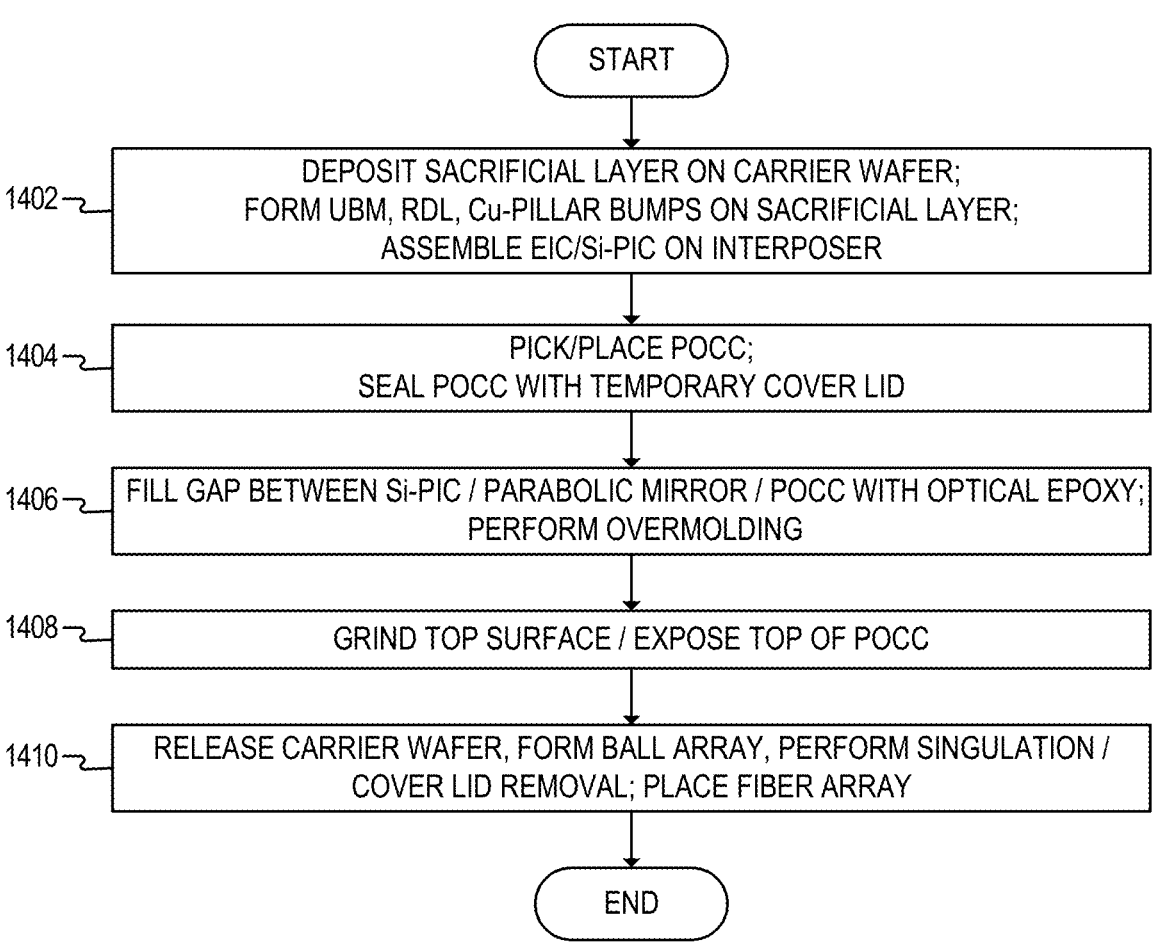

START

1402 — DEPOSIT SACRIFICIAL LAYER ON CARRIER WAFER;
FORM UBM, RDL, Cu-PILLAR BUMPS ON SACRIFICIAL LAYER;
ASSEMBLE EIC/Si-PIC ON INTERPOSER

1404 — PICK/PLACE POCC;
SEAL POCC WITH TEMPORARY COVER LID

1406 — FILL GAP BETWEEN Si-PIC / PARABOLIC MIRROR / POCC WITH OPTICAL EPOXY;
PERFORM OVERMOLDING

1408 — GRIND TOP SURFACE / EXPOSE TOP OF POCC

1410 — RELEASE CARRIER WAFER, FORM BALL ARRAY, PERFORM SINGULATION /
COVER LID REMOVAL; PLACE FIBER ARRAY

END

START

2002 — PLACE Si-PIC ON CARRIER WAFER

2004 — FLIP-CHIP BONDING OF EIC ON Si-PIC; ALIGN/BOND POCC ON Si-PIC

2006 — PERFORM OVERMOLDING

2008 — DEBOND CARRIER WAFER

2010 — EXPOSE TSV BY THINNING

2012 — GRIND MOLD / EXPOSE POCC CAVITY

2014 — FORM UBM, RDL, Cu-PILLAR BUMPS

2016 — PERFORM SINGULATION

END

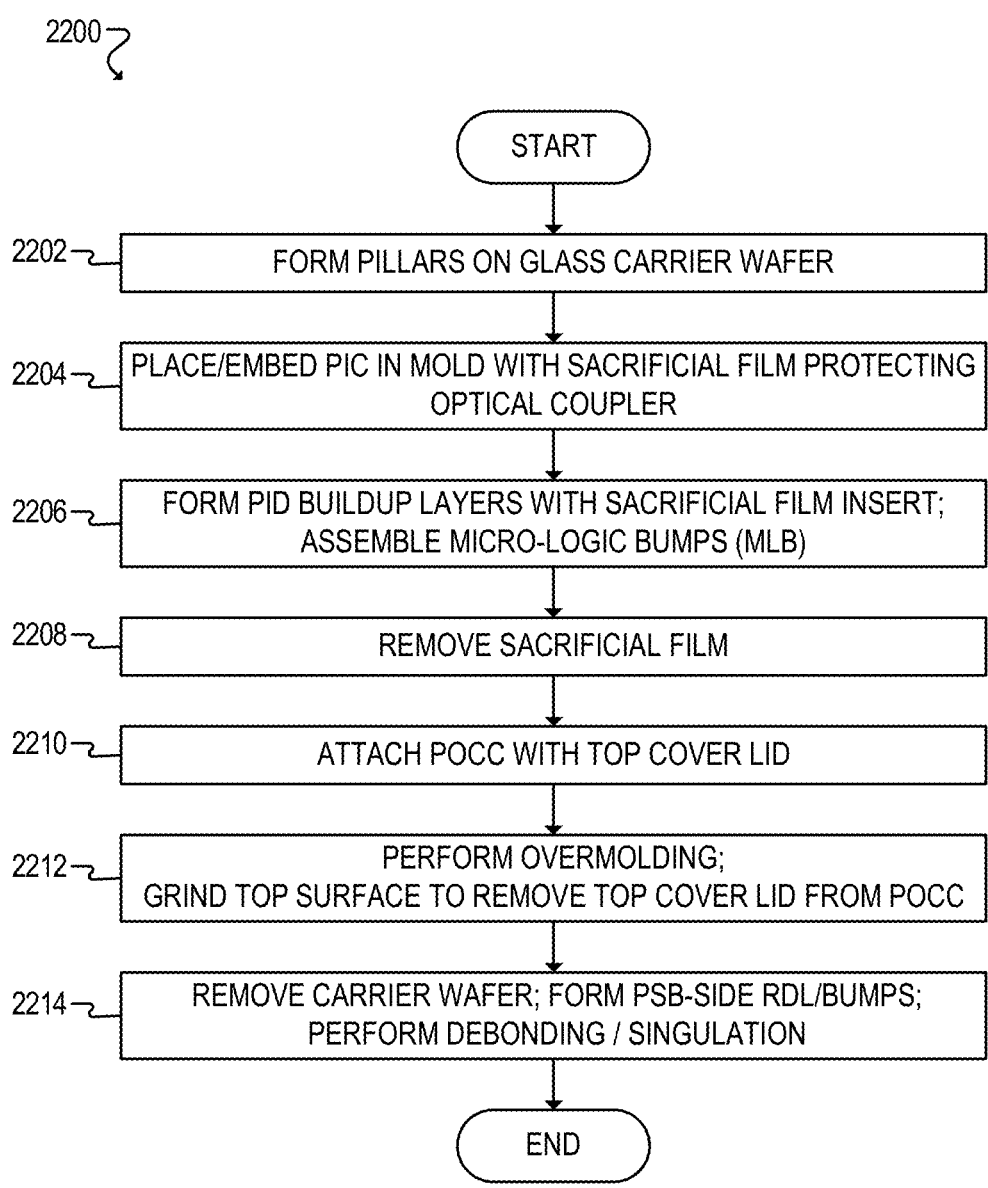

2200

START

2202 — FORM PILLARS ON GLASS CARRIER WAFER

2204 — PLACE/EMBED PIC IN MOLD WITH SACRIFICIAL FILM PROTECTING OPTICAL COUPLER

2206 — FORM PID BUILDUP LAYERS WITH SACRIFICIAL FILM INSERT; ASSEMBLE MICRO-LOGIC BUMPS (MLB)

2208 — REMOVE SACRIFICIAL FILM

2210 — ATTACH POCC WITH TOP COVER LID

2212 — PERFORM OVERMOLDING; GRIND TOP SURFACE TO REMOVE TOP COVER LID FROM POCC

2214 — REMOVE CARRIER WAFER; FORM PSB-SIDE RDL/BUMPS; PERFORM DEBONDING / SINGULATION

END

FIG. 22

PILLAR
109

BUMPS
105

SACRIFICIAL
LAYER
103

101
CARRIER
WAFER

PILLAR
109

MOLD
102

SACRIFICIAL
LAYER
103

101
CARRIER
WAFER

COUPLER
111

PROTECTION FILM
103

108
EIC

Si-PIC
110

PID
BUILDUP
LAYER

BUMPS
105

140

SACRIFICIAL
LAYER
103

MOLD
102

101
CARRIER
WAFER

2400

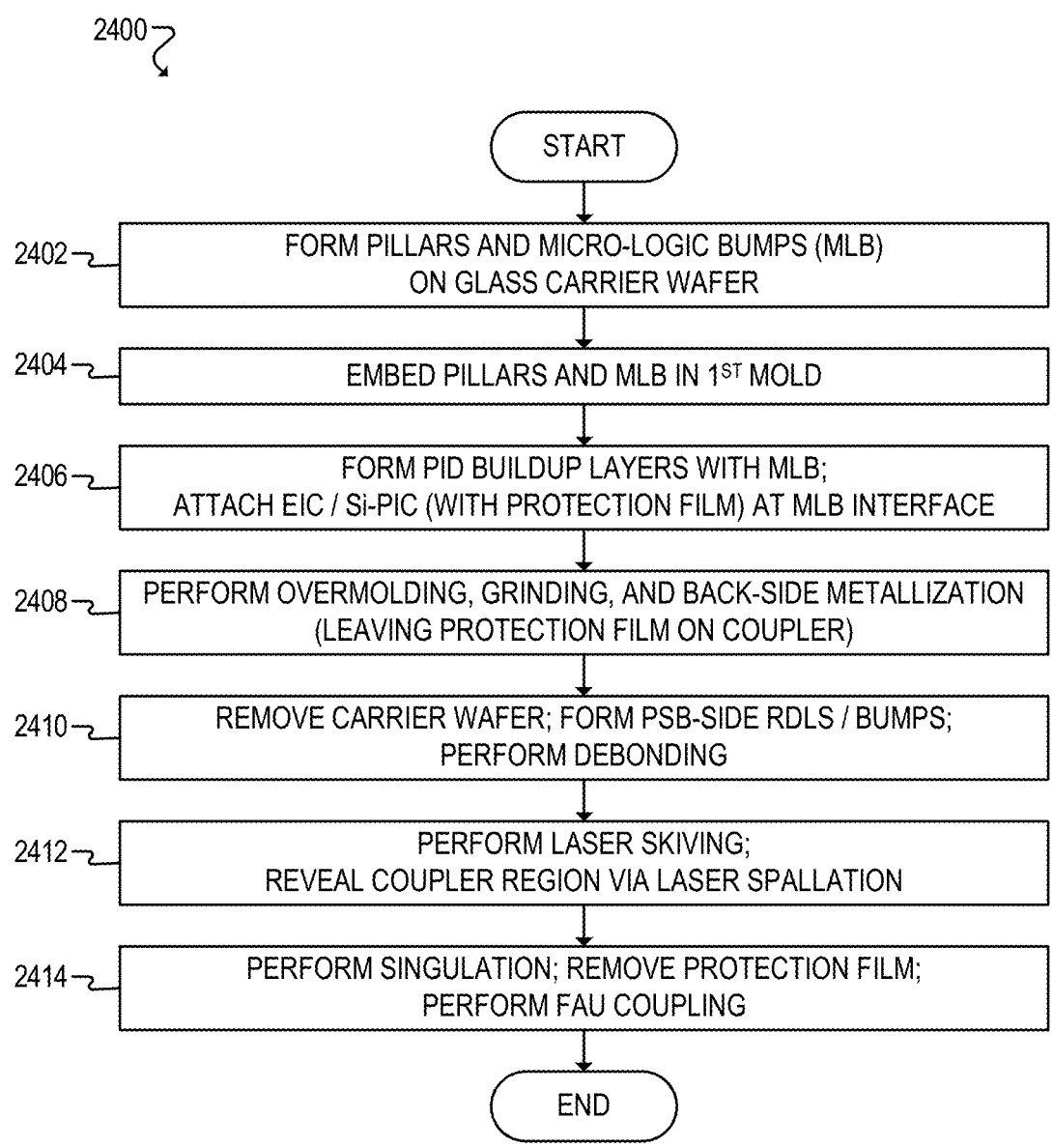

START

2402 — FORM PILLARS AND MICRO-LOGIC BUMPS (MLB)
ON GLASS CARRIER WAFER

2404 — EMBED PILLARS AND MLB IN 1ST MOLD

2406 — FORM PID BUILDUP LAYERS WITH MLB;
ATTACH EIC / Si-PIC (WITH PROTECTION FILM) AT MLB INTERFACE

2408 — PERFORM OVERMOLDING, GRINDING, AND BACK-SIDE METALLIZATION
(LEAVING PROTECTION FILM ON COUPLER)

2410 — REMOVE CARRIER WAFER; FORM PSB-SIDE RDLS / BUMPS;
PERFORM DEBONDING

2412 — PERFORM LASER SKIVING;
REVEAL COUPLER REGION VIA LASER SPALLATION

2414 — PERFORM SINGULATION; REMOVE PROTECTION FILM;
PERFORM FAU COUPLING

END

PROCESSOR UNIT
2602

COMMUNICATION COMPONENT
2612

MEMORY
2604

BATTERY/POWER
2614

DISPLAY DEVICE
2606

GNSS DEVICE
2618

AUDIO OUTPUT DEVICE
2608

AUDIO INPUT DEVICE
2624

OTHER OUTPUT DEVICE(S)
2610

OTHER INPUT DEVICE(S)
2620

ANTENNA 2622

OPTICAL PACKAGING USING EMBEDDED-IN-MOLD (EIM) OPTICAL MODULE INTEGRATION

BACKGROUND

As the data rate demands in datacenters continuously increase to accommodate the significant increases in end-user mobile data usage, development of high-performance optical modules and systems is crucial to meet these demands. As silicon photonics solutions have started going into the market, however, optical packaging has become a significant hurdle, as it drives a relatively large portion of the product cost due to various shortcomings of current optical packaging approaches.

BRIEF DESCRIPTION OF THE DRAWINGS

FIG. 3 illustrates an example process flow for the optical packaging process of FIGS. 2A-F.

FIG. 7 illustrates an example process flow for the optical packaging process of FIGS. 6A-F.

FIG. 14 illustrates an example process flow for the optical packaging process of FIGS. 13A-E.

FIG. 22 illustrates an example process flow for the optical packaging process of FIGS. 21A-G.

FIG. 24 illustrates an example process flow for the optical packaging process of FIGS. 23A-G.

DETAILED DESCRIPTION

Figure 1:
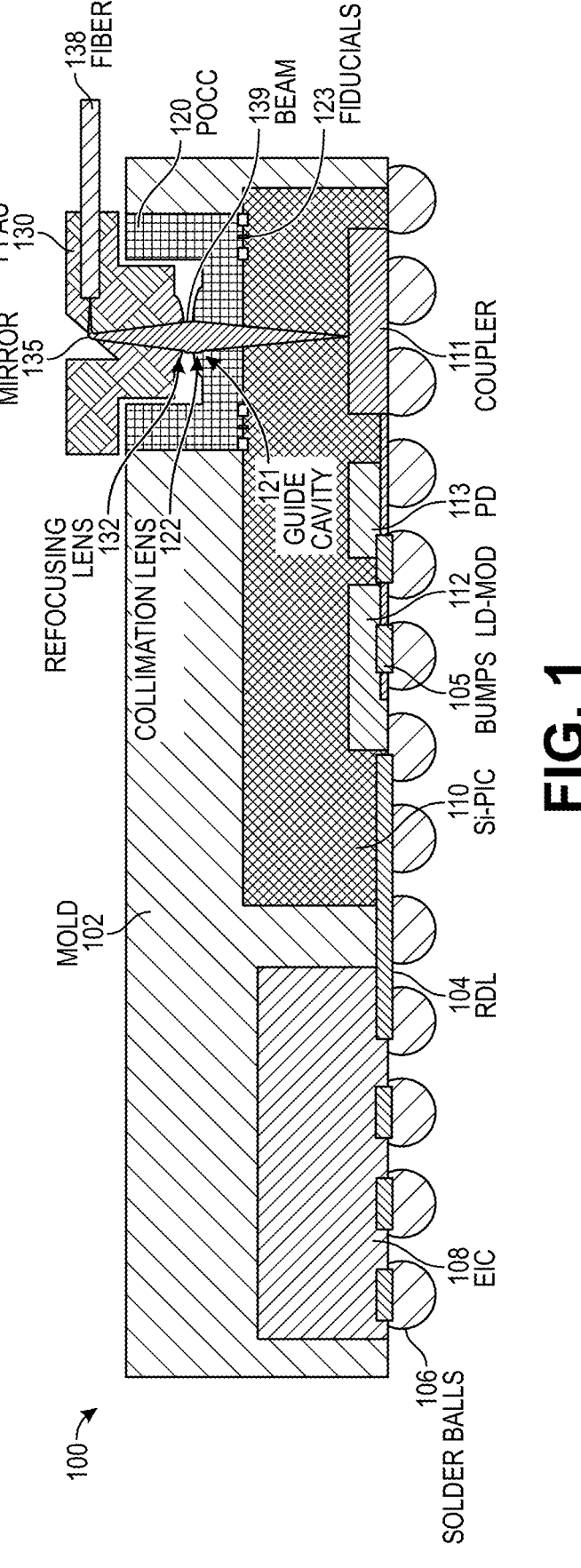
FIG. 1 illustrates an example embodiment of an optical module with embedded-in-mold (EIM) optical packaging that redirects an optical beam to/from the back-side of a silicon photonics integrated circuit (Si-PIC).

An optical module typically refers to an optical transceiver used for high-bandwidth data communication. For example, an optical module may include an electrical interface to communicate with a host computing device or system, along with an optical interface to communicate externally via a fiber optic cable. In this manner, an optical module functions as a photoelectric converter, which converts electrical signals into light and vice versa. Typically, an optical module includes a photonic integrated circuit (PIC) and an electronic integrated circuit (EIC). The PIC may include various components for providing photonic functions (e.g., optical transmissions), such as optical modulators, photodetectors, and fiber couplers. Moreover, the EIC may include various components to control or interface with the PIC, such as drivers and amplifiers.

As the data rate demands in datacenters continuously increase to accommodate the significant increases in end-user mobile data usage, development of high-performance optical modules and systems is crucial to meet these demands. As silicon photonics solutions have started going into the market, however, optical packaging has become a big challenge, as it drives a relatively large portion of the product cost. In general, die-level and board-level optical packaging have been the primary approaches, but they have various downsides.

For example, single die-to-die optical packaging has high costs caused by longer total cycle times for packaging. In addition, there is a possibility of having low yield in die-to-die optical packaging due to handling issues and contaminations during the packaging process.

As another example, there are various technical limitations hindering the integration of high-performance optical modules with smaller form factors. This is particularly true as the requirements continue to increase for many applications (e.g., high bandwidth and bandwidth density, input/output (I/O) counts, etc.), such as co-packaged optics (CPO) for datacenter switching systems, artificial intelligence (AI), CPU-to-CPU (memory) optical interconnection, autonomous vehicles, mobile, wearables, and so forth.

Further, bond wires between the photonics device and electronic device result in limited signal integrity and electrical I/O count, and signal transmission lines on printed circuit boards (PCBs) degrade signal bandwidth and I/O count.

Effective heat dissipation is also critical for high-performance optical modules. It is very challenging, however, to design a heat dissipation heatsink when the packaged optical modules have complicated shapes with bumpy building blocks.

Further, there are various optical packaging approaches that leverage fan-out wafer-level packaging (FOWLP), but these approaches suffers from various problems relating to handling of the coupling connector and fiber array, durability of the optical packaging, and contamination or damage of the optical interfaces during the FOWLP and optical packaging process.

For example, one approach involves embedding an electronic integrated circuit (EIC) in a dielectric molding layer in the FOWLP process, and then separately assembling a silicon photonics integrated circuit (Si-PIC) and optical fiber array on the top surface of the FOWLP die. Since only the EIC is integrated into the FOWLP die, however, the packaged module is not as robust. In addition, the separate processes required to assemble the Si-PIC and fiber array increase the packaging time and associated cost.

Another approach involves embedding both the EIC and Si-PIC in a mold on a FOWLP die, and then aligning a fiber array with the optical coupler of the Si-PIC as the last step of the packaging process, which is referred to as "optics last" optical packaging. This "optics last" approach has various downsides. For example, components used for optical coupling, such as an optical coupling connector or fiber array, are not embedded in the mold with the Si-PIC and EIC, which weakens the robustness of the resulting optical module. In addition, during the FOWLP process, since the coupler of the Si-PIC has not yet been coupled with an optical coupling component or the fiber array, it is vulnerable to contamination and spoiling from mold flow absent appropriate safeguards. It can be challenging, however, to optimize the FOWLP process to protect the coupler and prevent contamination.

Another approach involves inserting fibers in blind vias (BVS) on the backside of the Si-PIC for coupling with the photonics couplers of the Si-PIC. For example, the BVCs are formed at the backside of the Si-PIC, and the EIC and Si-PIC are wafer-level integrated to have better RF performance and higher bandwidth density. However, this approach requires the fiber array to be vertically inserted into the backside of the PIC, which makes the packaged module have a larger profile. This renders the full module integration with standard housing very challenging. In addition, the dangling fiber array inserted into the Si-PIC creates handling issues due to vulnerability to external forces in high volume production.

Accordingly, this disclosure presents various optical packaging embodiments that eliminate the downsides of current approaches. These various embodiments leverage wafer-level or panel-level embedded-in-mold (EIM) processes to integrate an optical module, including fan-out wafer-level packaging (FOWLP), embedded multi-die interconnect bridge (EMIB) packaging, and omni-directional interconnect (ODI) packaging. In many of the embodiments, the building blocks of an optical module—such as the EIC and Si-PIC, along with a pluggable optical coupling connector (POCC) —are fully embedded in a mold. The POCC is designed to provide expanded beam collimation using a monolithically fabricated collimation lens, along with passive optical alignment via a pluggable fiber array unit (FAU). The POCC is also packaged in an early stage of the packaging process, referred to herein as "optics first," as opposed to "optics last" where the lens/mirror arrays are assembled as one of the last steps. These embodiments also provide various mechanisms to protect the POCC and optical interfaces from contamination during the packaging/molding process.

These embodiments provide numerous advantages. For example, since the POCC is a customized device and fully embedded in a mold, the integrated optical module has a compact form factor with high robustness. The POCC/PFAU also eliminates the handling issues relating to dangling fibers in some optical packaging processes.

Further, by adapting wafer-level and panel-level EIM processes for the integration of the optical module, these embodiments maximize the benefits of wafer/panel processing capabilities—such as fine line width/pitch fabrication—with high accuracy. These embodiments also improve the bandwidth density of electrical I/O, which is essential for the integration of future high-performance optical interconnect applications, such as co-packaged optics (CPO) and artificial intelligence (AI), and CPU-to-CPU (memory) optical interconnections. The compact design of an individual POCC also sustains/improves the optical I/O density, even with the expanded beam collimation feature incorporated in the POCC design.

In addition, RF performance is improved by optimizing the RF signal transmission lines in the bridge die or redistribution layer (RDL) via high precision fabrication, thus eliminating the need to use bond wires for interconnections. This results in a highly robust optical module with high resistance to external forces.

By wafer-level assembling the PIC and POCC using an "optics first" approach, the contamination and damage caused by die-to-die and die-to-board optical packaging is eliminated. This improves the total cycle time and the yield, and further saves costs due to the entire packaging process being performed at the wafer/panel level. Further, the external optical interconnection to the optical module is made by simply passively plugging the FAU connector.

This solution also provides various cost-related benefits for the production of semiconductor products, including:

1. Shorter cycle time and higher units per hour (UPH). For example, a single wafer/panel can have tens or even hundreds of packaged optical modules, and known good packages (KGP) can be selected at an earlier stage.
2. Improved RF signal integrity.
3. A compact form factor by consolidating all the necessary components as close as possible in a wafer/panel.
4. A substrate-less integrated optical module, which is surface mountable by reflow and eutectic or flip-chip bonding processes. For example, the fabricated optical module has a flat top surface, which makes it easier to design a heatsink that provides effective thermal management.

The various embodiments in this disclosure generally fall into one of the following categories, which are described further in corresponding sections below:

1. Embedded-in-mold (EIM) optical packaging using a redirected beam to the back side of the Si-PIC;
2. Embedded-in-mold (EIM) optical packaging using a hybrid optical/electrical interposer; and
3. Embedded-in-mold optical packaging using omnidirectional interconnect (ODI) processing.

Embedded-in-Mold (EIM) Optical Packaging Using a Redirected Beam to Back Side of Si PIC FIG. 1 illustrates an example embodiment of an optical module 100 with embedded-in-mold (EIM) optical packaging that redirects an optical beam to/from the back-side of a silicon photonics integrated circuit (Si-PIC) 110. In the illustrated embodiment, the EIM optical module 100 includes an electronic integrated circuit (EIC) 108, an Si-PIC 110, and a pluggable optical coupling connector (POCC) 120, all of which are fully embedded in a polymeric mold 102 using an embedded-in-mold (EIM) assembly process, as described further below.

The EIC 108 can include any type of electronic integrated circuitry, such as a transimpedance amplifier (TIA), driver circuits, and so forth. The Si-PIC 110 is used to send and receive optical signals over an optical fiber 138. The POCC 120 is used in conjunction with a pluggable fiber array unit (PFAU) 130 to provide optical coupling between the Si-PIC 110 and the optical fiber 138. For example, a fiber array unit (FAU), which may also be referred to as a fiber array, is typically an array of optical fibers used for optical transmissions, such as for coupling light between the Si-PIC 110 and external fibers 138. In some cases, a fiber array may be formed at the end of a bundle of fibers rather than over the entire fiber length. Moreover, in some embodiments, the POCC 120 and/or PFAU 130 are glass devices that can be connected via a pluggable interface and include various lens/mirrors to collimate, refocus, and/or reflect/redirect an optical beam between the Si-PIC 110 and the optical fiber 138, as described further below.

In the illustrated embodiment, the EIC 108, Si-PIC 110, and POCC 120 are fully embedded in a polymeric mold 102 using an embedded-in-mold (EIM) assembly process. The mold 102 may include any polymeric and/or dielectric molding materials. The EIC 108 and Si-PIC 110 are aligned face down in the mold 102 and electrically connected via a redistribution layer (RDL) 104, which is a layer of metal interconnects (e.g., copper (Cu)) used to electrically connect different parts of the optical module 100 with each other and/or with other components. The POCC 120 is aligned to the back-side of the Si-PIC 110 and further interfaces with the PFAU 130, which is designed to plug into the POCC 120 to provide passive optical alignment.

The Si-PIC 110 includes a laser diode (LD)/modulator (LD-MOD) 112, a photodiode (PD) 113, and a coupler 111. The LD-MOD 112 is used to transmit optical signals, while the PD 113 is used to receive optical signals.

For optical transmissions, the LD-MOD 112 generates a laser beam 139, which is redirected 90 degrees and emitted from the backside of the Si-PIC 110. The beam 139 then enters the POCC 120, where it passes through a collimation lens 122, which is a curved mirror or lens designed to collimate (e.g., narrow/align) the beam 139. The collimated beam 139 then enters the PFAU 130, which includes a refocusing lens 132 to refocus the beam 139, as well as a 45-degree angled total internal reflection (TIR) mirror 135 to reflect and focus the beam 139 into an optical fiber 138 for transmission (e.g., a single-mode optical fiber (SMF)). For example, the 45-degree angled TIR mirror 125 reflects the beam 139 orthogonally by approximately 90 degrees into the fiber 138.

The process of receiving optical signals is similar, except the beam 139 travels in the reverse direction. For example, the beam 139 is received over the fiber 138 and passes through the PFAU 130 and POCC 120, and then into the backside of the Si-PIC 110, at which point the photodiode (PD) 113 converts the light beam 139 into an electrical signal for further processing.

The optical packaging approach used for optical module 100 provides various benefits. For example, by fully embedding the key components of the optical module 100 in a mold 102 (e.g., the EIC 108, Si-PIC 110, and POCC 120), the assembled module has a robust and compact form factor with no dangling fibers. The optical module 100 can also be flip-chip or reflow-assembled to a printed circuit board.

Moreover, the PFAU 130 is passively aligned to the POCC 120 by simple plugging, which eliminates the handling issues associated with an FAU with a dangling fiber array that is directly aligned to the Si-PIC. This pluggable optical coupling approach also reduces costs, as the PFAU 130 can be aligned during production using a moderate-precision aligner, which is relatively inexpensive and also increases the production rate (e.g., units per hour (UPH)).

Further, by placing the Si-PIC 110 face-down in the mold 102, through-silicon vias (TSVs) —which impose constraints on the maximum thickness of the Si-PIC wafer—are not required for the electrical interconnections with the Si-PIC. As a result, the thickness of the Si-PIC can be maintained above 500 μm, which increases cost efficiency and improves handling issues.

In particular, increasing the thickness of the Si-PIC 110 results in a larger mode field diameter (MFD) for the collimated beam produced by the collimation lens 122 in the POCC 120. Since silicon has a relatively high refractive index, the refracted beam angle by the silicon is relatively small and would normally require a relatively long light path to achieve the required mode field diameter (MFD).

FIGS. 2A-F illustrate an example optical packaging process for the optical module 100 of FIG. 1, and FIG. 3 illustrates an example process flow 300 for the optical packaging process of FIGS. 2A-F.

Figures 2A, 2B:
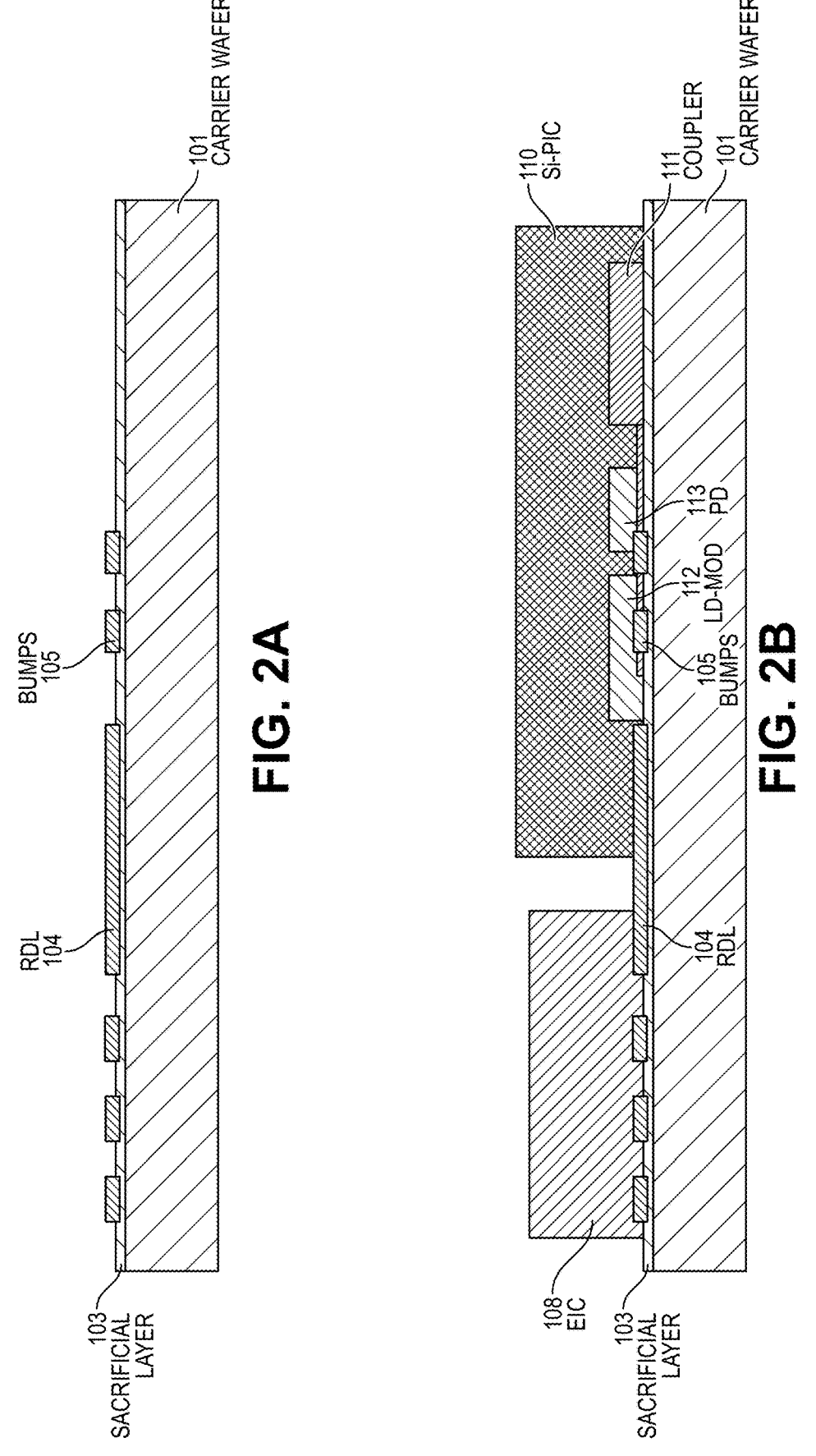
FIGS. 2A-F illustrate an example optical packaging process for the optical module of FIG. 1.

In process flow 300, the optical packaging process begins at block 302 by depositing a sacrificial layer 103 on a carrier wafer 101. Next, under bump metallization (UBM) is formed on the sacrificial layer 103, along with a redistribution layer (RDL) 104 and copper (Cu)-pillar bumps 105. The resulting structure is shown in FIG. 2A.

At block 304, the EIC 108 and Si-PIC 110 are pick-and-place aligned—face down—on the RDL 104 and UBM 105. The resulting structure is shown in FIG. 2B.

Figures 2C, 2D:
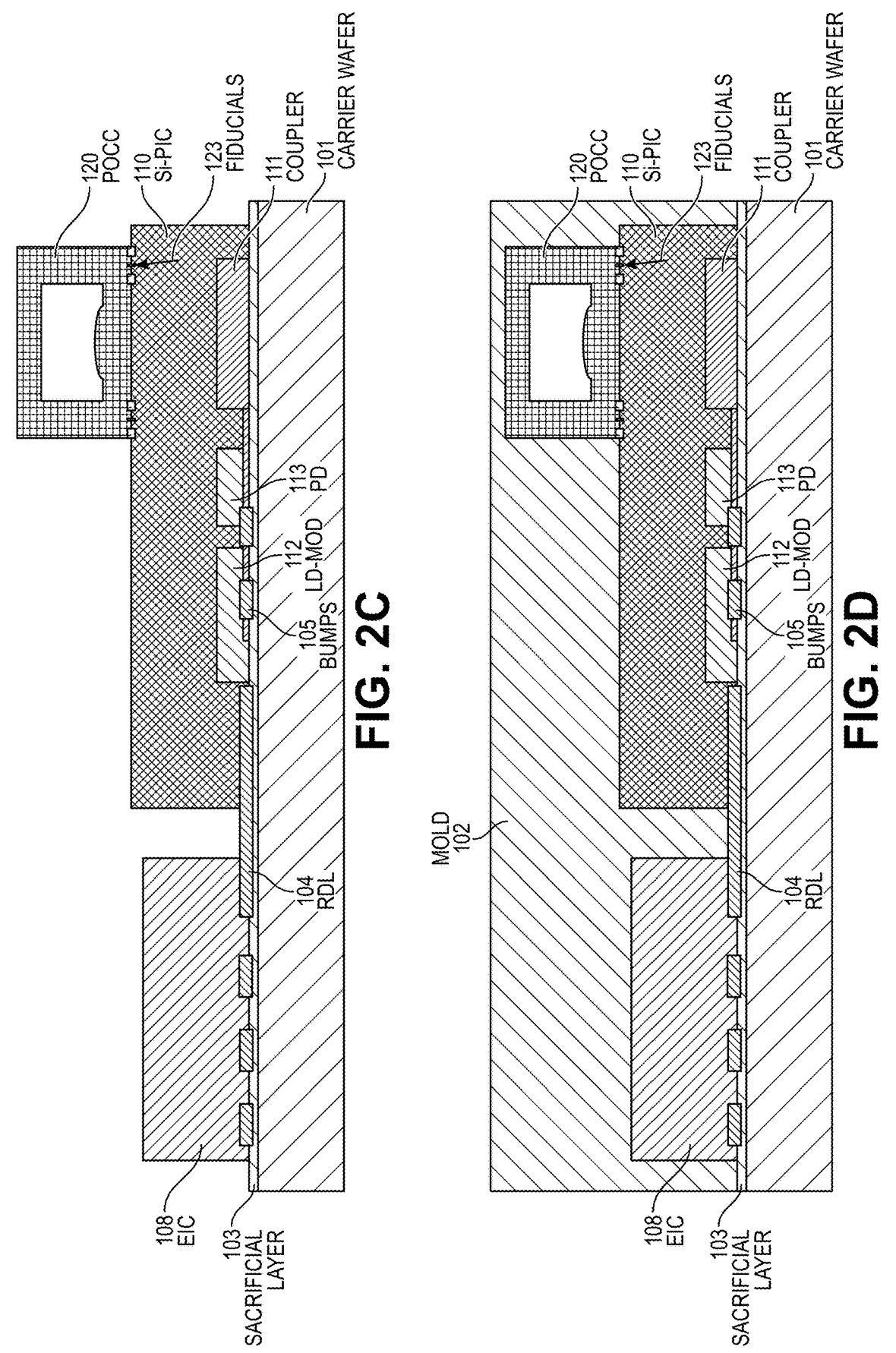

At block 306, the POCC 120 is aligned to the back side of the Si-PIC 110 with a high-precision aligner, such that the fiducials 123 of the Si-PIC 110 and POCC 110 are aligned. The fiducial markers 123 may be circular copper markers used as reference points for alignment by pick-and-place assembly machines. An ultraviolet (UV)-curable epoxy is then applied and cured to the edges of the aligned POCC 120 on the Si-PIC 110. The POCC 120 also includes a temporary lid to protect the inside cavity from mold flow in the next stage of the process flow. The resulting structure is shown in FIG. 2C.

At block 308, overmolding is used to embed the EIC 108, Si-PIC 110, and POCC 120 in a mold 102 using polymeric molding materials. The resulting structure is shown in FIG. 2D.

Figures 2E, 2F:
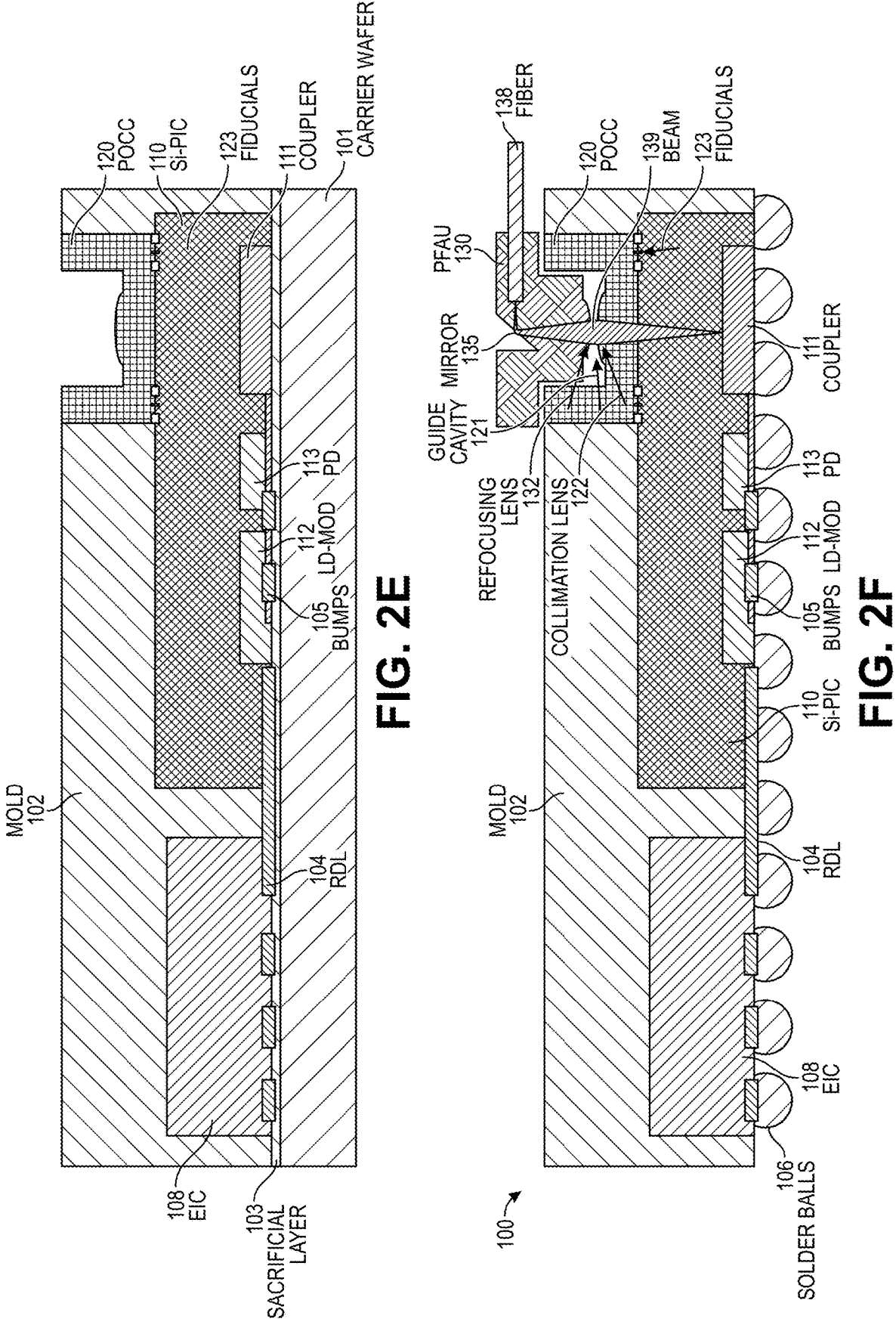

At block 310, the top surface is grinded to thin the wafer and expose the POCC 120 cavity. The resulting structure is shown in FIG. 2E.

At block 312, the carrier wafer 101 is released, the ball array 106 is formed, and singulation is performed to separate/isolate the resulting module 100. Finally, the PFAU 130 is plugged into the POCC 120 and epoxy sealed to create the optical connection between the Si-PIC 110 and the fiber 138. For example, with respect to the optical connection, the POCC 120 includes a collimation lens 122 to collimate the beam on its way to the PFAU 130. Further, the PFAU 130 includes a refocusing lens 132 to refocus the collimated beam, along with a 45-degree angled TIR mirror 135 to reflect the beam 90 degrees, where the beam is then coupled to the core of the single-mode optical fiber (SMF) 138, which is precisely embedded in the PFAU 130 using V-grooves (not shown). The completed optical module 100 is shown in FIG. 2F.

Figures 4, 5:
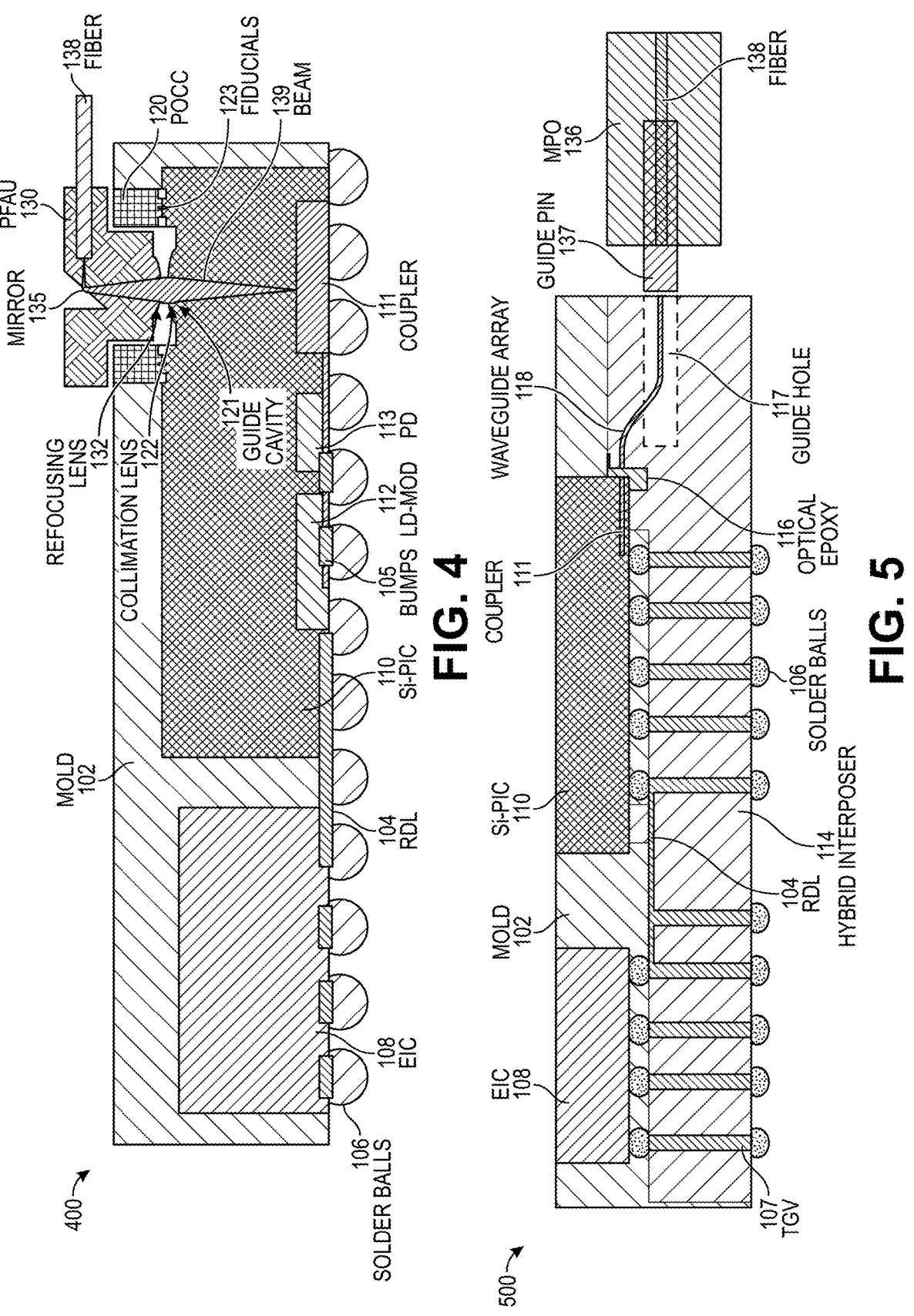
FIG. 4 illustrates an alternative embodiment of an optical module 400 with EIM optical packaging that redirects an optical beam to/from the back-side of an Si-PIC.
FIG. 5 illustrates an example embodiment of an optical module with EIM optical packaging using a hybrid optical/electrical interposer.

FIG. 4 illustrates an alternative embodiment of an optical module 400 with embedded-in-mold (EIM) optical packaging that redirects an optical beam to/from the back-side of a silicon photonics integrated circuit (Si-PIC) 110. In the illustrated embodiment, the collimation lens 122 is fabricated directly on the back-side of the Si-PIC 110, and the POCC 120—which serves as a receptacle for the PFAU 130—is precisely aligned to the collimation lens 122. The respective components (e.g., the EIC 108, Si-PIC 110, and POCC 120) are all fully embedded in a polymeric mold 102 using an EIM process. The optical packaging process for optical module 400 is similar to the process shown in FIGS. 2-3 for optical module 100, with the exception that after placing/bonding the Si-PIC 110 on the carrier wafer 101, the POCC 120 must be precisely aligned to the collimation lens 122 on the back side of the Si-POC 110 and fixed with epoxy adhesive.

After the EIM process is complete (e.g., the components have been embedded in a mold 102 and the top of the POCC 120 has been grinded away to expose the guide cavity), the PFAU 130 is passively aligned by plugging into the POCC 120, thus providing optical coupling between the coupler 111 of the Si-PIC 110 and the fiber 138.

Embedded-in-Mold (EIM) Optical Packaging Using a Hybrid Optical/Electrical Interposer This section presents various embodiments of an optical module with embedded-in-mold (EIM) optical packaging using a hybrid optical/electrical interposer. Further, the described embodiments include silicon (Si) photonics integrated circuits (Si-PICs) with both edge couplers and vertical couplers. For example, a fiber-to-chip coupler is a passive device that can transmit and guide light, which is used for coupling of light between a planar waveguide circuit (e.g., an Si-PIC) and optical fibers. These couplers are typically in the form of edge couplers (e.g., in-plane coupling/butt coupling) and vertical couplers (e.g., off-plane coupling), which is based on the relative position of the Si-PIC and the fibers or another intermediate coupling structure or component. The embodiments in FIGS. 5-11 include an Si-PIC 110 with an edge coupler 111 (e.g., in-plane coupling/butt coupling), while the embodiments in FIGS. 12-20 include an Si-PIC 110 with a vertical coupler 111 (e.g., off-plane coupling).

FIG. 5 illustrates an example embodiment of an optical module 500 with embedded-in-mold (EIM) optical packaging using a hybrid optical/electrical interposer 114 as the baseline packaging structure for optical and electrical interconnections. In some embodiments, for example, the hybrid interposer 114 is made of glass or any other suitable material that can be penetrated by optical wavelengths. The hybrid interposer 114 also includes vias, such as through-glass vias (TGVs) 107, filled with copper and/or any other suitable metal, to provide electrical interconnections between the EIC 108, Si-PIC 110, and other components of the optical module 500.

Further, the hybrid interposer 114 includes built-in optical coupling components to enable an optical interconnection between the Si-PIC 110 and an external fiber array 138. In the illustrated embodiment, for example, the glass hybrid interposer 114 includes an optical waveguide array 118. A waveguide 118 is a structure that guides electromagnetic waves (e.g., light waves or beams) with minimal loss of energy by restricting the transmission of energy in a particular direction. In the illustrated embodiment, the optical waveguide array 118 is fabricated in the glass hybrid interposer 114 for optical coupling with the edge coupler 111 of the Si-PIC 110 via butt coupling. The other end of the waveguide array 118 extends into a guide hole 117 in the hybrid interposer 114, which serves as a pluggable interface for a guide pin 137 on an external multi-fiber push-on (MPO) connector 136. In this manner, the waveguide array 118 can be passively connected to an external optical fiber array 138 in the MPO connector 136 via the pluggable guide hole 117 and guide pin 137 combination.

FIGS. 6A-F illustrate an example optical packaging process for the optical module 500 of FIG. 5, and FIG. 7 illustrates an example process flow 700 for the optical packaging process of FIGS. 6A-F.

Figures 6A, 6B:
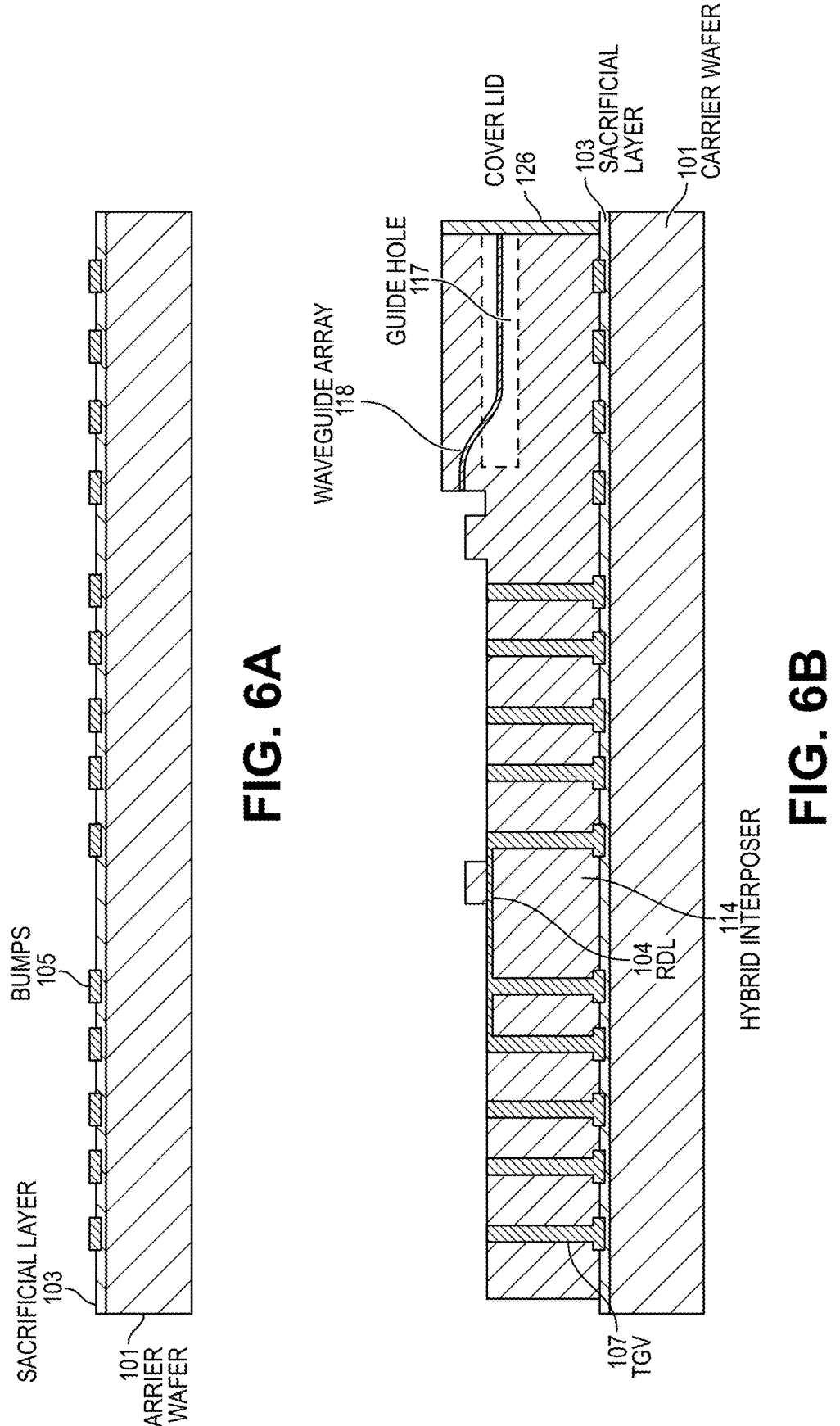
FIGS. 6A-F illustrate an example optical packaging process for the optical module of FIG. 5.

At 702, a sacrificial layer 103 is deposited on a carrier wafer 101. Next, under bump metallization (UBM) is formed on the sacrificial layer 103, along with Cu-pillar bumps 105 for the redistribution layer (RDL) 104 and other interconnections to be provided by the hybrid interposer 114. The resulting structure is shown in FIG. 6A.

At 704, the hybrid interposer 114 is placed on and bonded to the carrier wafer/panel 101 (e.g., using die-to-wafer (D2W) bonding; for example, reconstitution of die on carrier wafer/panel). The hybrid interposer 114 includes through-glass vias (TGVs) 107 for vertical and horizontal electrical interconnections, which are aligned with the bumps 105 formed on the sacrificial layer 103. In addition, the interposer 114 includes a temporary cover lid 126 to cover the guide hole 117 for protection from mold flow during the overmolding process. The cover lid 126 will subsequently be removed during the dicing process in order to expose/open the guide hole 117. The resulting structure is shown in FIG. 6B.

Figures 6C, 6D:
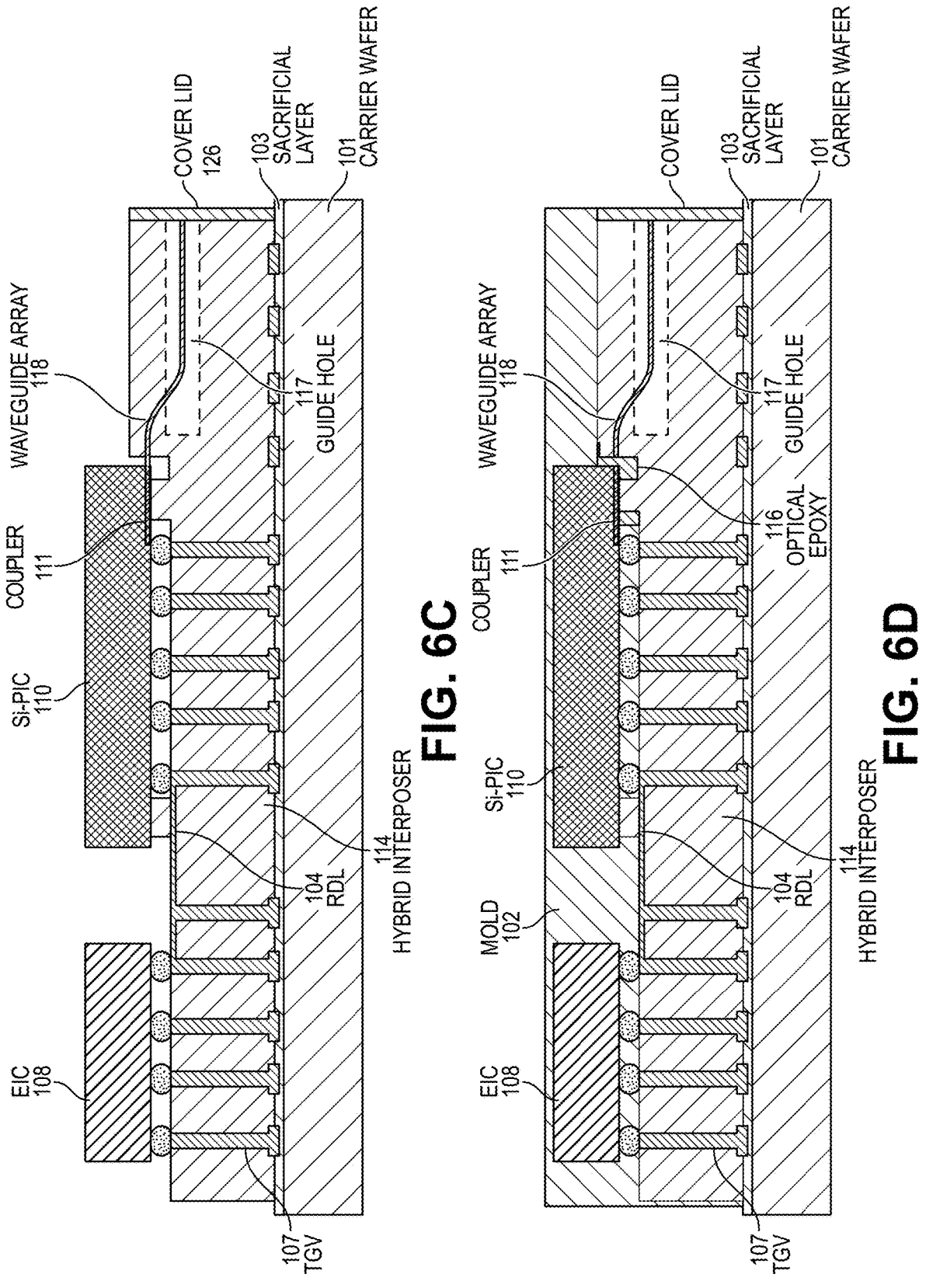

At 706, the EIC 108 and Si-PIC 110 are pick-and-place aligned and bonded—face down—on the hybrid interposer 114, with optical alignment between the edge coupler 111 of the Si-PIC 110 and the waveguide array 118 of the interposer 114. In some embodiments, for purposes of optical alignment, the Si-PIC 110 is attached with a high-precision die bonder (e.g., with accuracy better than 0.5 μm at 3-sigma). The resulting structure is shown in FIG. 6C.

At 708, after the Si-PIC 110 has been aligned with the interposer 114, the gap between the coupler array 111 of the Si-PIC 110 and the waveguide array 118 of the interposer 114 is filled with an optical epoxy 116, which is transparent to electromagnetic/optical signals at wavelengths which the Si-PIC 110 operates at. Next, overmolding is used to embed the EIC 108, Si-PIC 110, and hybrid interposer 114 in a mold 102 using polymeric molding materials. The resulting structure is shown in FIG. 6D.

Figures 6E, 6F:
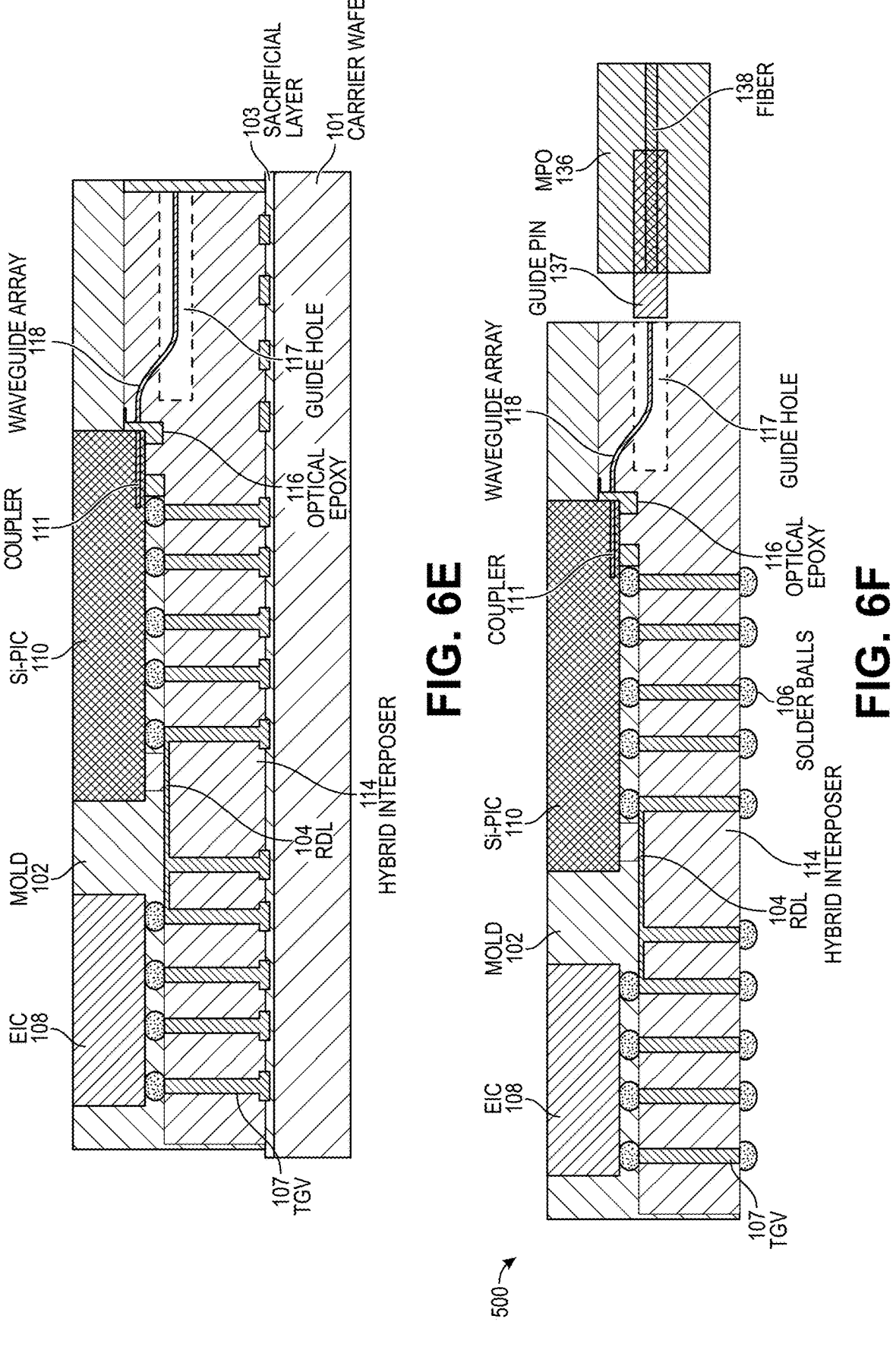

At 710, the top surface of the mold 102 is grinded, resulting in the structure shown in FIG. 6E.

At 712, the carrier wafer 101 is released and a ball array 106 is formed below the interposer 114. Singulation is then performed to separate/isolate the resulting module 500 and remove the temporary cover lid 126 to open the guide hole 117. Finally, the MPO 136 is plugged into the interposer 114 via the guide pin 137 and guide hole 117, thus creating an optical connection between the edge coupler 111 of the Si-PIC 110 and the external fiber array 138 in the MPO 136. The completed optical module 500 is shown in FIG. 6F.

FIGS. 8A-E illustrate an example embodiment of an optical module 800 with embedded-in-mold (EIM) optical packaging using a hybrid optical/electrical interposer 114, a pluggable optical coupling connector (POCC) 120, and a pluggable fiber array unit (PFAU) 130.

Figures 8A, 8B, 8C, 8D, 8E:
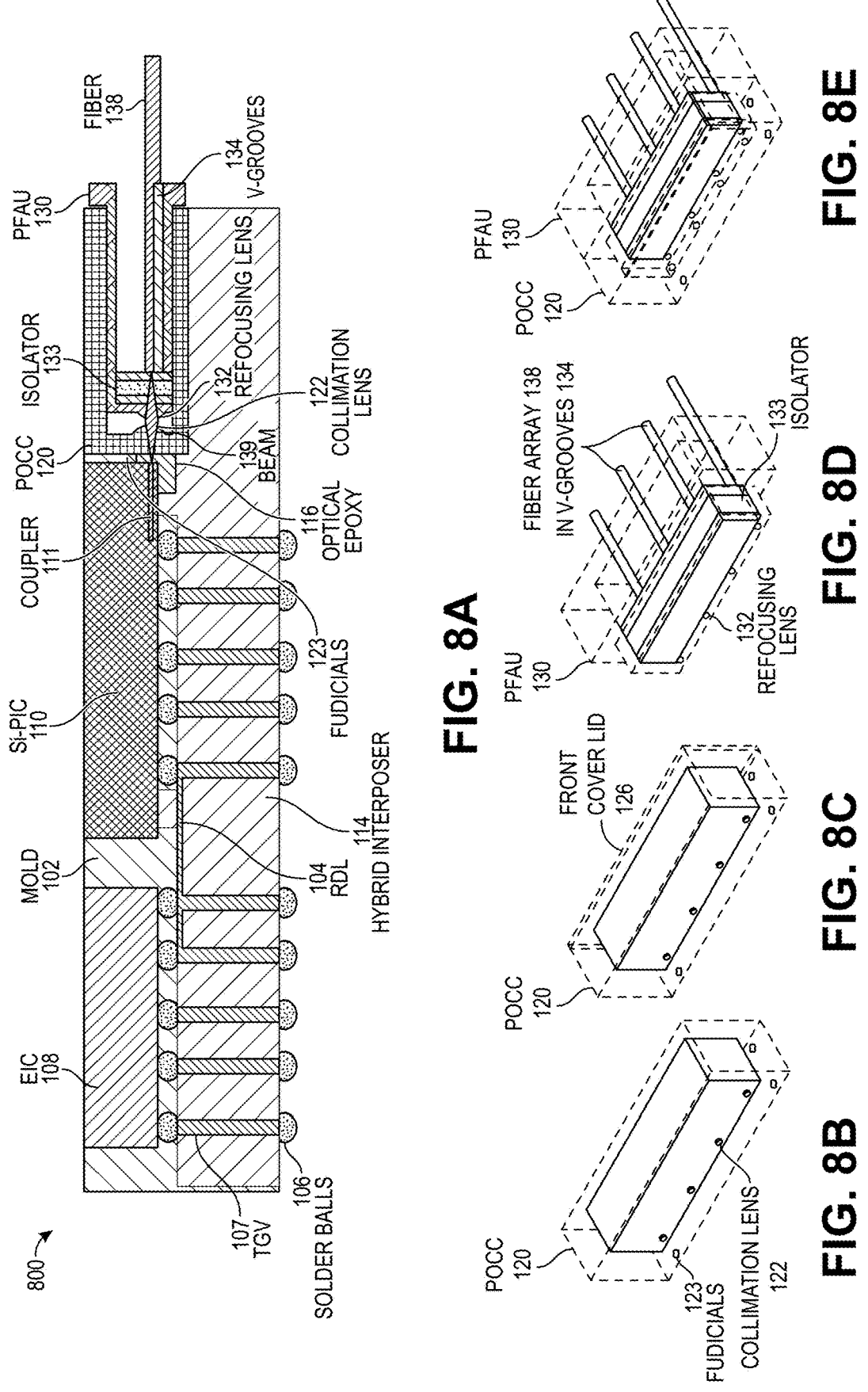
FIGS. 8A-E illustrate an example embodiment of an optical module with EIM optical packaging using a hybrid interposer and a pluggable optical coupling connector (POCC)/pluggable fiber array unit (PFAU).

In particular, FIG. 8A shows a cross-section view of the optical module 800, which includes an EIC 108, an Si-PIC 110, a hybrid interposer 114, a POCC 120, and a PFAU 130. The POCC 120 is coupled to the edge coupler 111 of the Si-PIC 110 and achieves beam collimation using a collimation lens 122 inside the POCC 120. The EIC 108 and Si-PIC 110 are face-down assembled on the hybrid optical/electrical interposer 114, which includes through-glass vias (TGVs) 107 for electrical interconnections. The hybrid interposer 114 is also designed to integrate with the POCC 120, which is a pluggable optical coupling connector with a beam collimation feature. Further, the EIC 108, Si-PIC 110, interposer 114, and POCC 120 are all embedded in a mold 102 using an embedded-in-mold (EIM) process, such as over-molding.

The design and assembled structure of the POCC 120 and PFAU 130 are shown in FIGS. 8B-E. For example, FIG. 8B shows a three-dimensional (3D) view of the POCC 120 without a cover lid 126. As shown in FIG. 8B, the POCC 120 includes a hollow cavity with only the front side open, which serves as a pluggable interface for the PFAU 130. Further, a collimation lens array 122 is fabricated on the inside surface of the POCC 120, which is used to collimate the beam from the coupler array 111 of the Si-PIC 110 when the POCC 120 is aligned with the coupler array 111.

FIG. 8C shows a 3D view of the POCC 120 with a cover lid 126. In particular, the POCC 120 needs to be protected from mold flow during the optical packaging processes described herein (e.g., FOWLP, EMIB, and ODI processes). As a result, a temporary cover lid 126 is used to cover the POCC 120 cavity during the embed-in-mold (EIM) process, and the cover lid 126 is subsequently removed during the dicing process, thus reopening the cavity of POCC 120 to enable the PFAU 130 to be plugged in.

FIG. 8D shows a 3D view of the PFAU 130, which includes a refocusing lens 132, an optical isolator 133, and a fiber array 138 embedded in V-grooves 134. The refocusing lens 132, which is fabricated on the front surface of the PFAU 130, is used to refocus the collimated beam from the POCC 120 into the core of the single-mode fiber (SMF) array 138. The optical isolator 133 is an optical component (e.g., an optical diode) that allows the transmission of light in only one direction, thus restricting the direction in which light is able to travel. In this manner, the isolator 133 forces the optical beam to propagate in a specific direction, thus avoiding unwanted optical feedback or noise caused by beam reflections. In the illustrated embodiment, the isolator 133 is positioned between the refocusing lens 132 and the fiber array 138 in the PFAU 130.

FIG. 8E shows a 3D view of the PFAU 130 plugged into the POCC 120. In particular, the PFAU 130 is optically aligned by passively plugging into the cavity of the POCC 120.

Figures 9A, 9B:
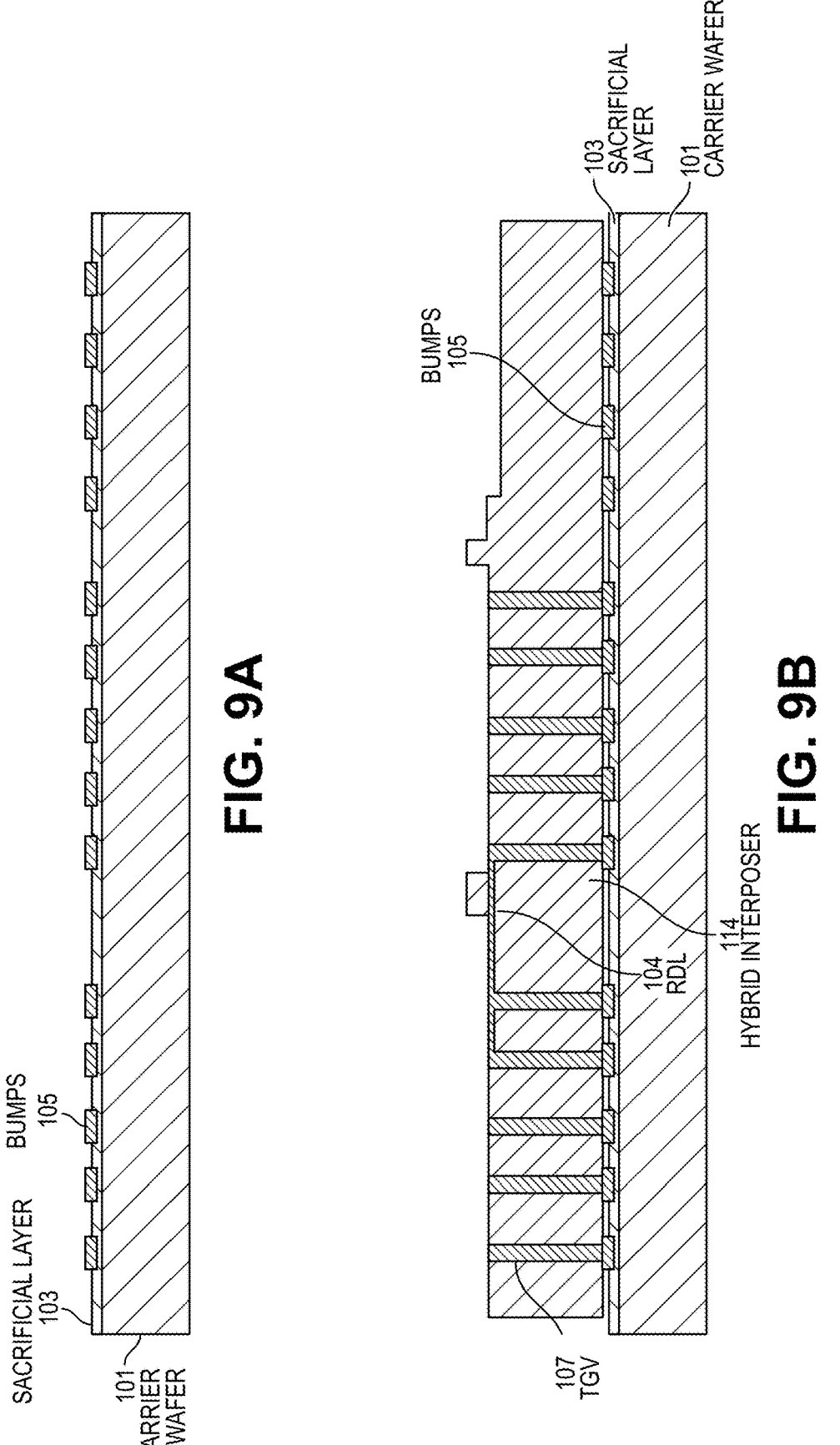
FIGS. 9A-F illustrate an example optical packaging process for the optical module of FIG. 8.
Figures 9C, 9D:
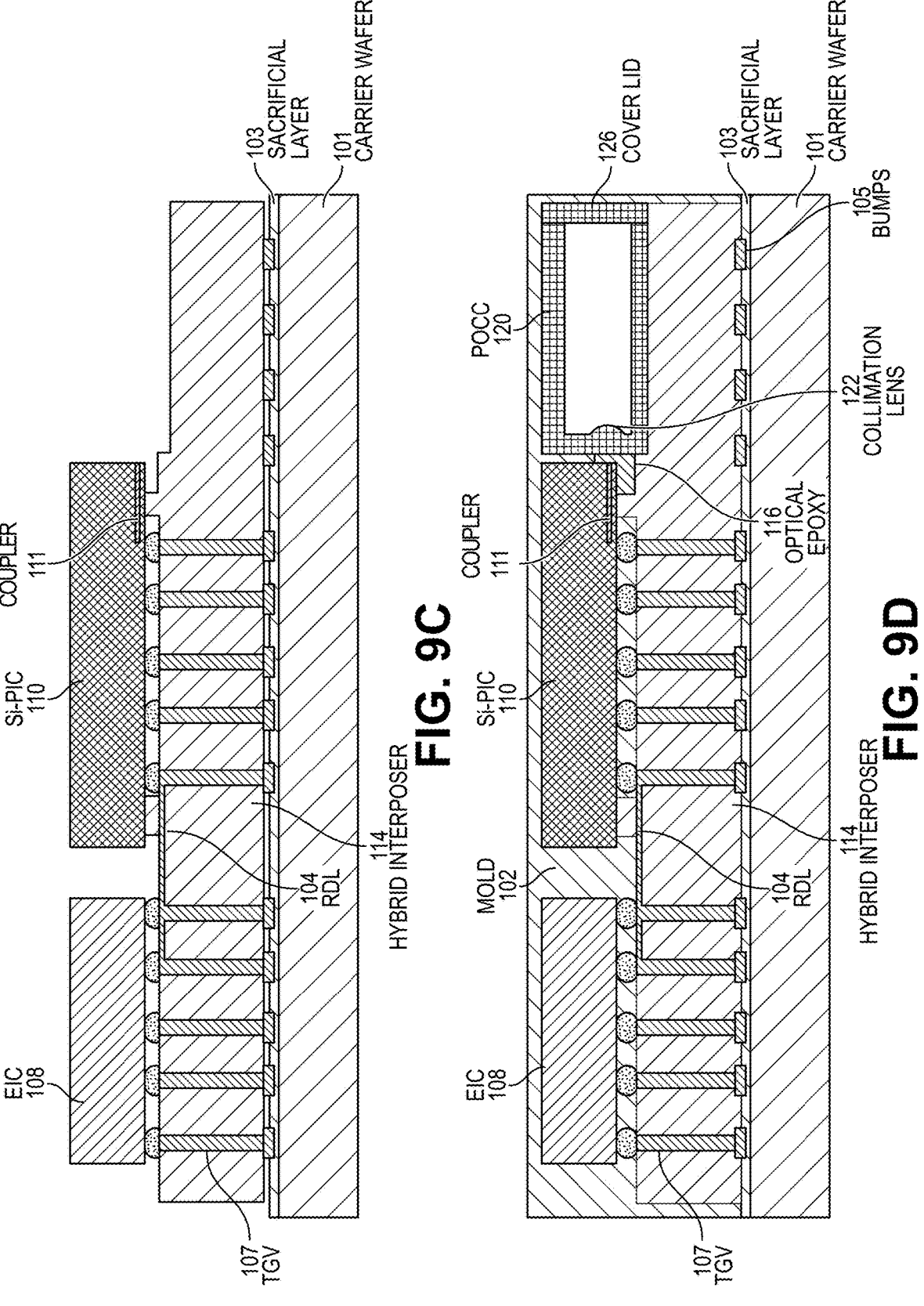
Figures 9E, 9F:
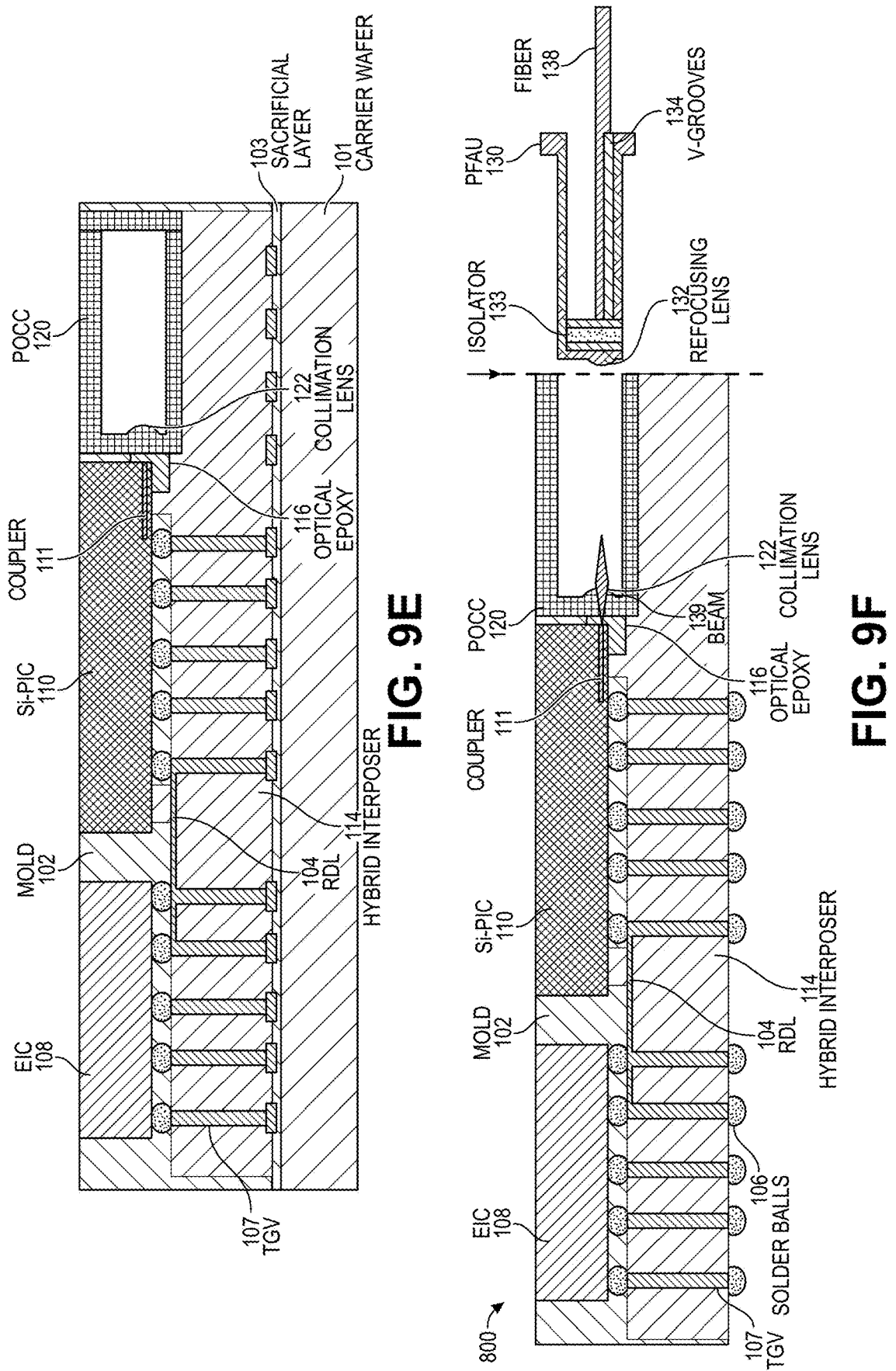
Figure 10:
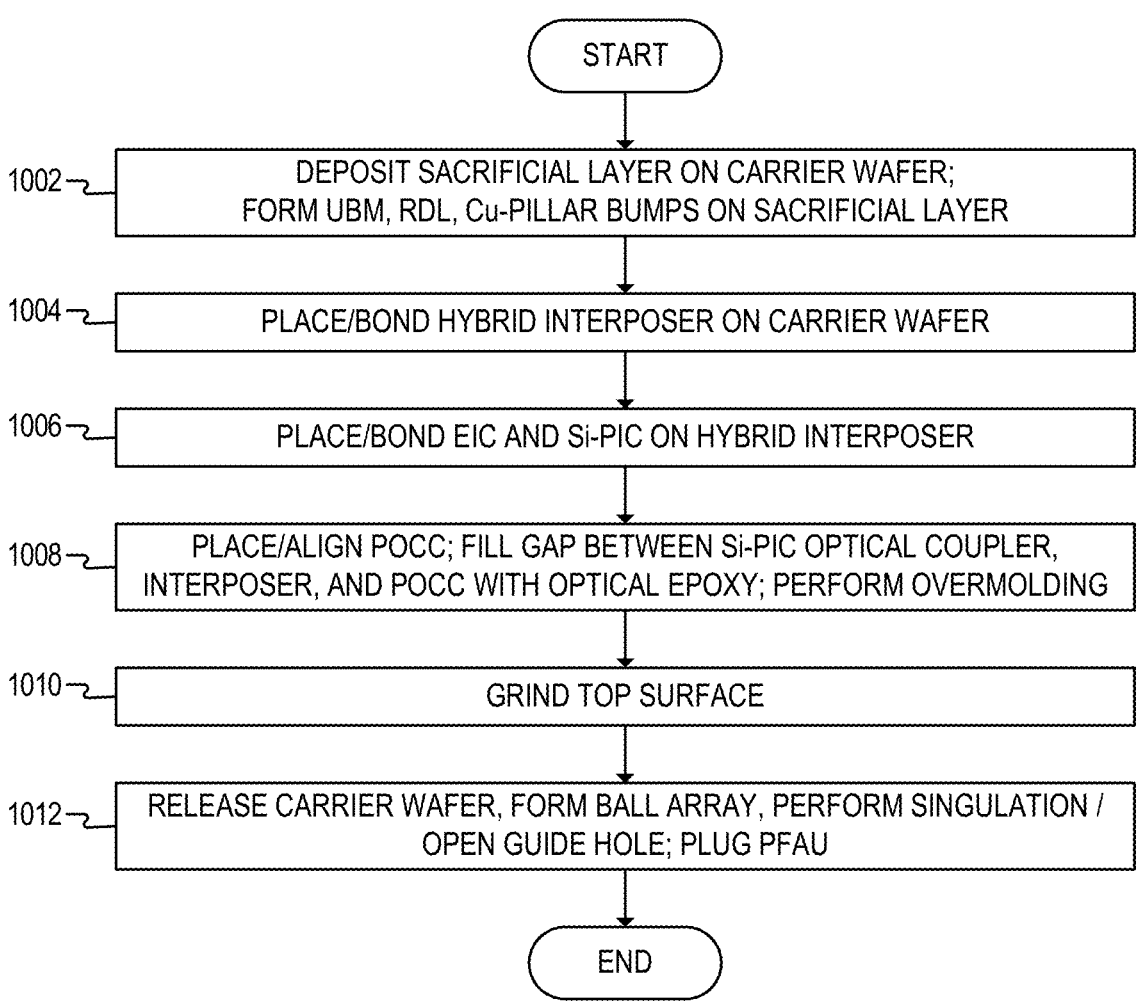
FIG. 10 illustrates an example process flow for the optical packaging process of FIGS. 9A-F.

FIGS. 9A-F illustrate an example optical packaging process for the optical module 800 of FIG. 8, and FIG. 10 illustrates an example process flow 1000 for the optical packaging process of FIGS. 9A-F.

At 1002, a sacrificial layer 103 is deposited on a carrier wafer 101. Next, under bump metallization (UBM) is formed on the sacrificial layer 103, along with Cu-pillar bumps 105 for the redistribution layer (RDL) 104 and other interconnections to be provided by the hybrid interposer 114. The resulting structure is shown in FIG. 9A.

At 1004, the hybrid interposer 114 is placed on, and bonded to, the carrier wafer 101 (e.g., using die-to-wafer (D2W) bonding), such that the through-glass vias (TGVs) 107 of the interposer 114 are aligned with the corresponding bumps 105 formed on the sacrificial layer 103 for the RDL 104 and other interconnections. The resulting structure is shown in FIG. 9B.

At 1006, the EIC 108 and Si-PIC 110 are placed face down on, and bonded to, the hybrid interposer 114, aligning the respective interconnections of the various components. The resulting structure is shown in FIG. 9C.

At 1008, the POCC 120 is placed and aligned on the interposer 114 adjacent to the optical coupler 111 of the Si-PIC 110. The POCC 120 has a guide cavity on the side (e.g., to enable horizontal coupling with the PFAU 130), which is covered with a temporary lid 126 for protection from mold flow during the embed-in-mold (EIM) process. Next, the gap between the optical coupler 111 of the Si-PIC 110, the interposer 114, and the POCC 120 is filled with optical epoxy 116. Overmolding is then used to embed the EIC 108, Si-PIC 110, and hybrid interposer 114 in a mold 102 using polymeric molding materials. The resulting structure is shown in FIG. 9D.

At 1010, the top surface of the mold 102 is grinded, resulting in the structure shown in FIG. 9E.

At 1012, the carrier wafer 101 is released, and a ball array 106 is formed below the interposer 114. Singulation is then performed to separate/isolate the resulting module 800, as well as and remove the temporary cover lid 126 to open the guide cavity on the side of the POCC 120. Finally, the PFAU 130 is plugged into the POCC 120, thus creating an optical connection between the edge coupler 111 of the Si-PIC 110 and the fiber array 138 in the PFAU 130. The completed optical module 800 is shown in FIG. 9F.

Figure 11A:
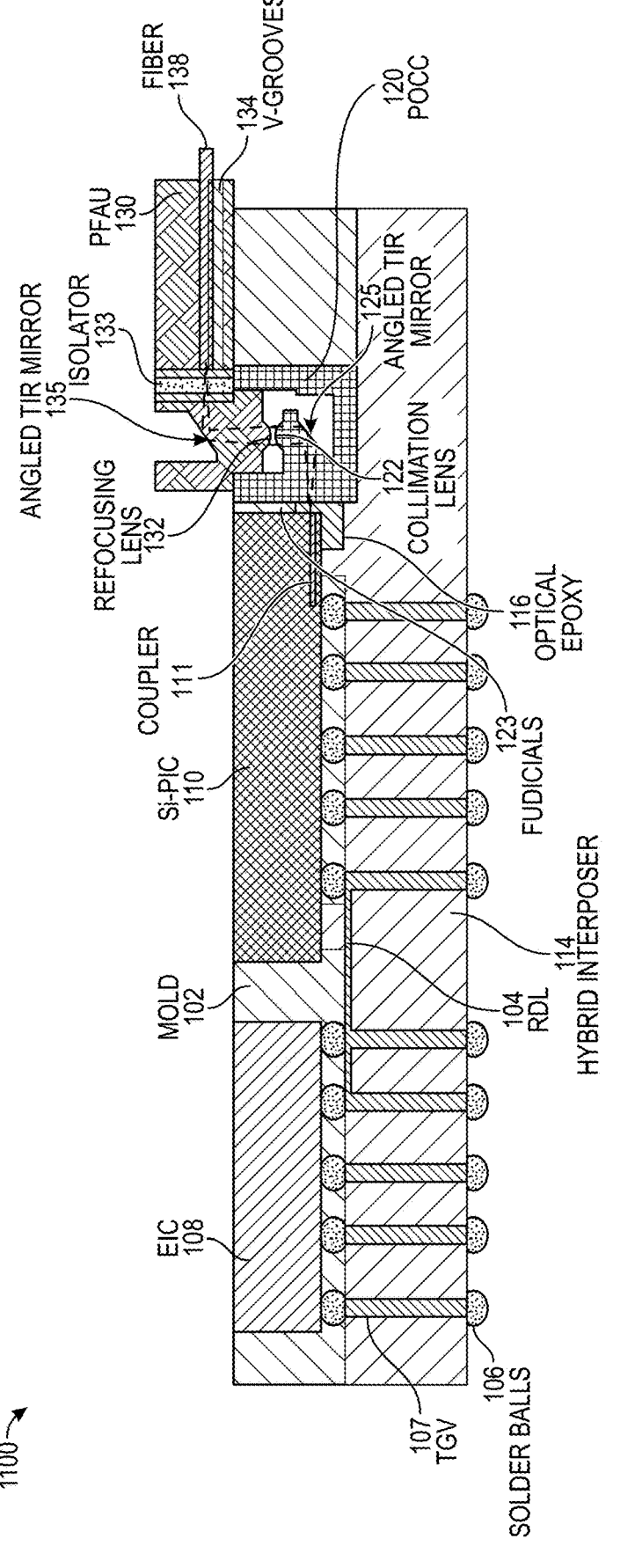
FIGS. 11A-E illustrate another embodiment of an optical module with EIM optical packaging using a hybrid interposer and a POCC/PFAU.
Figure 11B:
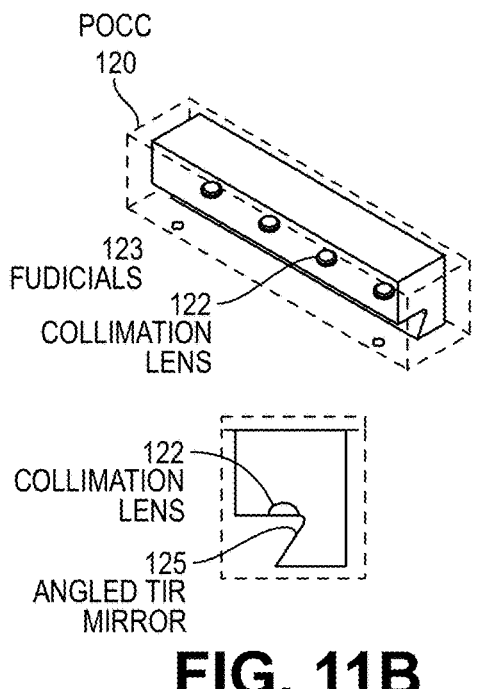
Figure 11C:
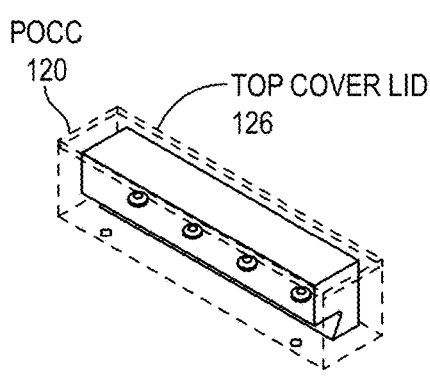
Figure 11D:
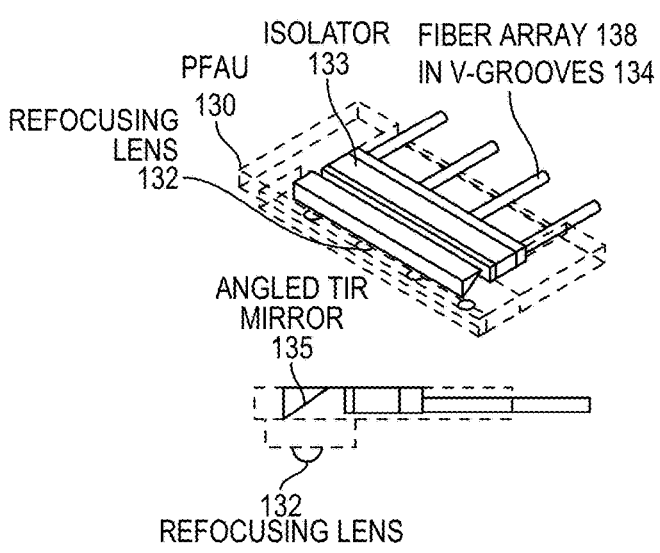
Figure 11E:
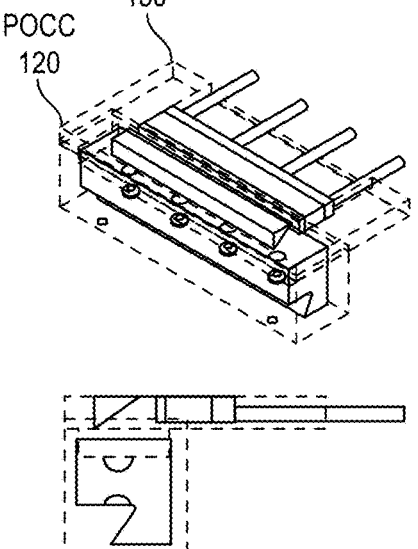

FIGS. 11A-E illustrate an alternative embodiment of an optical module 1100 with embedded-in-mold (EIM) optical packaging using a hybrid optical/electrical interposer 114, a pluggable optical coupling connector (POCC) 120, and a pluggable fiber array unit (PFAU) 130. In particular, FIG. 11A shows a cross-section view of the optical module 1100. FIG. 11B shows three-dimensional (3D) and side views of the POCC 120 without a cover lid 126. FIG. 11C shows a 3D view of the POCC 120 with a cover lid 126 for protection from mold flow. FIG. 11D shows 3D and side views of the PFAU 130. FIG. 11E shows 3D and side views of the PFAU 130 vertically plugged into the top of the POCC 120.

In the illustrated embodiment, optical module 1100 is similar to optical module 800 of FIG. 8A, except the guide cavity of the POCC 120 is open in the upper vertical direction—and thus the PFAU 130 is plugged into the POCC 120 from the vertical direction—and multiple total internal reflection (TIR) mirrors 125, 135 are used to redirect the beam from the coupler 111 of the Si-PIC 110, through the POCC 120 and PFAU 130, and into the fiber core 138, as described further below.

In the illustrated embodiment, the POCC 120 includes an angled total internal reflection (TIR) mirror 125 and colli-mation lens 122 inside of it, along with fiducials 123 for alignment, as shown in FIG. 11B. The PFAU 130 includes a refocusing lens 132, an angled TIR mirror 135, an optical isolator 133, and a fiber array 138 embedded in V-grooves 134, as shown in FIG. 11D.

As depicted in FIG. 11A, the beam from the edge coupler 111 of the Si-PIC 110 enters the POCC 120 and is 90-degree reflected by the angled TIR mirror 125 in the vertical upward direction, where the beam is then collimated by the collimation lens 122. The collimated beam then enters the PFAU 130, where the refocusing lens 132 refocuses the beam into another angled TIR mirror 135, which reflects/redirects the beam 90 degrees into the core of the single-mode fiber (SMF) array 138, thus creating the optical connection between the coupler 111 of the Si-PIC 110 and the fiber array 138.

The optical packaging process for optical module 1100 is similar to the process flow shown in FIGS. 9-10 for optical module 800, except that since the POCC 120 opens from the top (for vertical plugging) instead of from the side (for horizontal plugging), the cover lid 126 for mold flow protection is placed on top of the POCC 120 instead of on the side.

Figure 12A:
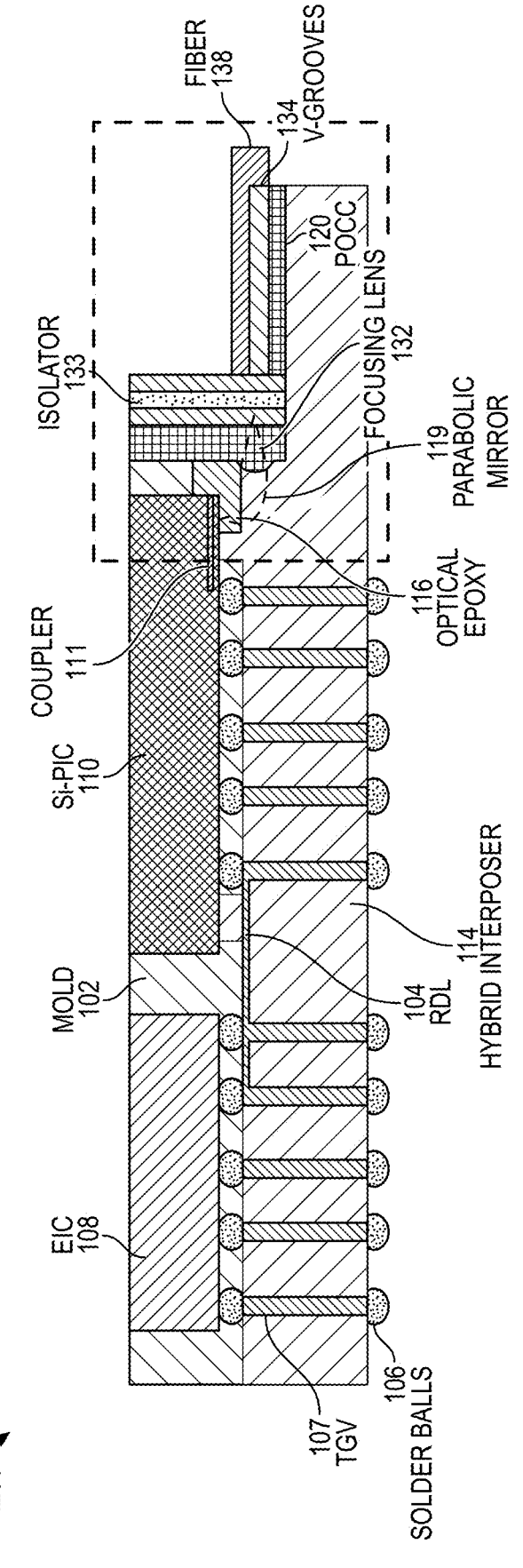
FIGS. 12A-D illustrate an example embodiment of an optical module with EIM optical packaging using a hybrid interposer and a POCC with an integrated fiber array.
Figures 12B, 12C, 12D:
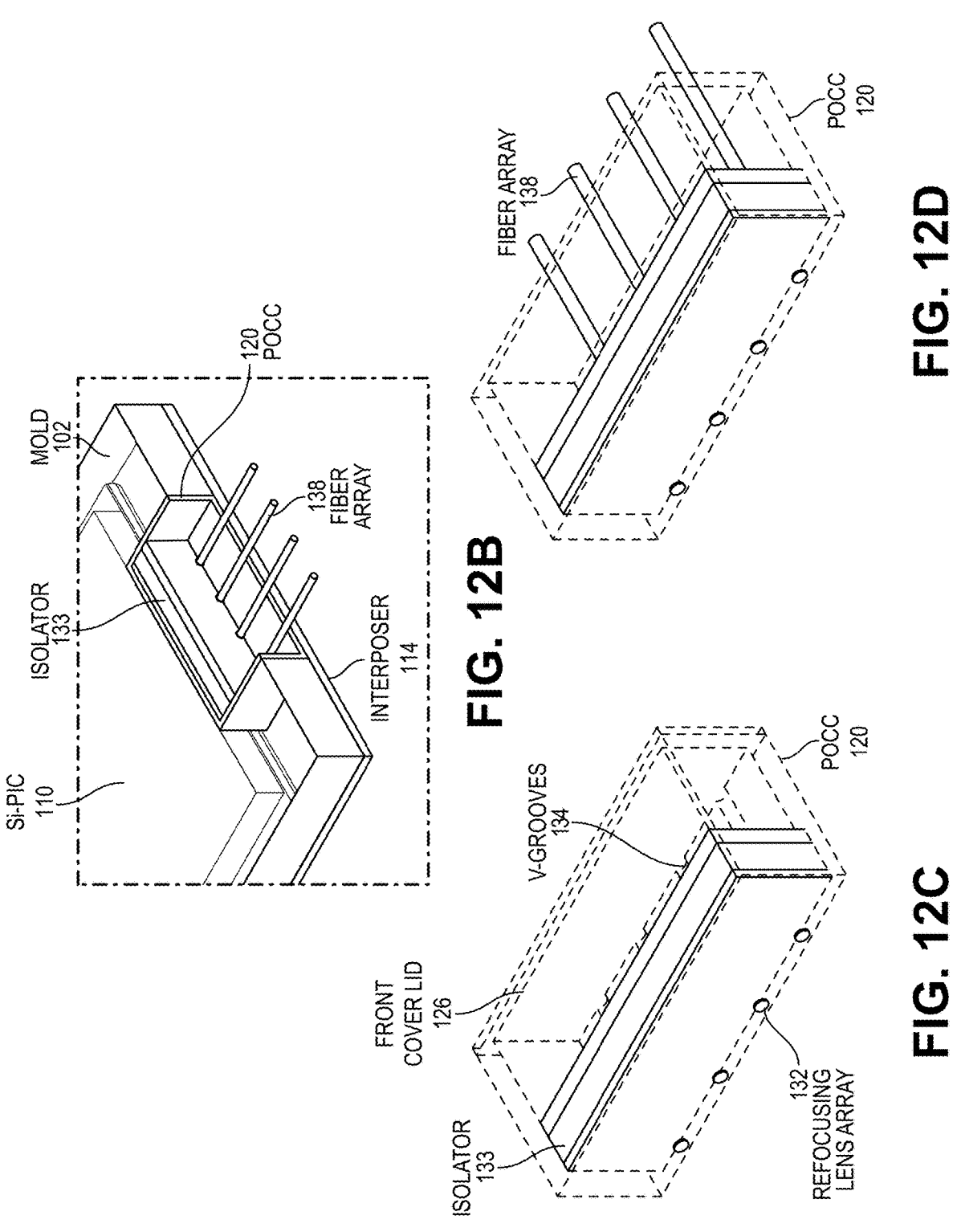

FIGS. 12A-D illustrate an example embodiment of an optical module 1200 with embedded-in-mold (EIM) optical packaging using a hybrid optical/electrical interposer 114 and a pluggable optical coupling connector (POCC) 120 with an integrated fiber array 138. In particular, FIG. 12A shows a cross-section view of the optical module 1200. FIG. 12B shows a three-dimensional (3D) view of the portion of the optical module 1200 that includes the POCC 120. FIG. 12C shows a 3D view of the POCC 120 with a cover lid 126 for protection from mold flow. FIG. 12D shows a 3D view of the POCC 120 with a fiber array 138 embedded in V-grooves 134.

In the illustrated embodiment, optical module 1200 is similar to optical module 800 of FIG. 8A, except the hybrid interposer 114 includes a metal-plated parabolic reflection mirror 119 for beam collimation, and the POCC 120 includes a refocusing lens 132 and an embedded fiber array 138 in V-grooves 134, thus eliminating the separate pluggable FAU (PFAU) component.

In particular, the hybrid (e.g., glass) interposer 114 includes a metal-coated parabolic reflection mirror 119—also referred to as a micro-lens—used for beam collimation, which is fabricated directly as part of the interposer 114.

In the illustrated embodiment, the POCC 120 is a hollow glass block that includes a refocusing lens 132 and V-grooves 134 for fiber array 138 placement. Moreover, the POCC 120 is placed on the interposer 114 such that the refocusing lens 132 is aligned with the collimated beam produced by the parabolic mirror 119 in the interposer 114.

The front side of the POCC 120 is open, and thus during the etching and fabrication process, the opening of the POCC 120 is temporarily covered with a lid 126 to protect the internal cavity from mold flow. After overmolding and other backend processes are complete, the lid 126 is cut off during the singulation process, thus opening the POCC 120 cavity for placement of the fiber array 138 in the V-grooves 134.

FIGS. 13A-E illustrate an example optical packaging process for the optical module 1200 of FIG. 12, and FIG. 14 illustrates an example process flow 1400 for the optical packaging process of FIGS. 13A-E.

Figures 13A, 13B:
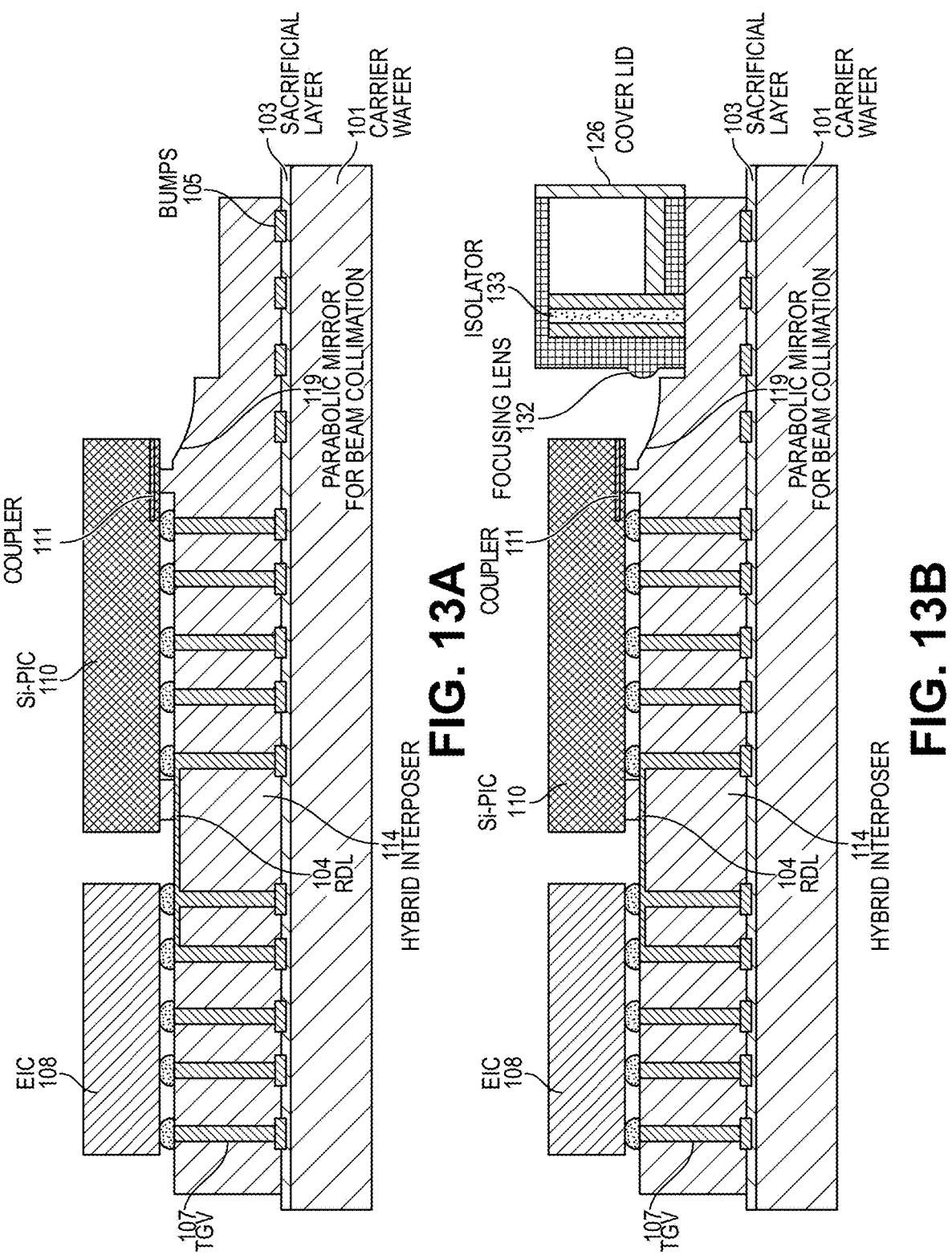
FIGS. 13A-E illustrate an example optical packaging process for the optical module of FIG. 12.

At 1402, a sacrificial layer 103 is deposited on a carrier wafer 101. Next, under bump metallization (UBM) is formed on the sacrificial layer 103, along with Cu-pillar bumps 105 for the redistribution layer (RDL) 104 and other interconnections to be provided by the hybrid interposer 114. The EIC 108 and Si-PIC 110 are then placed face down on, and bonded to, the hybrid interposer 114, aligning the respective interconnections of the various components. As described above, the interposer 114 includes a metal-plated parabolic mirror 119 to collimate the beam generated by the coupler 111 of the Si-PIC 110. Thus, the Si-PIC 110 is preferably aligned using a high-precision aligner (e.g., with accuracy better than 0.5 μm at 3-sigma) to guarantee highly accurate alignment of the beam to the parabolic mirror 119. The resulting structure is shown in FIG. 13A.

At 1404, the POCC 120 is placed on the hybrid interposer 114 with the refocusing lens array 132 aligned with the collimated beam from the parabolic mirror 119 for improved alignment tolerance. The POCC 120 is then bonded using a UV-curable epoxy on the top surface of the trench of the interposer 114. The POCC 120 is also sealed with a temporary lid 126 to protect the internal cavity from mold flow during the overmolding process. The resulting structure is shown in FIG. 13B.

Figures 13C, 13D:
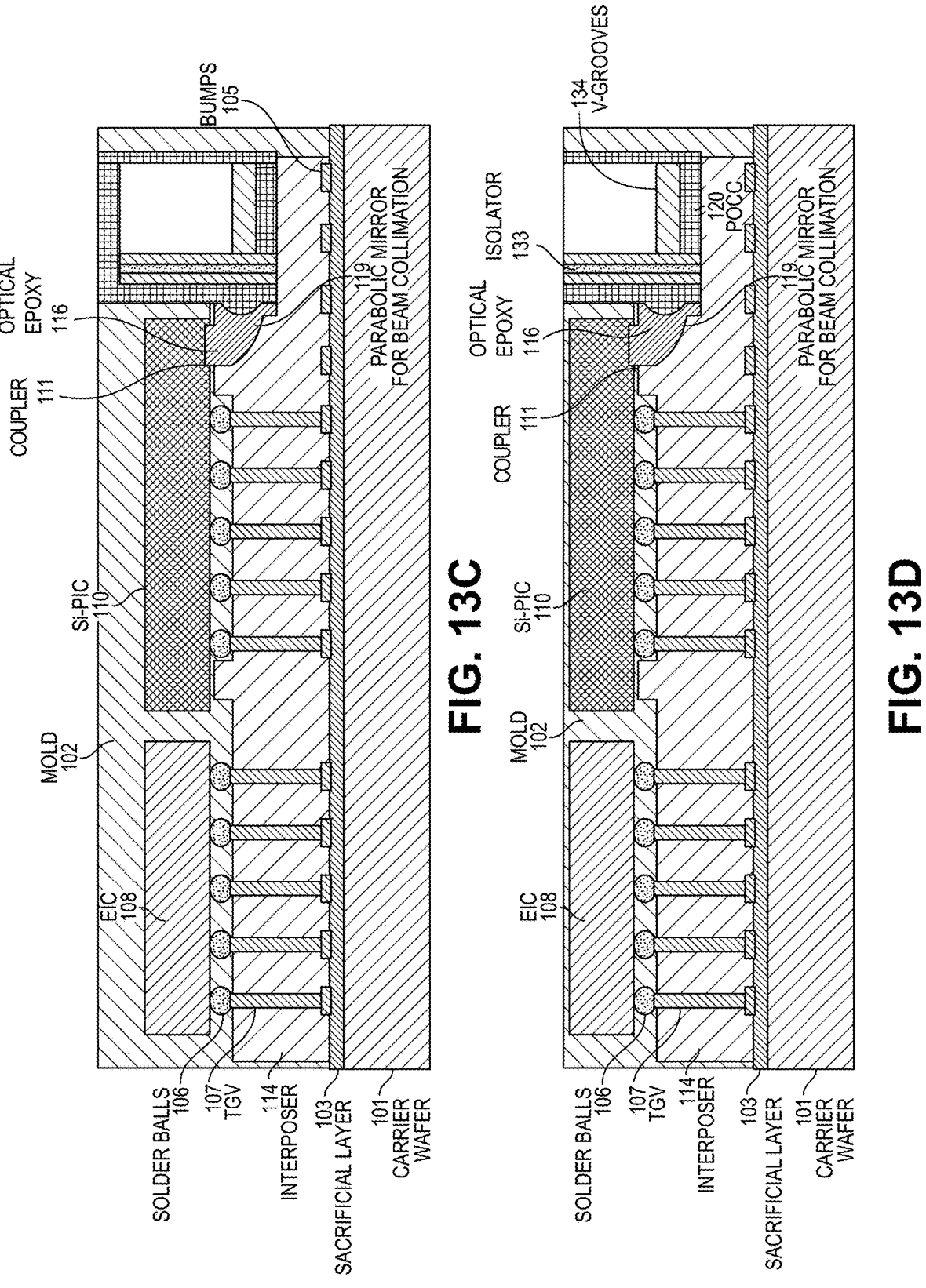

At 1406, optical epoxy 116 is applied to fill the gap between the optical coupling interface 111 of the Si-PIC 110, the parabolic mirror 119, and the refocusing lens 132 of the POCC 120. Overmolding is then used to embed the EIC 108, Si-PIC 110, hybrid interposer 114, and POCC 120 in a mold 102 using polymeric molding materials. The resulting structure is shown in FIG. 13C.

At 1408, the top surface of the mold 102 is grinded to thin the package and expose the POCC 120 opening for subsequent placement of the fiber array 138. The resulting structure is shown in FIG. 13D.

Figure 13E:
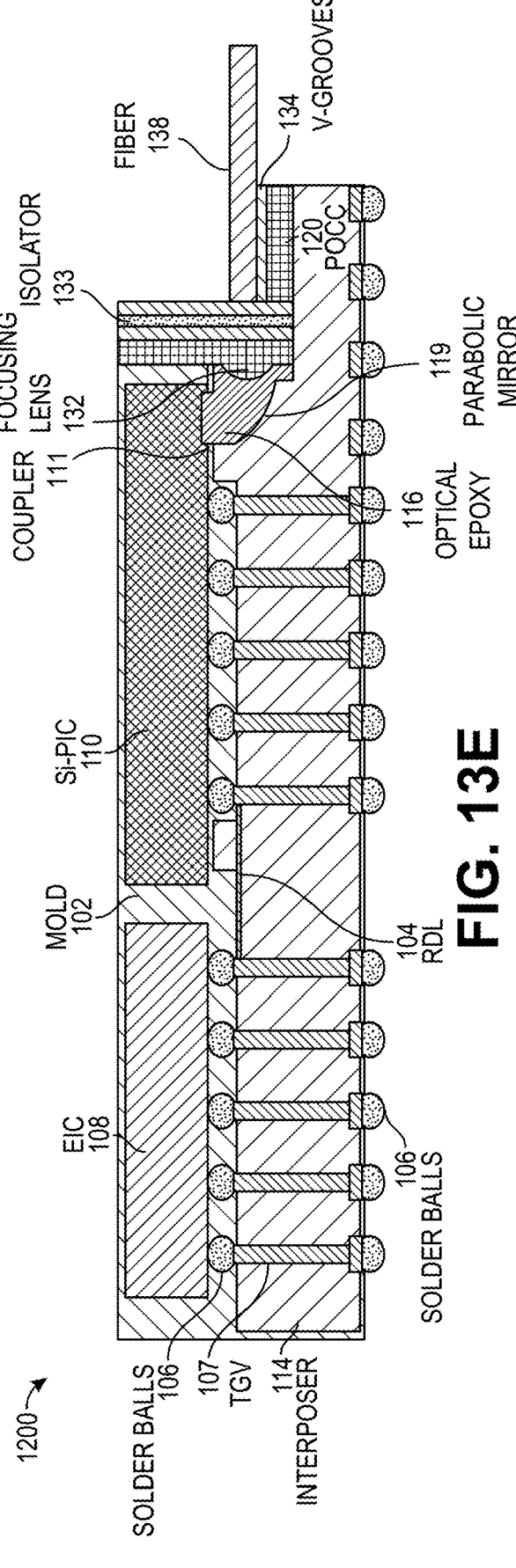

At 1410, the carrier wafer 101 is released, and a ball array 106 is formed below the interposer 114. Singulation is then performed to separate/isolate the resulting module 1200. During singulation, the POCC cover lid 126 is also removed to open the POCC 120 in the horizontal direction, making it easier to place the fiber array 138 in the V-grooves 134. The fiber array 138 is then placed in the V-grooves 134 of the POCC 120 and fixed with an epoxy adhesive, thus creating the optical connection between the coupler 111 of the Si-PIC 110 and the fiber array 138. The completed optical module 1200 is shown in FIG. 13E.

FIGS. 15-18 illustrate other embodiments of an optical module with embedded-in-mold (EIM) optical packaging using a hybrid optical/electrical interposer 114, an Si-PIC 110 with a vertical coupler 111 for optical alignment, and a beam collimation feature.

Figure 15:
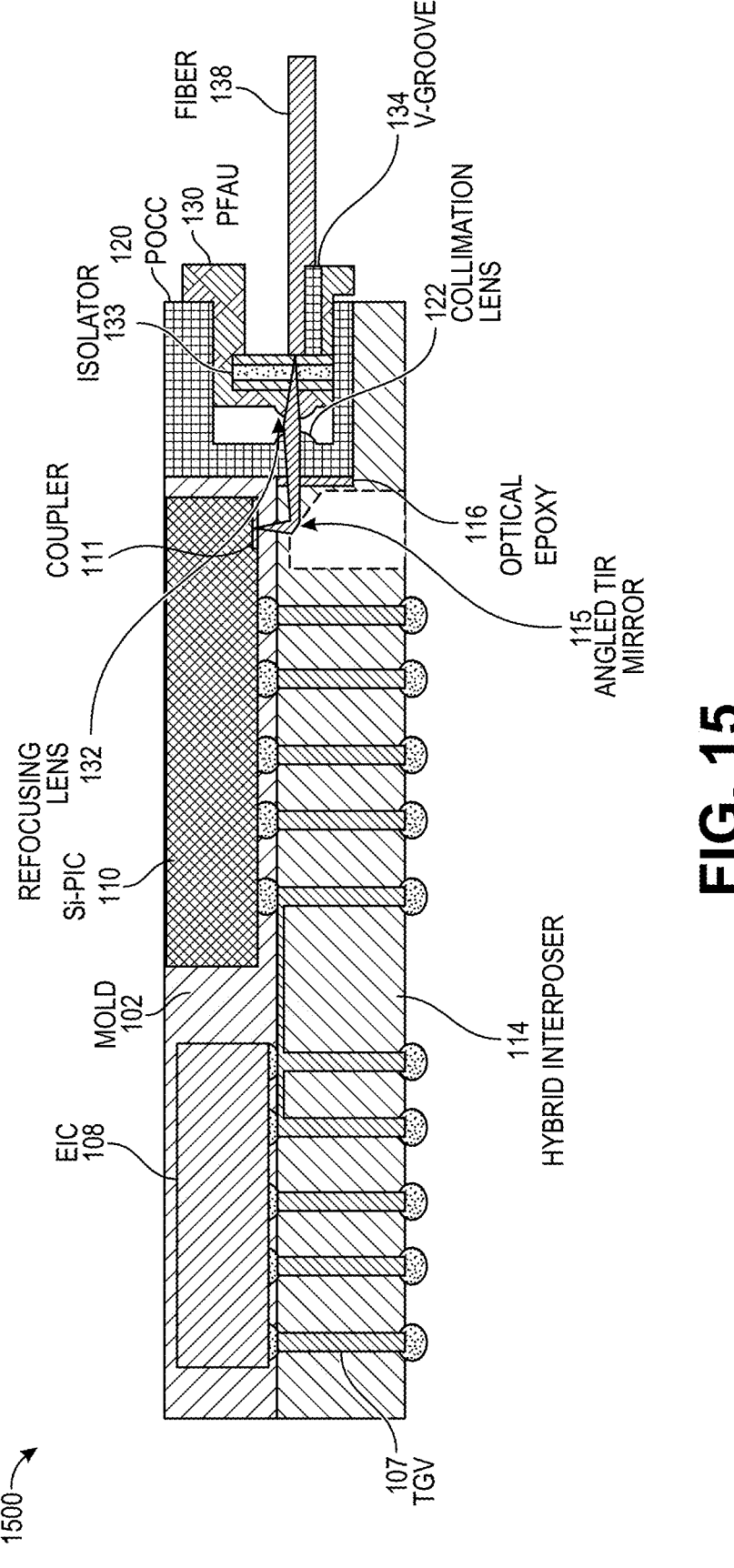
FIG. 15, FIG. 16, FIG. 17, and FIG. 18 illustrate various embodiments of an optical module with EIM optical packaging using a hybrid interposer and an Si-PIC with a vertical coupler for optical alignment.

In the embodiment shown in FIG. 15, the optical module 1500 includes a hybrid glass interposer 114 with an angled TIR mirror 115 to deflect the beam from the vertical coupler 111 by 90 degrees in the horizontal direction into the POCC 120. The POCC 120 and PFAU 130 have the same design as in the optical module 800 of FIGS. 8A-E. Thus, the integration process is similar, except the interposer 114 includes an angled TIR mirror 115 to deflect the beam 90 degrees from the coupler 111 into the POCC 120.

Figure 16:
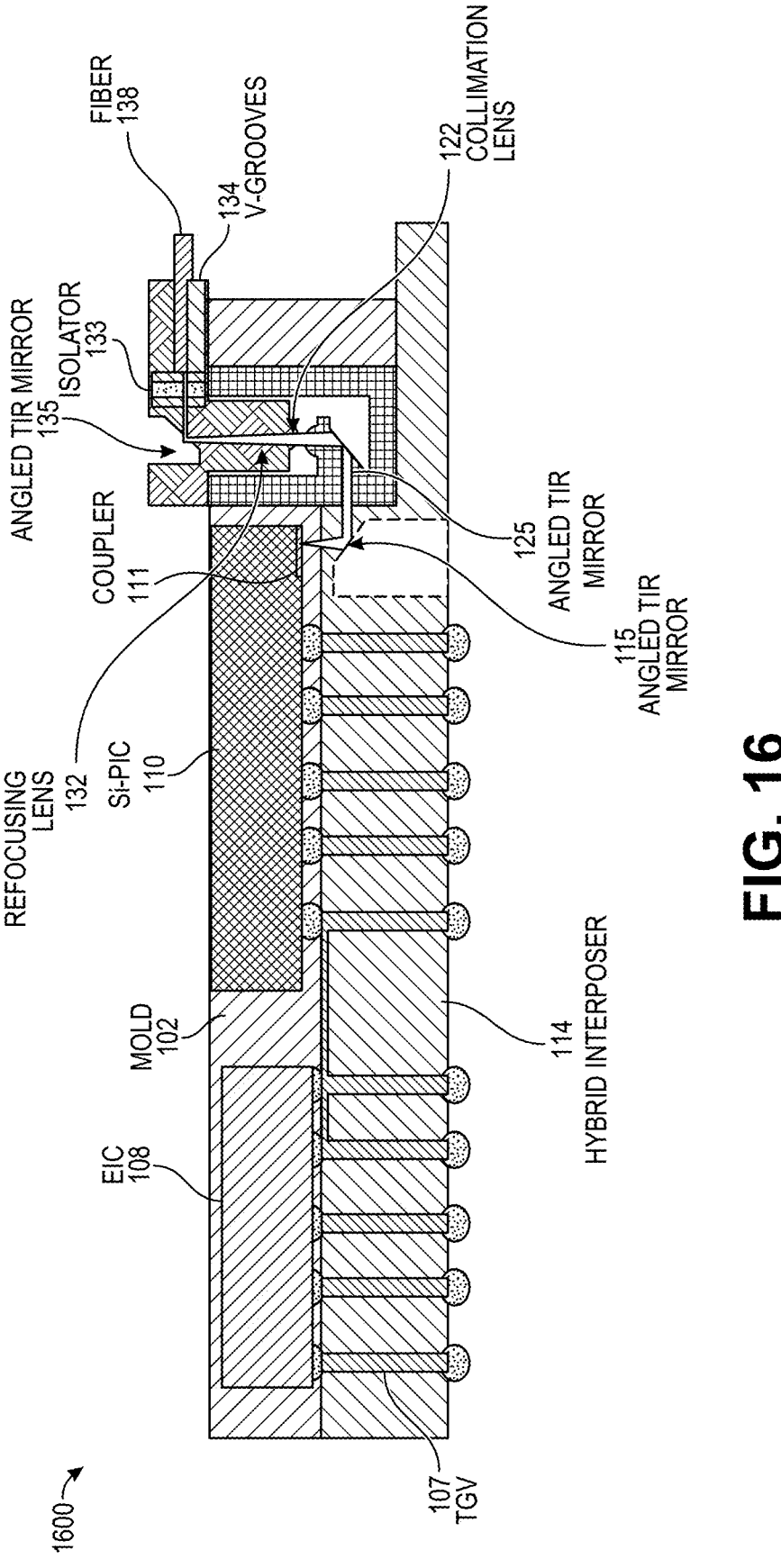

In the embodiment shown in FIG. 16, the optical module 1600 includes a hybrid glass interposer 114 with an angled TIR mirror 115 to deflect the beam 90 degrees horizontally, but the beam is deflected once again in the vertical direction by an angled TIR mirror 125 in the POCC 120. The POCC 120 and PFAU 130 have the same design as in the optical module 1100 of FIGS. 11A-E. Thus, the integration process is similar, except the interposer 114 includes an angled TIR mirror 115 to deflect the beam 90 degrees from the coupler 111 into the POCC 120.

Figures 17, 18:
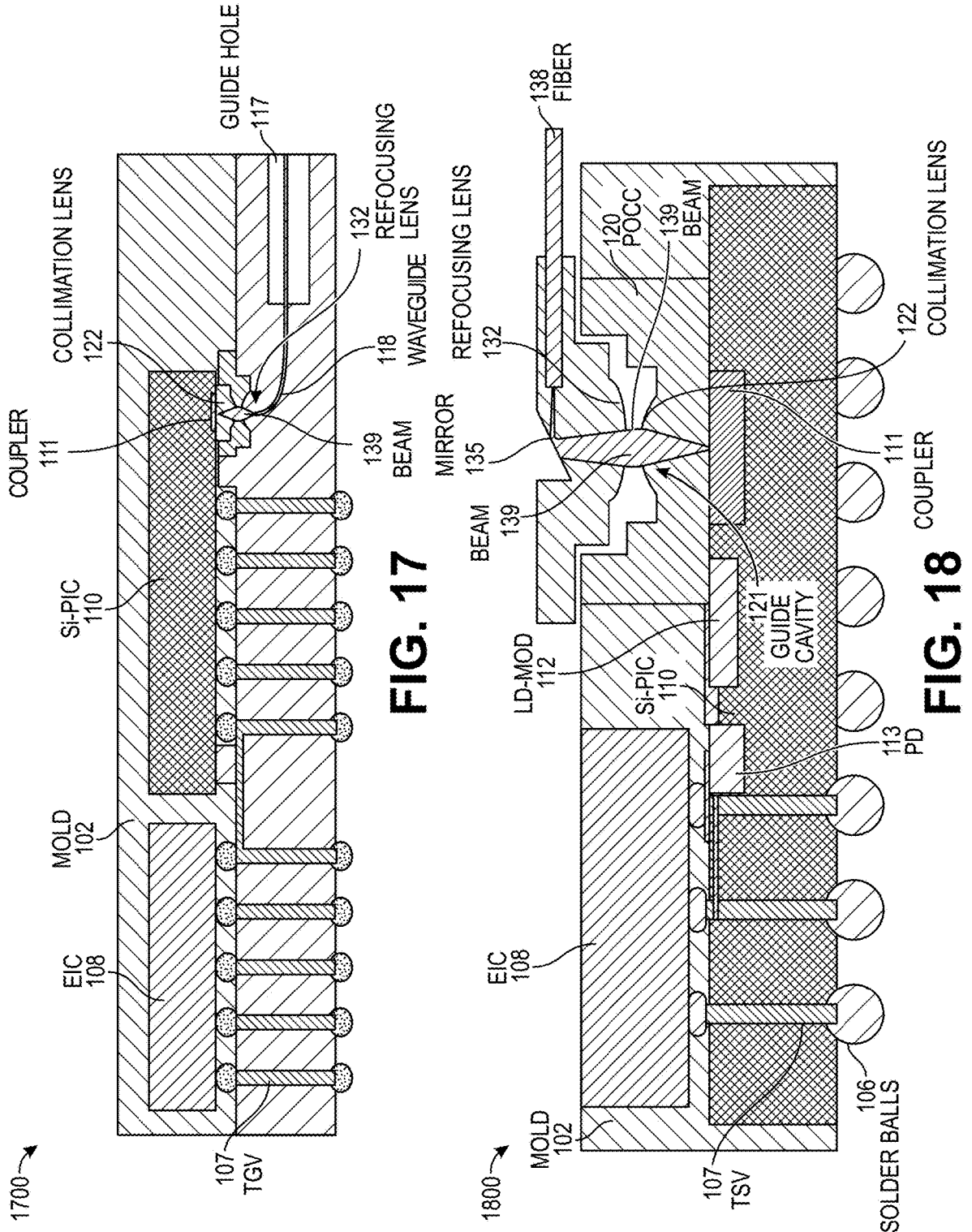

In the embodiment shown in FIG. 17, the optical module 1700 includes a collimation lens 122 attached directly to the Si-PIC 110 and optically aligned with the vertical coupler 111 of the Si-PIC 110. The EIC 108, and the Si-PIC 110 with the attached collimation lens 122, are assembled on the interposer 114 using an embedded-in-mold (EIM) process. The interposer 114 includes a refocusing lens 132, along with an optical waveguide 118 that extends from the refocusing lens 132 into the side facets or guide hole 117 of the interposer 114, which is used to create a passive optical interconnection with an external MPO fiber cable (e.g., MPO 136 of FIG. 5).

In the embodiment shown in FIG. 18, the optical module 1800 has a different optical packaging structure compared to other embodiments of this disclosure, particularly with respect to the use of through-silicon vias (TSVs) 107 in the Si-PIC 110. For example, the Si-PIC 110 includes TSVs 107 for electrical interconnections with the EIC 108. The Si-PIC 110 is placed face up, and the EIC 108 is flip-chip bonded face down on the Si-PIC 110, with electrical connections formed between the EIC 108 and Si-PIC 110 by the TSVs 107 in the Si-PIC 110. The POCC 120 is also directly assembled on the Si-PIC 110, with the collimation lens 122 of the POCC 120 precisely aligned to the coupler 111 of the Si-PIC 110. Further, the Si-PIC 110, along with the EIC 108 and POCC 120 assembled on the Si-PIC 110, are fully embedded in a mold 102 using an embedded-in-mold (EIM) process, and solder balls 106 formed below the Si-PIC 110. The PFAU 130, which includes an angled TIR mirror 135, an isolator (not shown), and an embedded fiber array 138, can be passively plugged to the POCC 120 to create an optical interconnection with external fibers.

Figures 19A, 19B:
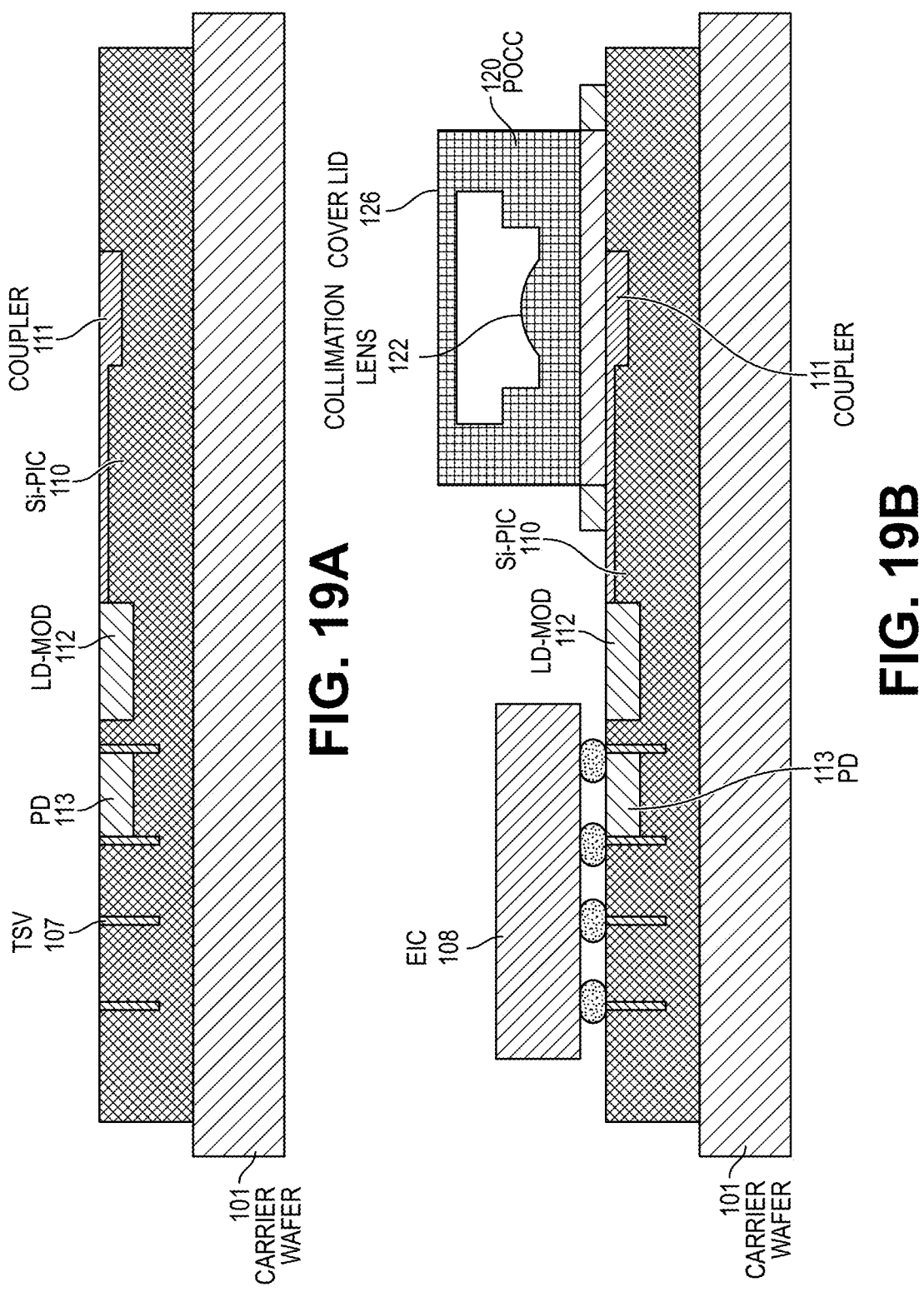
FIGS. 19A-I illustrate an example optical packaging process for the optical module of FIG. 18.
Figures 19C, 19D:
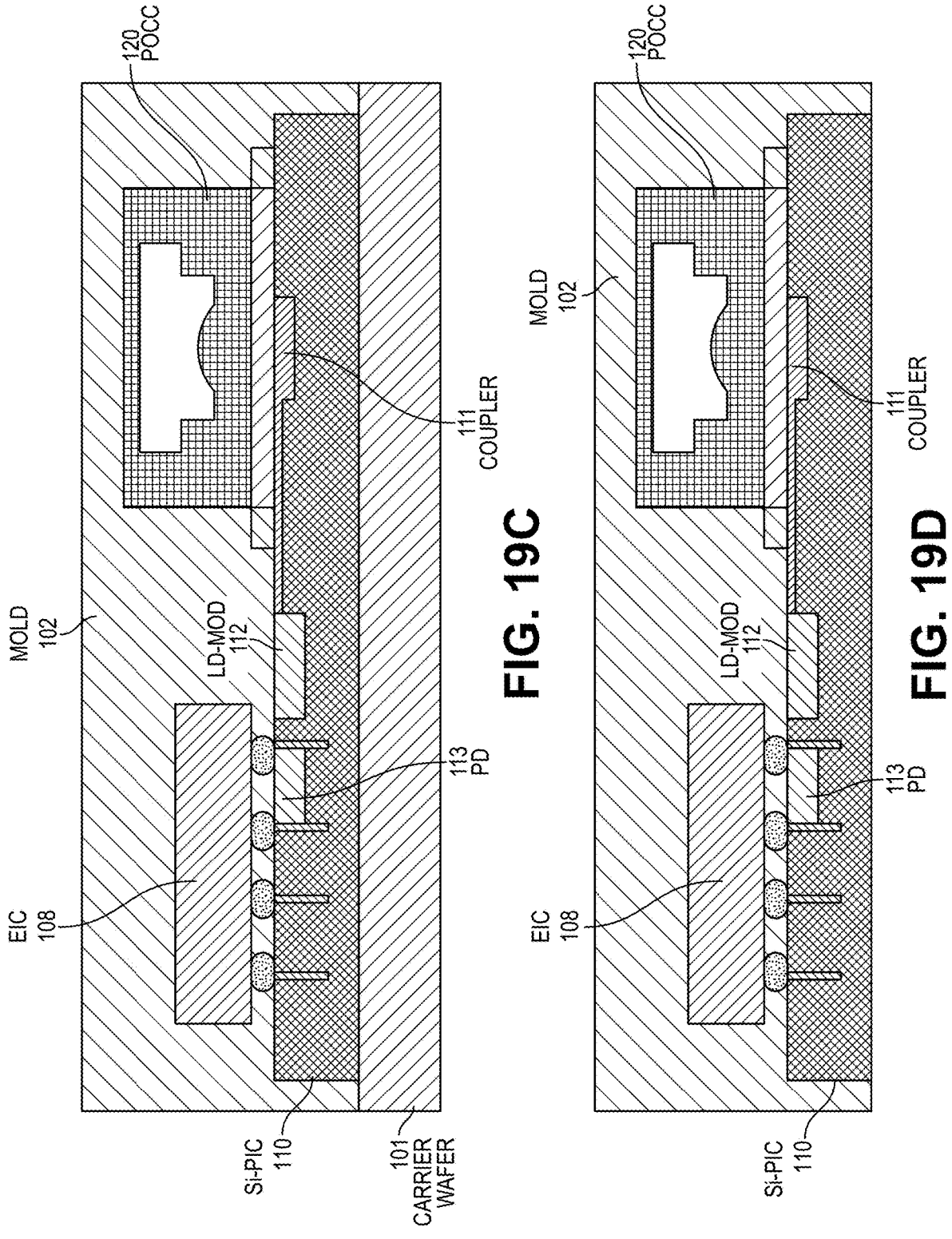
Figures 19E, 19F:
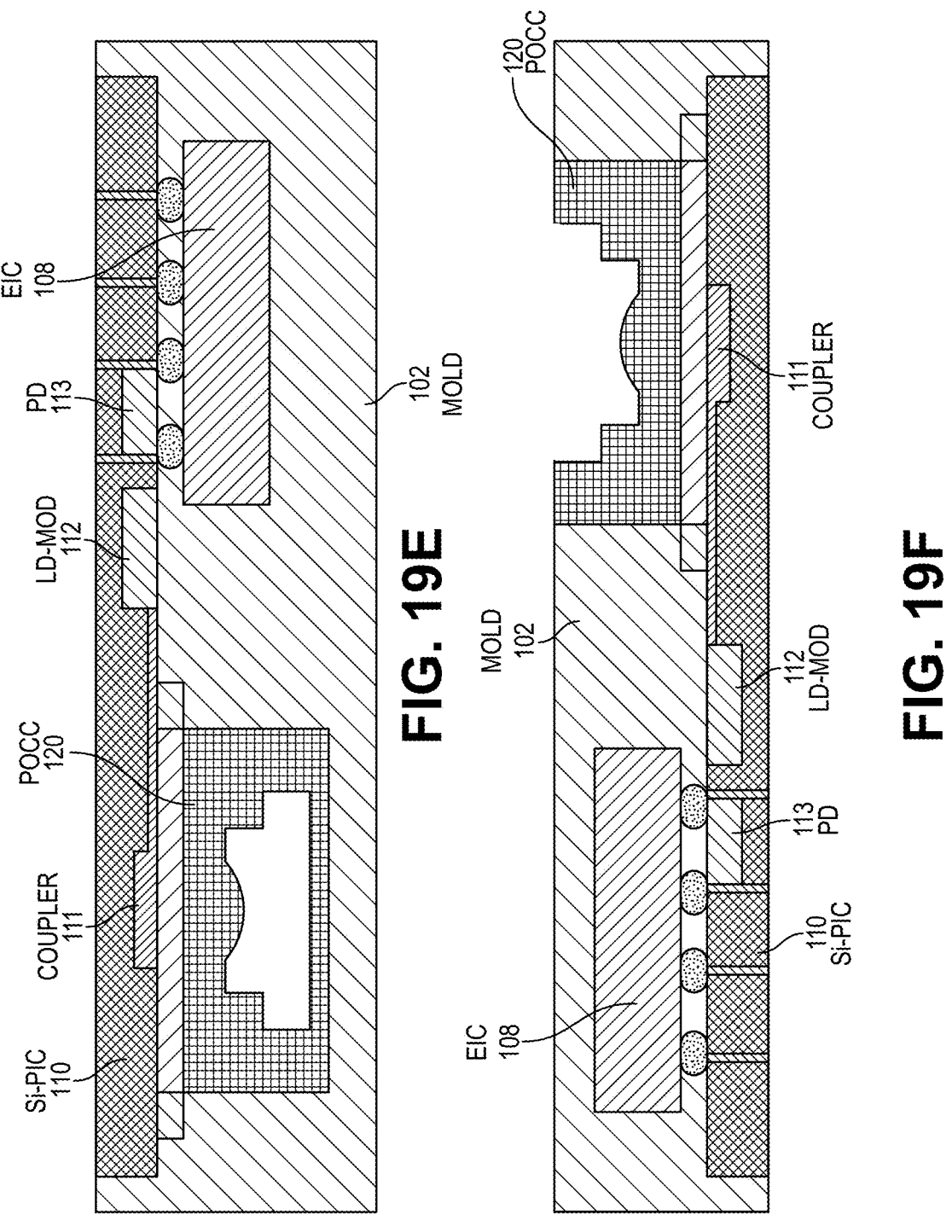
Figures 19G, 19H:
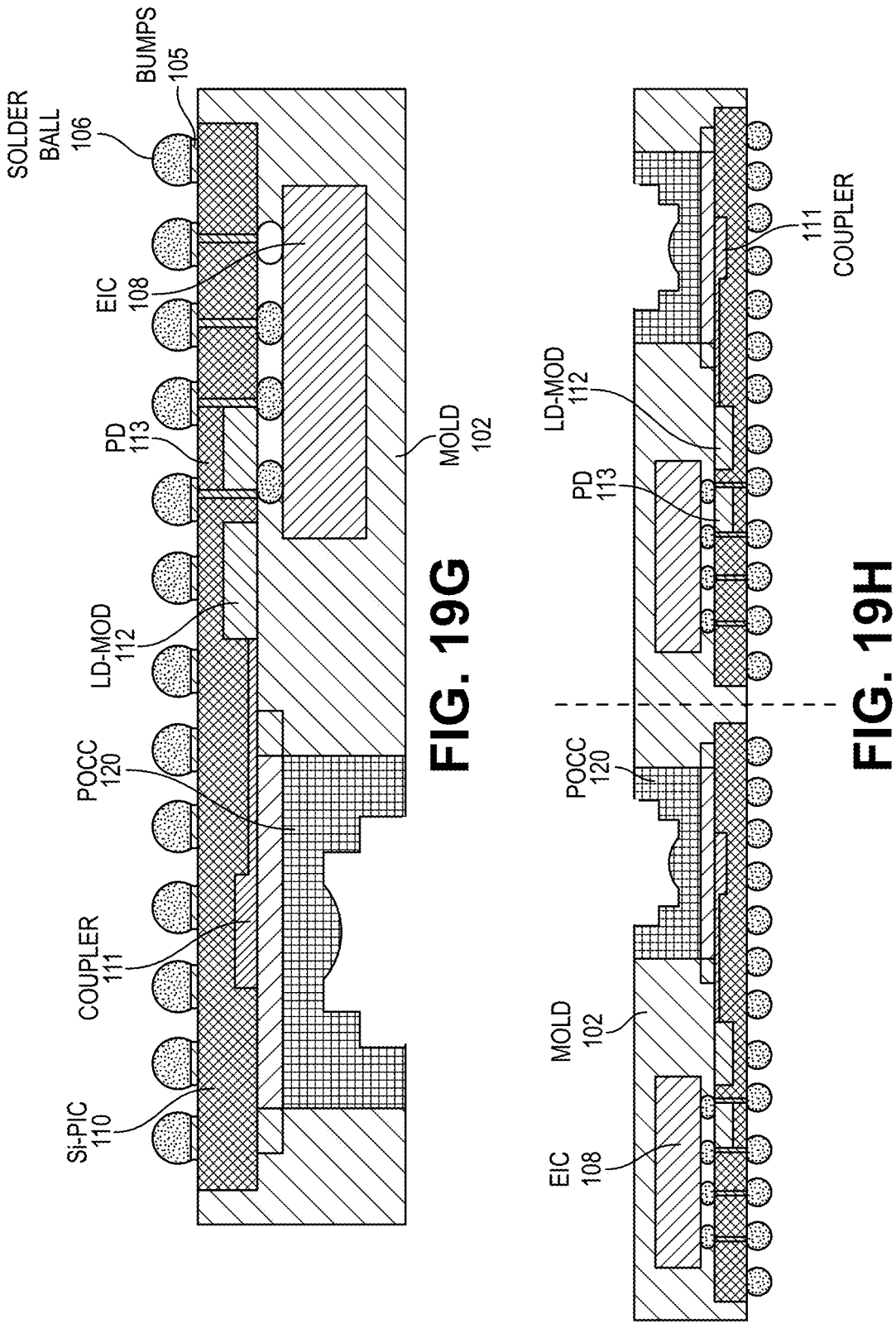
Figure 19I:
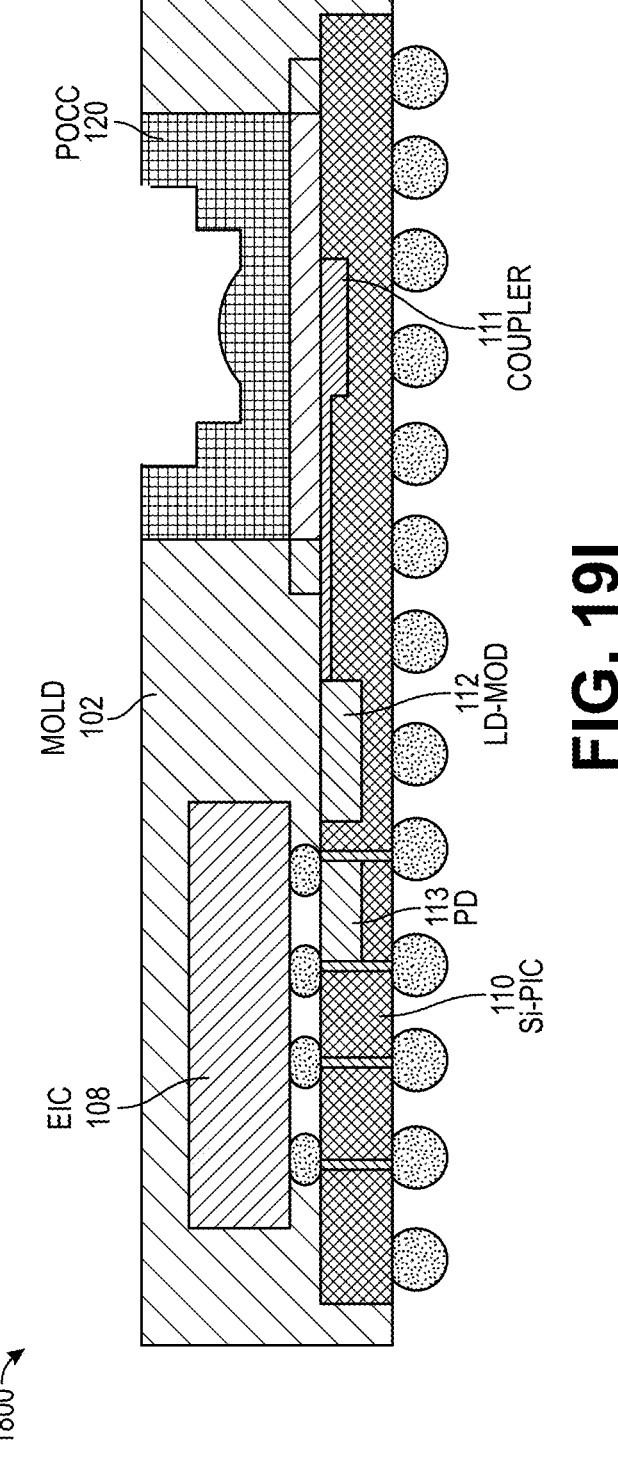
Figure 20:
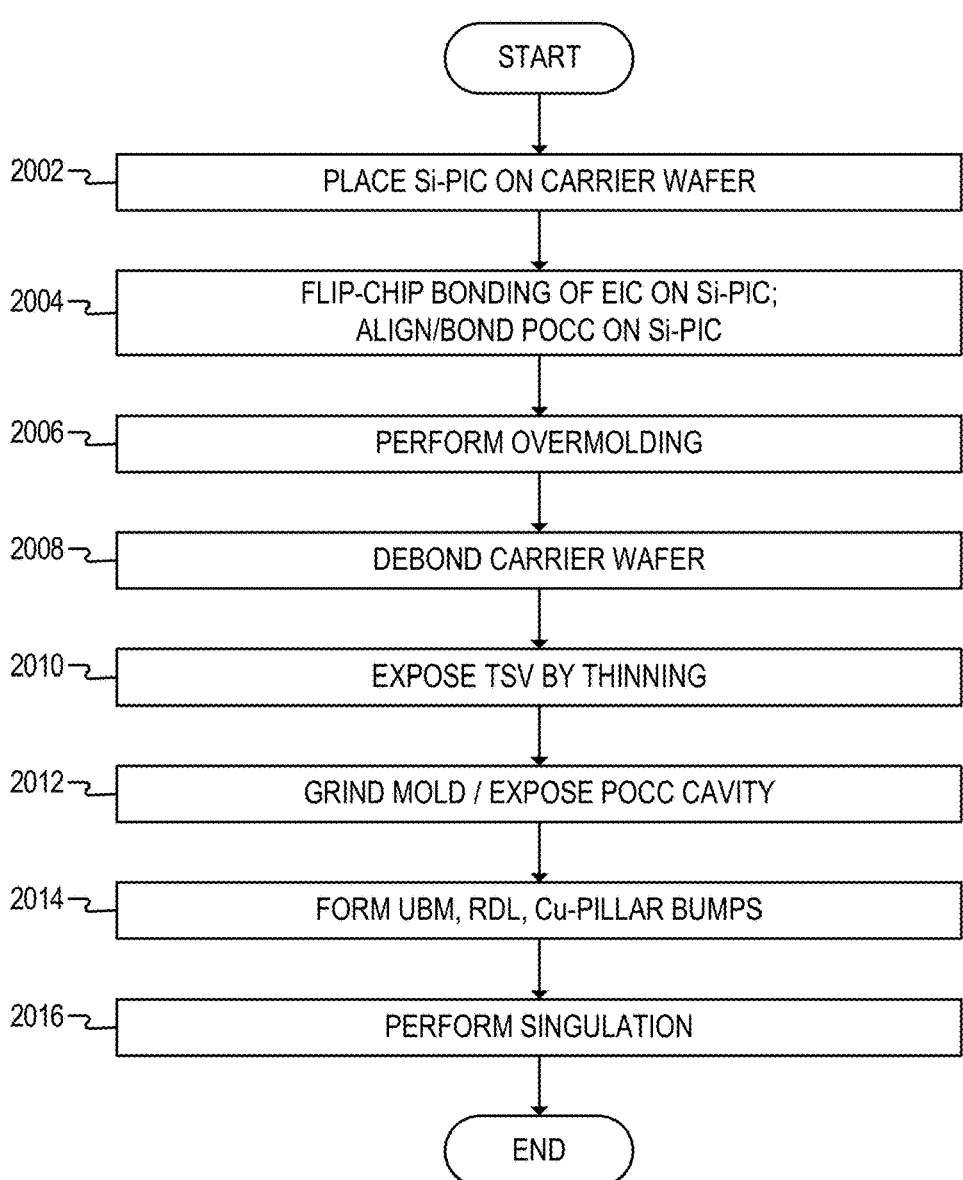
FIG. 20 illustrates an example process flow for the optical packaging process of FIGS. 19A-I.

FIGS. 19A-I illustrate an example optical packaging process for the optical module 1800 of FIG. 18, and FIG. 20 illustrates an example process flow 2000 for the optical packaging process of FIGS. 19A-I.

At 2002, the Si-PIC 110 is placed face up on a carrier wafer 101, as shown in FIG. 19A.

At 2004, the EIC 108 is flip-chip bonded face down on the Si-PIC 110, with alignment to the TSVs 107 in the Si-PIC 110 for electrical interconnections between the EIC 108 and Si-PIC 110. The POCC 120 is also bonded on the Si-PIC 110, with the collimation lens 122 of the POCC 120 precisely aligned to the coupler 111 of the Si-PIC 110. In addition, the POCC 120 top surface is protected with a temporary cover lid 126 to prevent contamination from mold flow. The resulting structure is shown in FIG. 19B.

At 2006, overmolding is performed to embed the Si-PIC 110, EIC 108, and POCC 120 in a polymeric mold 102, as shown in FIG. 19C.

At 2008, the carrier wafer 101 is debonded, as shown in FIG. 19D.

At 2010, the TSVs 107 are exposed by thinning/grinding the back side of the Si-POC 110, as shown in FIG. 19E.

At 2012, the top surface of the mold 102 is grinded to expose the POCC 120 cavity, as shown in FIG. 19F.

At 2014, under bump metallization (UBM), along with bumps 105 and solder balls 106 for the redistribution layer (RDL) and other interconnections, are formed on the back side of the Si-PIC 110, as shown in in FIG. 19G.

At 2016, singulation is performed to separate/isolate the resulting module 1800, as shown in FIG. 19H. The completed optical module 1800 is shown in FIG. 19I.

Embedded-in-Mold Optical Packaging Using Omnidirectional Interconnect (ODI) Processing In some embodiments, an omnidirectional interconnect (ODI) process is used for the electronic-photonic heterogeneous integration of an optical module by embedding the EIC 108 and Si-PIC 110, and even the POCC 120, in a mold 102, as shown and described below in connection with the following embodiments.

FIGS. 21A-G illustrate an example omnidirectional interconnect (ODI) packaging process for an optical module 2100 with an EIC 108, Si-PIC 110, and pluggable optical coupling connector (POCC) 120 embedded in mold, and FIG. 22 illustrates an example process flow 2200 for the optical packaging process of FIGS. 21A-G.

In the illustrated embodiment, the optical module 2100 is integrated using an ODI/EIM packaging process in which the EIC 108, Si-PIC 110, and POCC 120 are embedded in a mold 102 with beam collimation and pluggable optical packaging features, as described below.

Figure 21A:
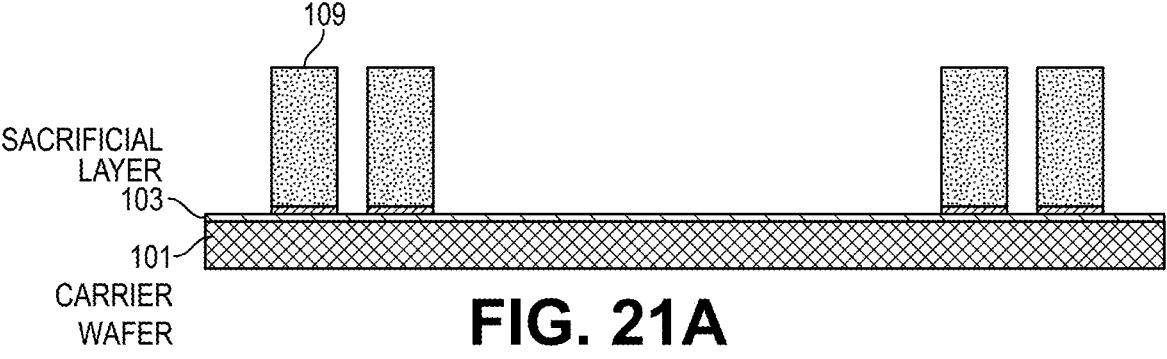
FIGS. 21A-G illustrate an example omnidirectional interconnect (ODI) packaging process for an optical module with an EIC, Si-PIC, and POCC embedded in mold.

At 2202, pillars 109 are formed on a sacrificial layer 103 of a glass carrier wafer 101, as shown in FIG. 21A.

Figure 21B:
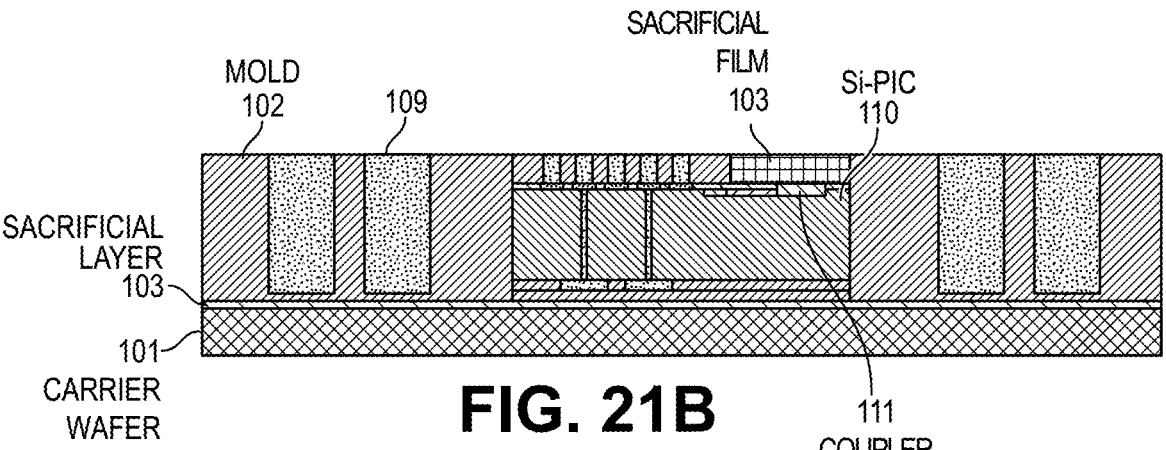

At 2204, the Si-PIC 110 is placed on the carrier wafer 101, and the optical coupler 111 of the Si-PIC 110 is covered with sacrificial film 103 for protection from mold flow. The Si-PIC 110, with the sacrificial film 103 applied to the optical coupler 111 for protection, is then embedded in a mold 102 along with the pillars 109. The resulting structure is shown in FIG. 21B.

Figure 21C:
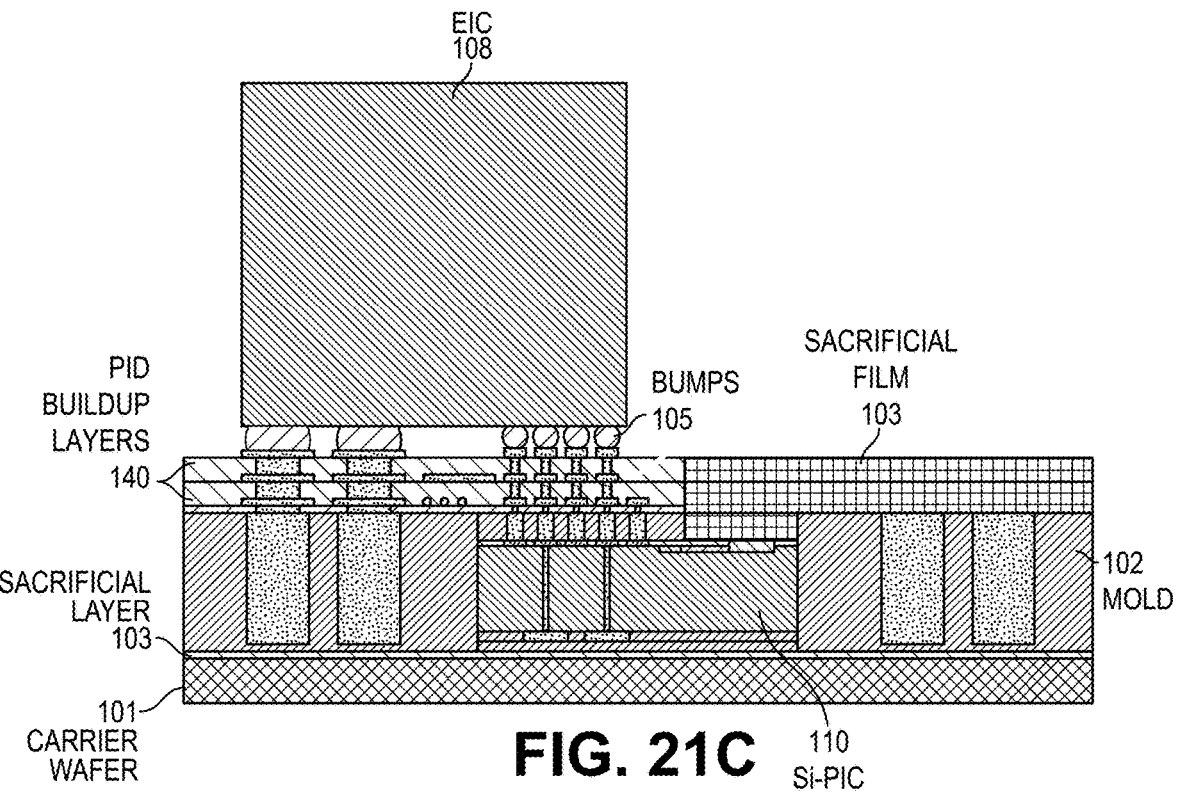

At 2206, photo-imageable dielectric (PID) buildup layers 140 are formed, with sacrificial film inserts 103 in the area where the POCC 120 will be placed. Next, micro-logic bumps (MLB) 105 are fabricated on the PID buildup layers 140, and then EIC 108 is bonded on the MLBs 105 to interconnect with the Si-PIC 110. The resulting structure is shown in FIG. 21C.

Figure 21D:
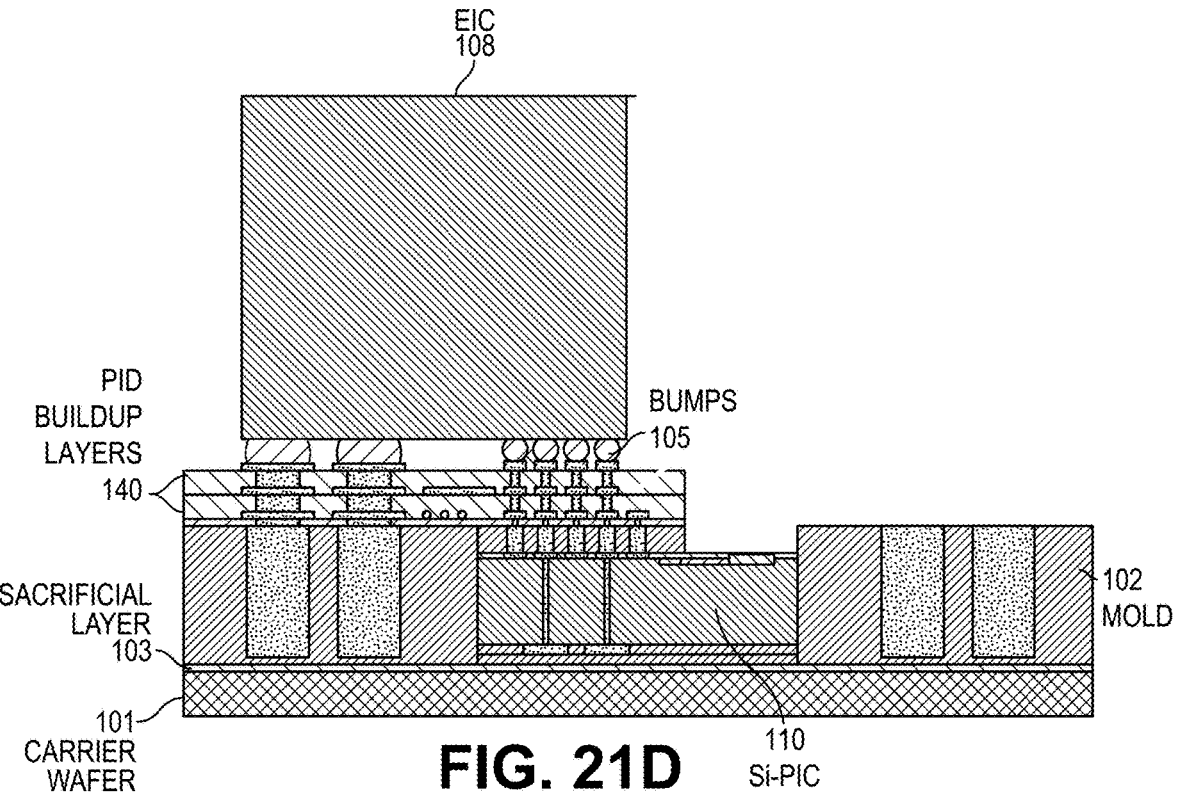

At 2208, the sacrificial layers 103 are removed from the PID buildup layers 140, as shown in FIG. 21D.

Figure 21E:
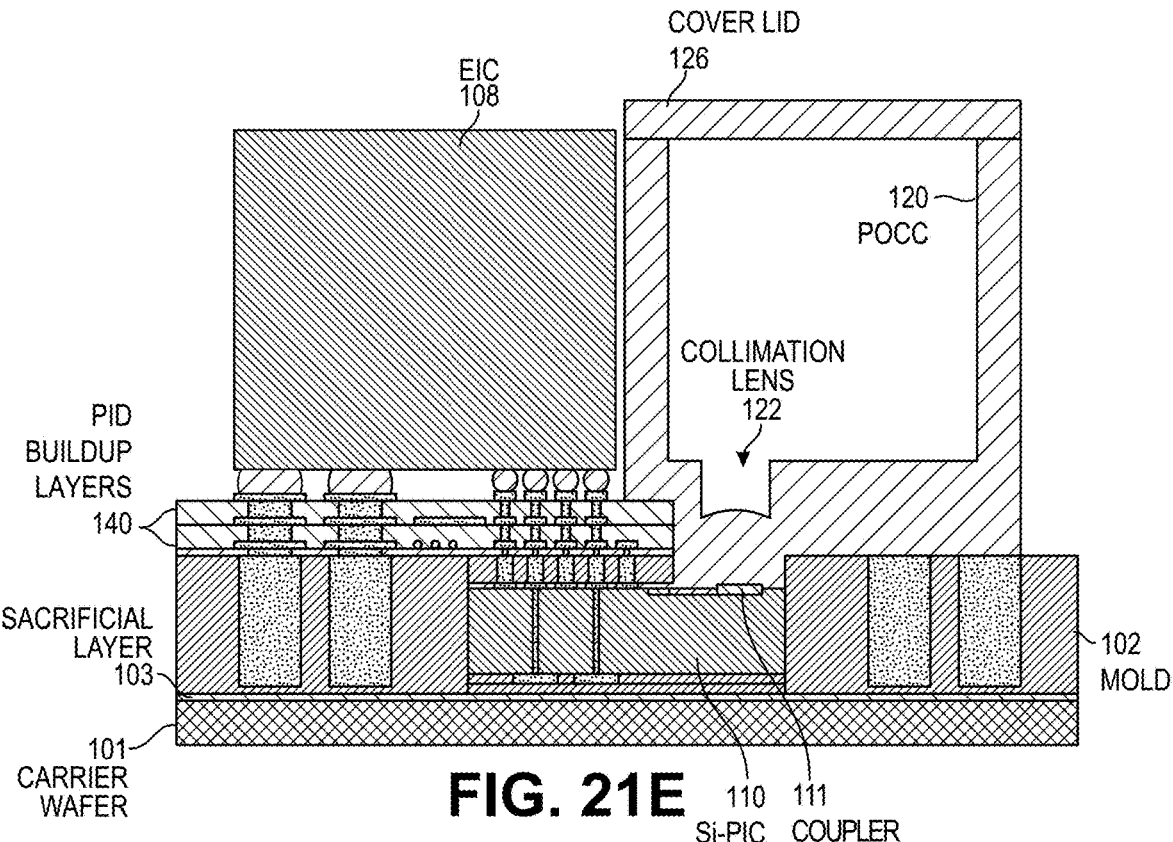

At 2210, the POCC 120 is assembled above the Si-PIC 110. In particular, the POCC 120 has a collimation lens 122 in the cavity to couple and collimate the beam from the coupler 111 of the Si-PIC 110. Thus, the collimation lens 122 of the POCC 120 is aligned to the coupler 111 of the Si-PIC 110. The top of the POCC 120 is covered with a temporary cover lid 126 to protect the inside cavity from mold material during the ODI process. Next, optical epoxy is applied to cover the coupler 111 of the Si-PIC 110, which is transparent at the wavelength of the beam for which the optical module operates. Alternatively, epoxy can be applied to the peripherals of the POCC 120 after the POCC 120 is aligned to the coupler 111 of the Si-PIC 110. In this case, the epoxy does not need to be transparent at the working wavelength. The resulting structure is shown in FIG. 21E.

Figure 21F:
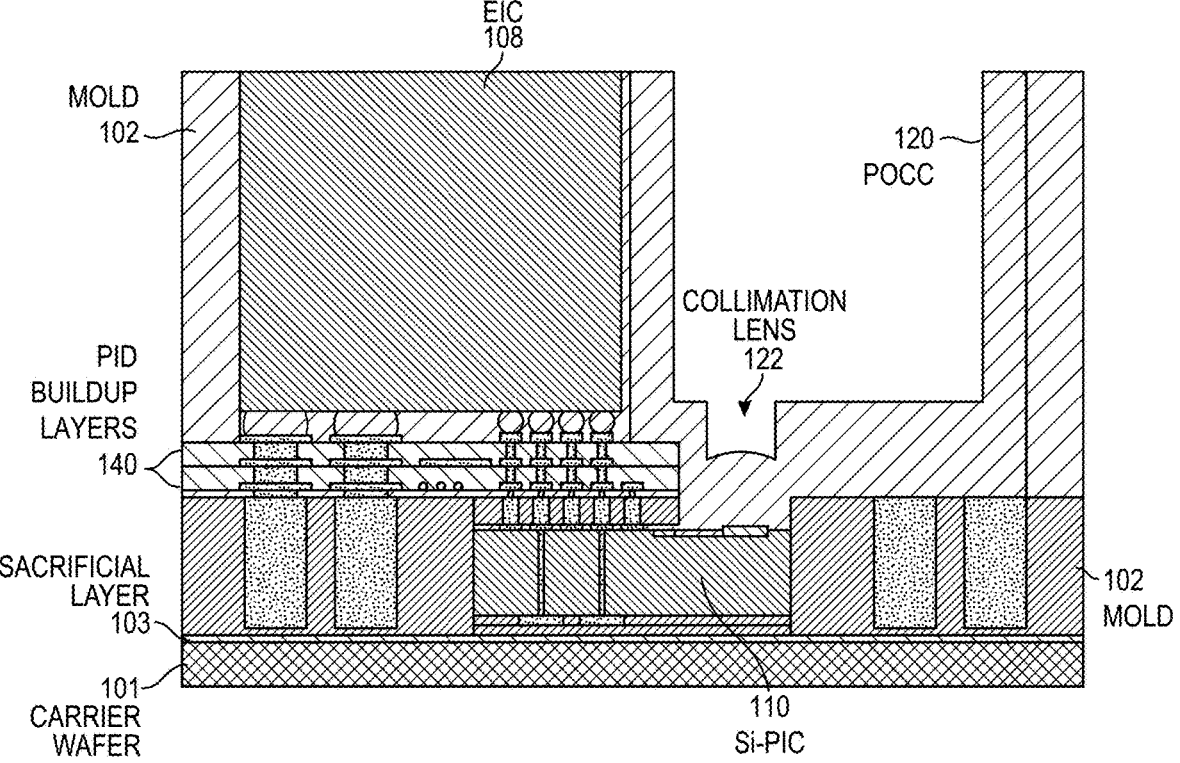

At 2212, after the alignment and assembly of the POCC 120, overmolding is performed to embed the EIC 108 and POCC 120 in a mold 102. Next, the top surface is grinded to remove the temporary cover lid 126 from the POCC 120 and open the guide cavity. The resulting structure is shown in FIG. 21F.

Figure 21G:
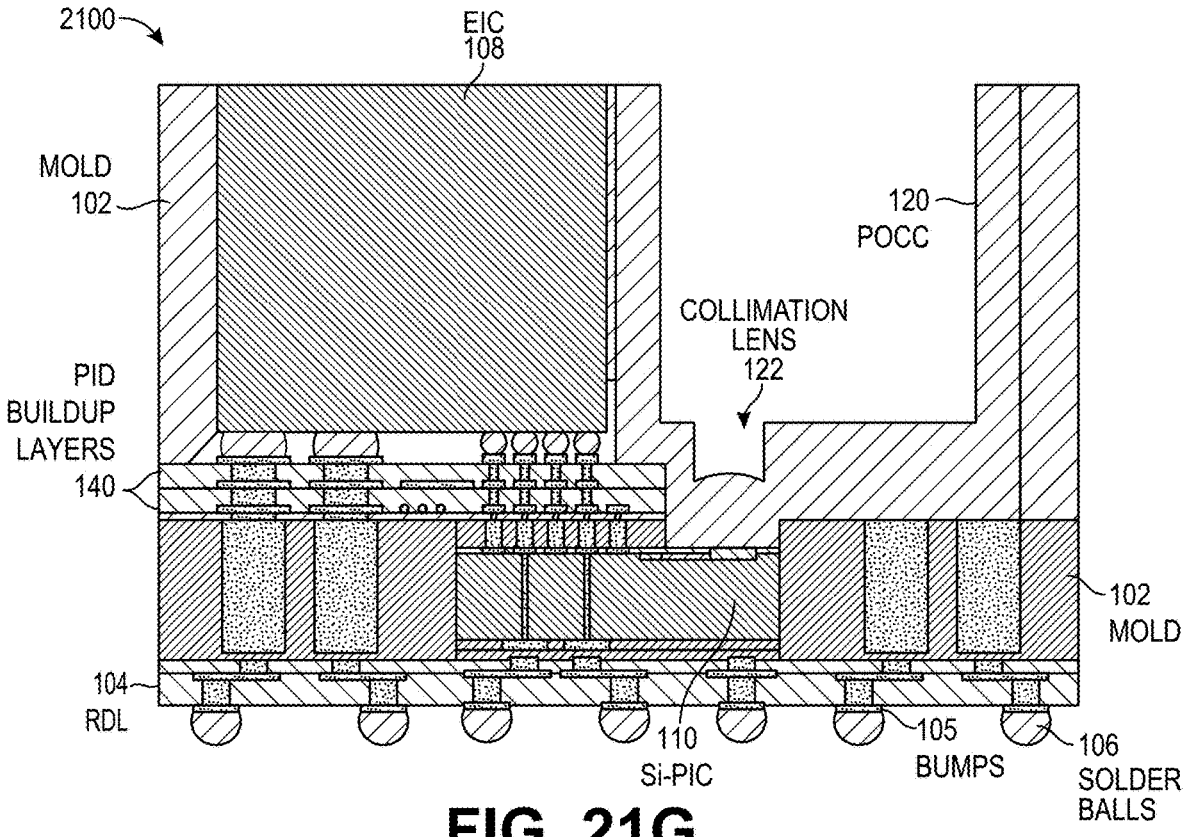

At 2214, the carrier wafer 101 is removed, and RDL 104, bumping 105, and solder balls 106 are fabricated at the package-side bump (PSB) side of the integrated module. Finally, singulation is performed to separate/isolate the resulting module 1800. The completed optical module 2100 is shown in FIG. 21G.

FIGS. 23A-G illustrate an example omnidirectional interconnect (ODI) packaging process for an optical module 2300 with an EIC 108 and an Si-PIC 110 with a vertical coupler 111 embedded in mold, and FIG. 24 illustrates an example process flow 2400 for the optical packaging process of FIGS. 23A-G.

In the illustrated embodiment, the optical module 2300 is integrated using an ODI/EIM packaging process in which the EIC 108 and Si-PIC 110 are embedded in mold 102, with protection film 103 to cover the vertical coupler 111 of the Si-PIC 110 during the molding process.

Figures 23A, 23B, 23C:
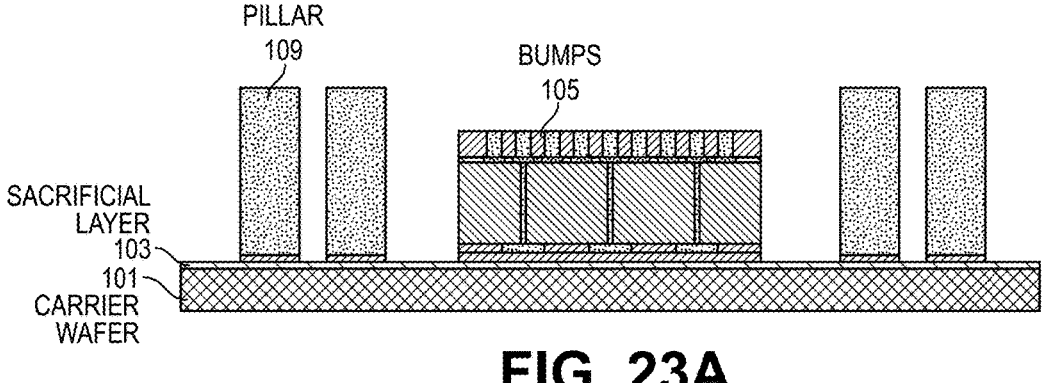
FIGS. 23A-G illustrate an example ODI packaging process for an optical module with an EIC, and an Si-PIC with a vertical coupler, embedded in mold.

At 2402, pillars 109 and micro-logic bumps (MLB) 105 are formed on a sacrificial layer 103 of a glass carrier wafer/panel 101, as shown in FIG. 23A.

At 2404, the pillars 109 and micro-logic bumps (MLB) 105 are embedded in a 1$^{st}$ mold 102, as shown in FIG. 23B.

At 2406, photo-imageable dielectric (PID) buildup layers 140 are formed, and micro-logic bumps (MLB) 105 are fabricated on the PID buildup layers 140. Next, the EIC 108 and Si-PIC 110 are attached/bonded to the MLB interface 105 on the PID buildup layers 140, and the vertical coupler 111 of the Si-PIC 110 is covered with sacrificial protective film 103 for protection from mold flow. The resulting structure is shown in FIG. 23C.

Figure 23D:
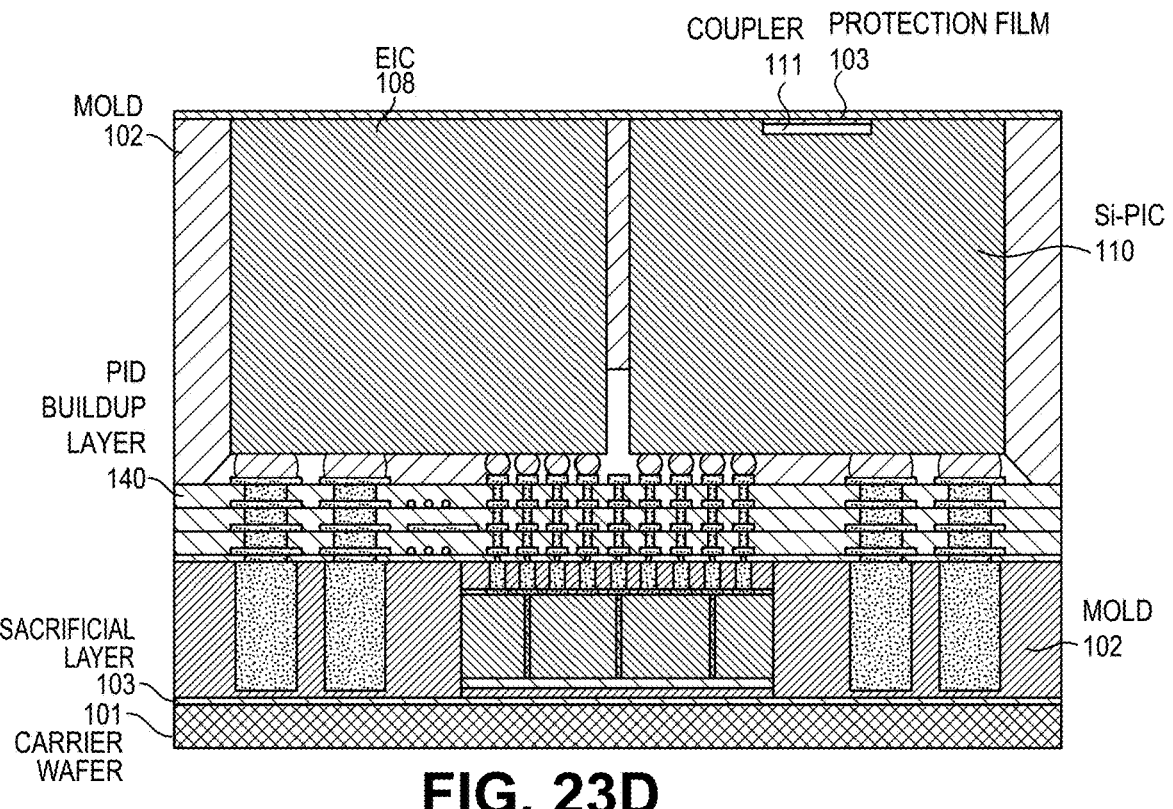

At 2408, overmolding is performed to embed the EIC 108 and the Si-PIC 110 (with the protective film 103 on the coupler 111) in a 2$^{nd}$ mold 102, along with top-surface grinding and back-side metallization (leaving the protection film 103 on the coupler 111). The resulting structure is shown in FIG. 23D.

Figure 23E:
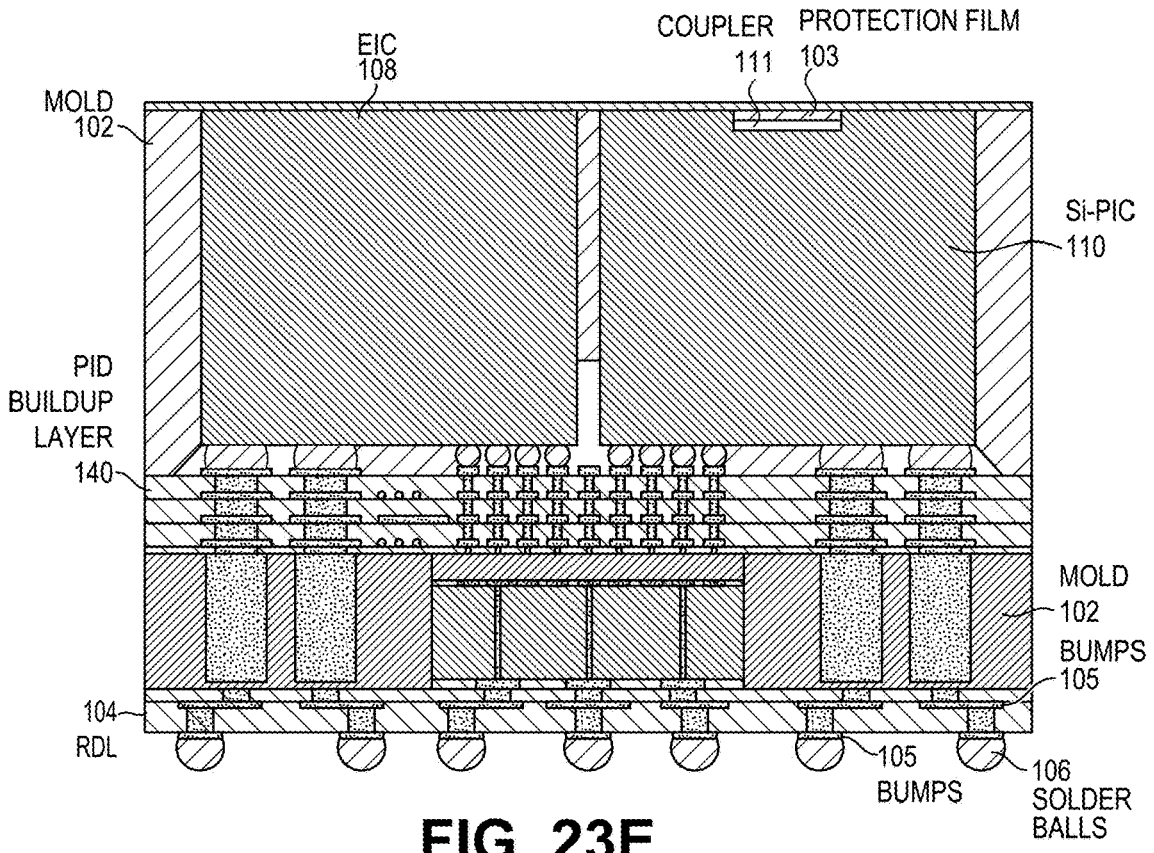

At 2410, the carrier wafer 101 is removed, and RDL 104, bumping 105, and solder balls 106 are fabricated at the package-side bump (PSB) side of the integrated module. The resulting structure is shown in FIG. 23E.

Figures 23F, 23G:
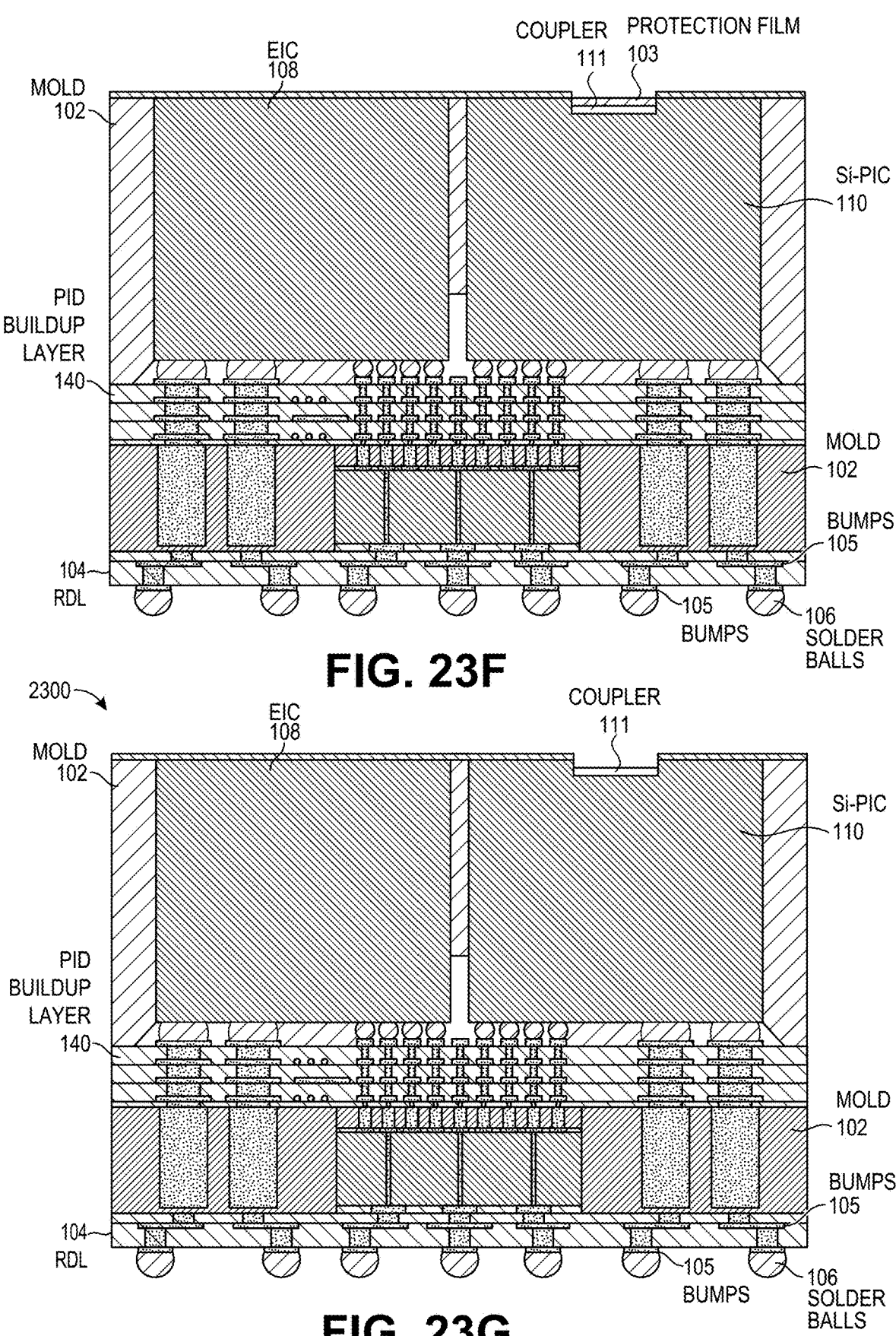

At 2412, laser skiving is performed and the coupler region 111 is revealed (with the protection film 103 still applied) via laser spallation, as shown in FIG. 23F.

At 2414, singulation is performed to separate/isolate the resulting module 2300, and the protection film 103 is removed from the coupler 111 to enable fiber array unit (FAU) coupling (not shown). The completed optical module 2300 is shown in FIG. 23G.

Figure 25:
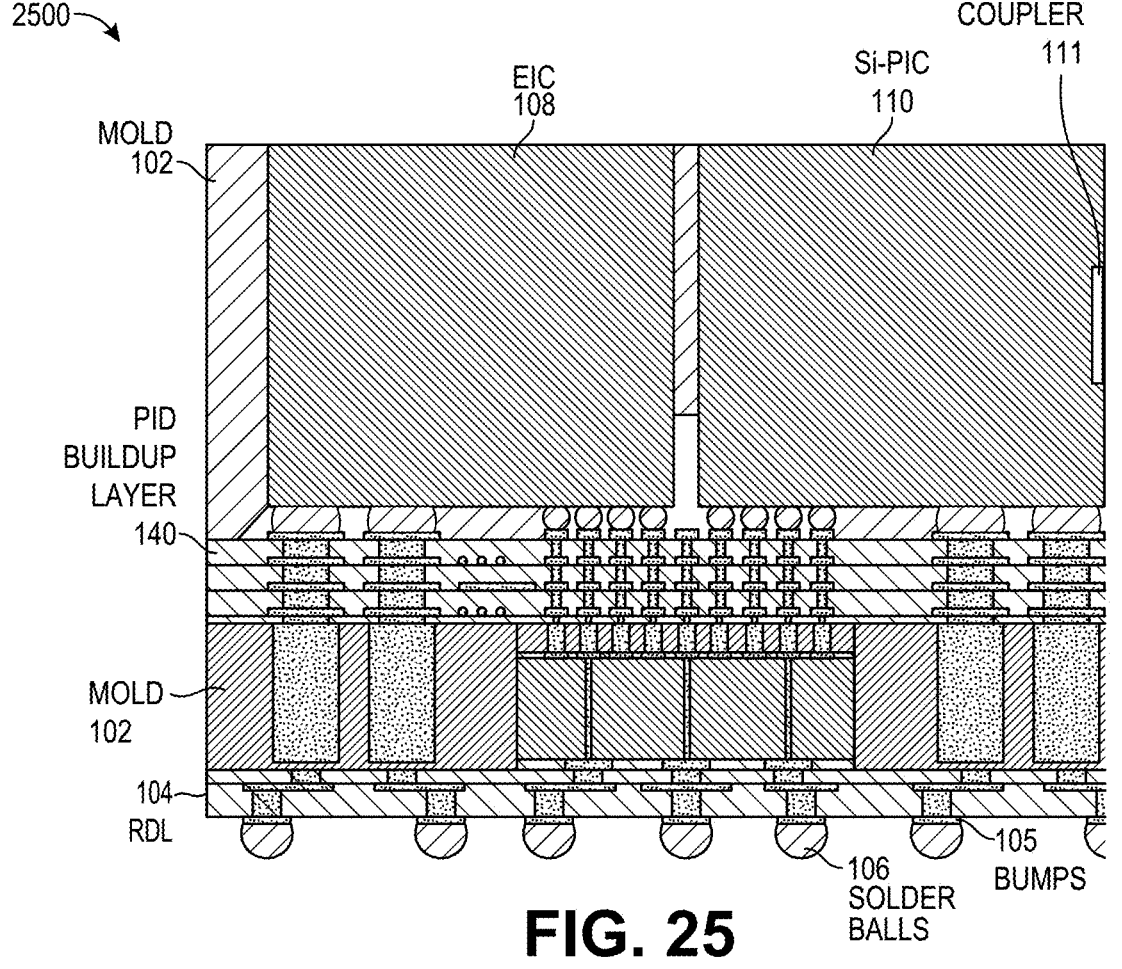
FIG. 25 illustrates an example embodiment of an optical module with an EIC, and an Si-PIC with an edge coupler, embedded in mold using ODI packaging.

FIG. 25 illustrates an example embodiment of an optical module 2500 with an EIC 108 and an Si-PIC 110 with an edge coupler 111 embedded in mold using omnidirectional interconnect (ODI) packaging. In the illustrated embodiment, the optical module 2500 is integrated using an ODI/EIM packaging process in which the EIC 108 and Si-PIC 110 are embedded in mold 102, with protection film 103 to cover the edge coupler 111 of the Si-PIC 110 during the molding process. The optical module 2500 is similar to the optical module 2300 in FIGS. 23A-G, except the Si-PIC 110 has an edge coupler 111 rather than a vertical coupler. Thus, the packaging process is also similar, except the protective film for the edge coupler 111 is applied on the edge of the Si-PIC 110 rather than on the top.

Example Integrated Circuit Embodiments

Figure 26:
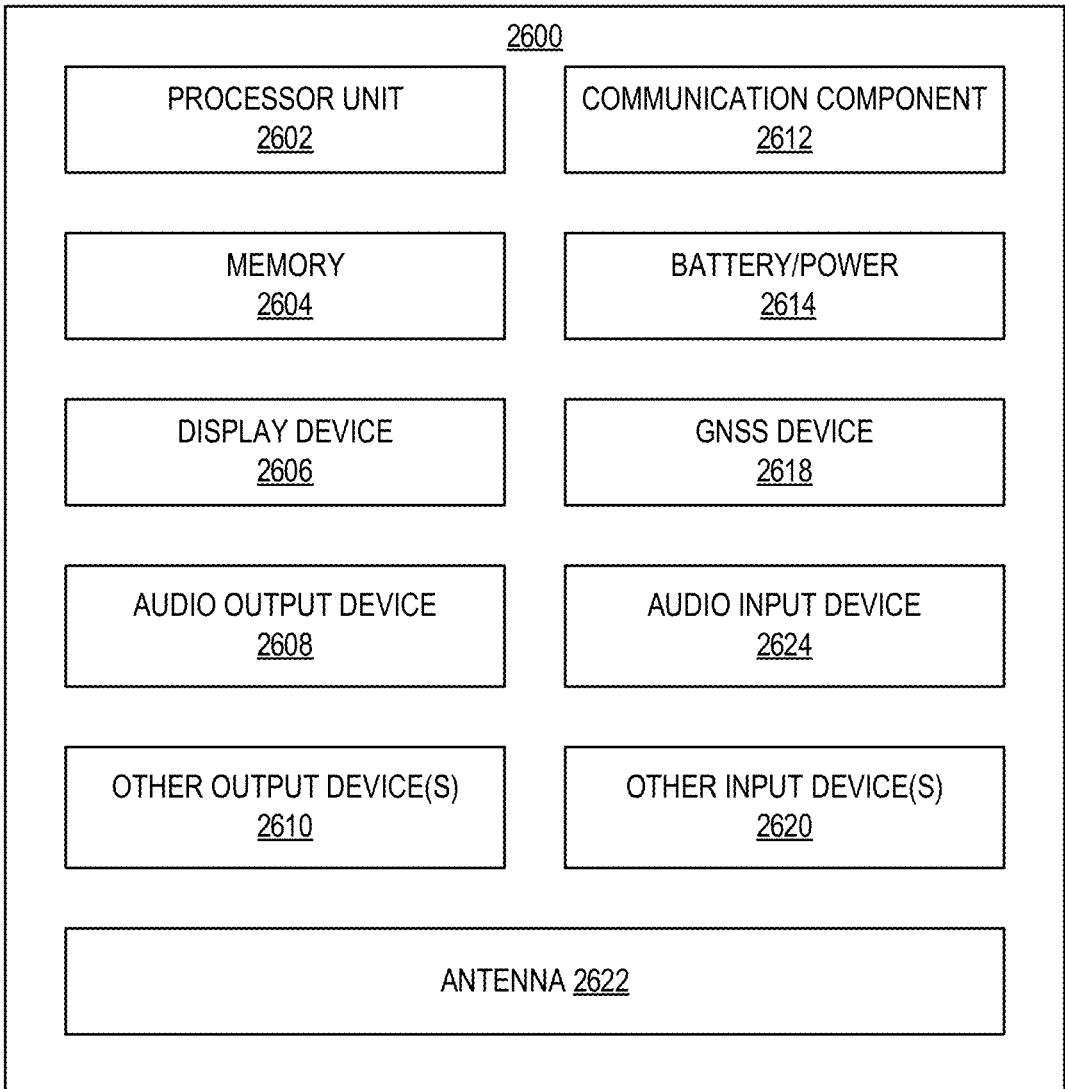
FIG. 26 illustrates a block diagram of an example electrical device that may include one or more embodiments of the disclosure.

FIG. 26 illustrates a block diagram of an example electrical device 2600, also referred to as a computing device, that may include one or more of the embodiments disclosed herein. For example, the electrical device 2600 and/or its respective components (e.g., communication components 2612, processor units 2602, memory 2604) may include an optical module or transceiver according to any of the embodiments described herein. In particular, one or more of the communication components 2612 may be or may include an optical module as disclosed herein. A number of components are illustrated in FIG. 26 as included in the electrical device 2600, but any one or more of these components may be omitted or duplicated, as suitable for the application. In some embodiments, some or all of the components included in the electrical device 2600 may be attached to one or more motherboards mainboards, or system boards. In some embodiments, one or more of these components are fabricated onto a single system-on-a-chip (SoC) die.

Additionally, in various embodiments, the electrical device 2600 may not include one or more of the components illustrated in FIG. 26, but the electrical device 2600 may include interface circuitry for coupling to the one or more components. For example, the electrical device 2600 may not include a display device 2606, but may include display device interface circuitry (e.g., a connector and driver circuitry) to which a display device 2606 may be coupled. In another set of examples, the electrical device 2600 may not include an audio input device 2624 or an audio output device 2608, but may include audio input or output device interface circuitry (e.g., connectors and supporting circuitry) to which an audio input device 2624 or audio output device 2608 may be coupled.

The electrical device 2600 may include one or more processor units 2602 (e.g., one or more processor units). As used herein, the terms "processor unit", "processing unit" or "processor" may refer to any device or portion of a device that processes electronic data from registers and/or memory to transform that electronic data into other electronic data that may be stored in registers and/or memory. The processor unit 2602 may include one or more digital signal processors (DSPs), application-specific integrated circuits (ASICs), central processing units (CPUs), graphics processing units (GPUs), general-purpose GPUs (GPGPUs), accelerated processing units (APUs), field-programmable gate arrays (FPGAs), neural network processing units (NPUs), data processor units (DPUs), accelerators (e.g., graphics accelerator, compression accelerator, artificial intelligence accelerator), controller cryptoprocessors (specialized processors that execute cryptographic algorithms within hardware), server processors, controllers, or any other suitable type of processor units. As such, the processor unit can be referred to as an XPU (or xPU).

The electrical device 2600 may include a memory 2604, which may itself include one or more memory devices such as volatile memory (e.g., dynamic random access memory (DRAM), static random-access memory (SRAM)), nonvolatile memory (e.g., read-only memory (ROM), flash memory, chalcogenide-based phase-change non-voltage memories), solid state memory, and/or a hard drive. In some embodiments, the memory 2604 may include memory that is located on the same integrated circuit die as the processor unit 2602. This memory may be used as cache memory (e.g., Level 1 (L1), Level 2 (L2), Level 3 (L3), Level 4 (L4), Last Level Cache (LLC)) and may include embedded dynamic random access memory (eDRAM) or spin transfer torque magnetic random access memory (STT-MRAM).

In some embodiments, the electrical device 2600 can comprise one or more processor units 2602 that are heterogeneous or asymmetric to another processor unit 2602 in the electrical device 2600. There can be a variety of differences between the processing units 2602 in a system in terms of a spectrum of metrics of merit including architectural, microarchitectural, thermal, power consumption characteristics, and the like. These differences can effectively manifest themselves as asymmetry and heterogeneity among the processor units 2602 in the electrical device 2600.

In some embodiments, the electrical device 2600 may include a communication component 2612 (e.g., one or more communication components). For example, the communication component 2612 can manage wireless communications for the transfer of data to and from the electrical device 2600. The term "wireless" and its derivatives may be used to describe circuits, devices, systems, methods, techniques, communications channels, etc., that may communicate data through the use of modulated electromagnetic radiation through a nonsolid medium. The term "wireless" does not imply that the associated devices do not contain any wires, although in some embodiments they might not.

The communication component 2612 may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long-Term Evolution (LTE) project along with any amendments, updates, and/or revisions (e.g., advanced LTE project, ultra mobile broadband (UMB) project (also referred to as "3GPP2"), etc.). IEEE 802.16 compatible Broadband Wireless Access (BWA) networks are generally referred to as WiMAX networks, an acronym that stands for Worldwide Interoperability for Microwave Access, which is a certification mark for products that pass conformity and interoperability tests for the IEEE 802.16 standards. The communication component 2612 may operate in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. The communication component 2612 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication component 2612 may operate in accordance with Code Division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. The communication component 2612 may operate in accordance with other wireless protocols in other embodiments. In some embodiments, the communication component 2612 may include a radio-frequency (RF) front-end circuit. The electrical device 2600 may include an antenna 2622 to facilitate wireless communications and/or to receive other wireless communications (such as AM or FM radio transmissions).

In some embodiments, the communication component 2612 may manage wired communications, such as electrical, optical, or any other suitable communication protocols (e.g., IEEE 802.3 Ethernet standards). As noted above, the communication component 2612 may include multiple communication components. For instance, a first communication component 2612 may be dedicated to shorter-range wireless communications such as Wi-Fi or Bluetooth, and a second communication component 2612 may be dedicated to longer-range wireless communications such as global positioning system (GPS), EDGE, GPRS, CDMA, WiMAX, LTE, EV-DO, or others. In some embodiments, a first communication component 2612 may be dedicated to wireless communications, and a second communication component 2612 may be dedicated to wired communications. In some embodiments, the communication component 2612 may include a network interface controller.

The electrical device 2600 may include battery/power circuitry 2614. The battery/power circuitry 2614 may include one or more energy storage devices (e.g., batteries or capacitors) and/or circuitry for coupling components of the electrical device 2600 to an energy source separate from the electrical device 2600 (e.g., AC line power).

The electrical device 2600 may include a display device 2606 (or corresponding interface circuitry, as discussed above). The display device 2606 may include one or more embedded or wired or wirelessly connected external visual indicators, such as a heads-up display, a computer monitor, a projector, a touchscreen display, a liquid crystal display (LCD), a light-emitting diode display, or a flat panel display.

The electrical device 2600 may include an audio output device 2608 (or corresponding interface circuitry, as discussed above). The audio output device 2608 may include any embedded or wired or wirelessly connected external device that generates an audible indicator, such speakers, headsets, or earbuds.

The electrical device 2600 may include an audio input device 2624 (or corresponding interface circuitry, as discussed above). The audio input device 2624 may include any embedded or wired or wirelessly connected device that generates a signal representative of a sound, such as microphones, microphone arrays, or digital instruments (e.g., instruments having a musical instrument digital interface (MIDI) output). The electrical device 2600 may include a Global Navigation Satellite System (GNSS) device 2618 (or corresponding interface circuitry, as discussed above), such as a Global Positioning System (GPS) device. The GNSS device 2618 may be in communication with a satellite-based system and may determine a geolocation of the electrical device 2600 based on information received from one or more GNSS satellites, as known in the art.

The electrical device 2600 may include other output device(s) 2610 (or corresponding interface circuitry, as discussed above). Examples of the other output device(s) 2610 may include an audio codec, a video codec, a printer, a wired or wireless transmitter for providing information to other devices, or an additional storage device.

The electrical device 2600 may include other input device(s) 2620 (or corresponding interface circuitry, as discussed above). Examples of the other input device(s) 2620 may include an accelerometer, a gyroscope, a compass, an image capture device (e.g., monoscopic or stereoscopic camera), a trackball, a trackpad, a touchpad, a keyboard, a cursor control device such as a mouse, a stylus, a touchscreen, proximity sensor, microphone, a bar code reader, a Quick Response (QR) code reader, electrocardiogram (ECG) sensor, PPG (photoplethysmogram) sensor, galvanic skin response sensor, any other sensor, or a radio frequency identification (RFID) reader.

The electrical device 2600 may have any desired form factor, such as a hand-held or mobile electrical device (e.g., a cell phone, a smart phone, a mobile internet device, a music player, a tablet computer, a laptop computer, a 2-in-1 convertible computer, a portable all-in-one computer, a netbook computer, an ultrabook computer, a personal digital assistant (PDA), an ultra mobile personal computer, a portable gaming console, etc.), a desktop electrical device, a server, a rack-level computing solution (e.g., blade, tray or sled computing systems), a workstation or other networked computing component, a printer, a scanner, a monitor, a set-top box, an entertainment control unit, a stationary gaming console, smart television, a vehicle control unit, a digital camera, a digital video recorder, a wearable electrical device or an embedded computing system (e.g., computing systems that are part of a vehicle, smart home appliance, consumer electronics product or equipment, manufacturing equipment). In some embodiments, the electrical device 2600 may be any other electronic device that processes data.

In some embodiments, the electrical device 2600 may comprise multiple discrete physical components. Given the range of devices that the electrical device 2600 can be manifested as in various embodiments, in some embodiments, the electrical device 2600 can be referred to as a computing device or a computing system.

Figure 27:
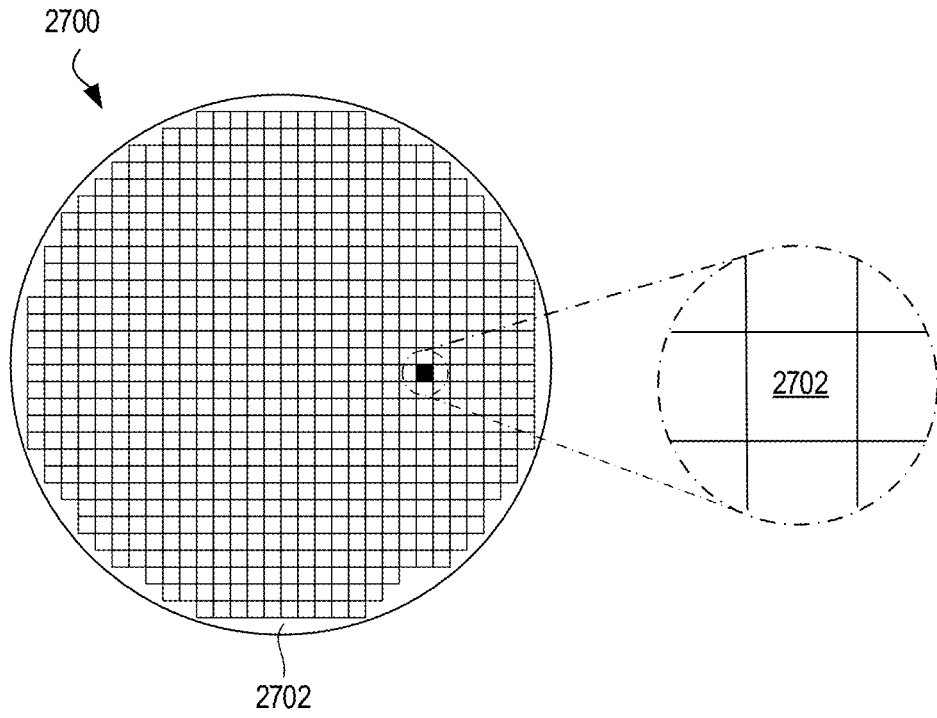
FIG. 27 is a top view of a wafer and dies that may be included in a microelectronic assembly, in accordance with any of the embodiments disclosed herein.

FIG. 27 is a top view of a wafer 2700 and dies 2702 that may be included in any of the embodiments disclosed herein. The wafer 2700 may be composed of semiconductor material and may include one or more dies 2702 having integrated circuit structures formed on a surface of the wafer 2700. The individual dies 2702 may be a repeating unit of an integrated circuit product that includes any suitable integrated circuit. After the fabrication of the semiconductor product is complete, the wafer 2700 may undergo a singulation process in which the dies 2702 are separated from one another to provide discrete "chips" of the integrated circuit product. The die 2702 may be any of the dies disclosed herein. The die 2702 may include one or more transistors, supporting circuitry to route electrical signals to the transistors, passive components (e.g., signal traces, resistors, capacitors, or inductors), and/or any other integrated circuit components. In some embodiments, the wafer 2700 or the die 2702 may include a memory device (e.g., a random access memory (RAM) device, such as a static RAM (SRAM) device, a magnetic RAM (MRAM) device, a resistive RAM (RRAM) device, a conductive-bridging RAM (CBRAM) device, etc.), a logic device (e.g., an AND, OR, NAND, or NOR gate), or any other suitable circuit element. Multiple ones of these devices may be combined on a single die 2702. For example, a memory array formed by multiple memory devices may be formed on a same die 2702 as a processor unit (e.g., the processor unit 2602 of FIG. 26) or other logic that is configured to store information in the memory devices or execute instructions stored in the memory array. Various ones of the microelectronic assemblies disclosed herein may be manufactured using a die-to-wafer assembly technique in which some dies are attached to a wafer 2700 that include others of the dies, and the wafer 2700 is subsequently singulated.

Figure 28:
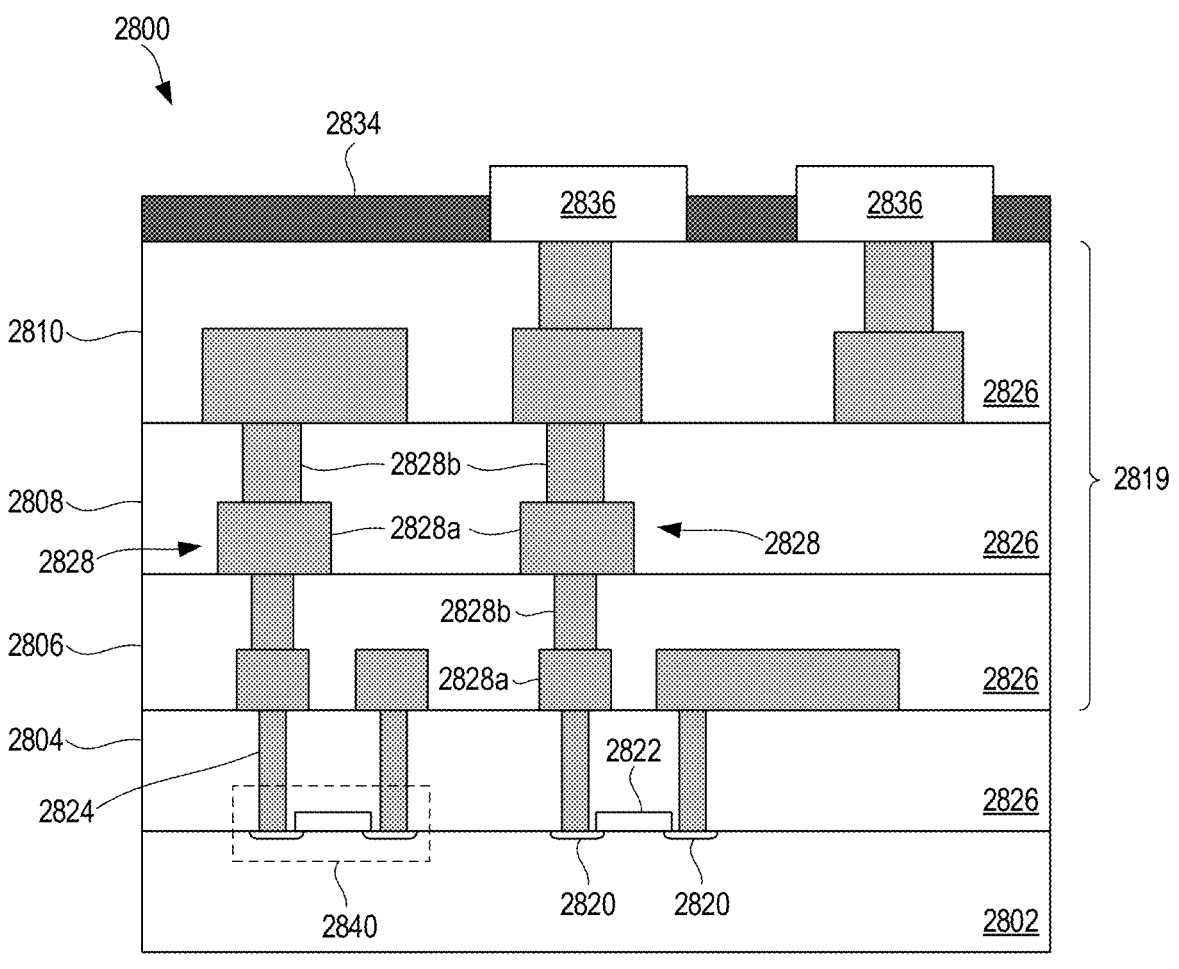
FIG. 28 is a cross-sectional side view of an integrated circuit device that may be included in a microelectronic assembly, in accordance with any of the embodiments disclosed herein.

FIG. 28 is a cross-sectional side view of an integrated circuit device 2800 that may be included in any of the embodiments disclosed herein (e.g., in any of the dies). One or more of the integrated circuit devices 2800 may be included in one or more dies 2702 (FIG. 27). The integrated circuit device 2800 may be formed on a die substrate 2802 (e.g., the wafer 2700 of FIG. 27) and may be included in a die (e.g., the die 2702 of FIG. 27). The die substrate 2802 may be a semiconductor substrate composed of semiconductor material systems including, for example, n-type or p-type materials systems (or a combination of both). The die substrate 2802 may include, for example, a crystalline substrate formed using a bulk silicon or a silicon-on-insulator (SOI) substructure. In some embodiments, the die substrate 2802 may be formed using alternative materials, which may or may not be combined with silicon, that include, but are not limited to, germanium, indium antimonide, lead telluride, indium arsenide, indium phosphide, gallium arsenide, or gallium antimonide. Further materials classified as group II-VI, III-V, or IV may also be used to form the die substrate 2802. Although a few examples of materials from which the die substrate 2802 may be formed are described here, any material that may serve as a foundation for an integrated circuit device 2800 may be used. The die substrate 2802 may be part of a singulated die (e.g., the dies 2702 of FIG. 27) or a wafer (e.g., the wafer 2700 of FIG. 27).

The integrated circuit device 2800 may include one or more device layers 2804 disposed on the die substrate 2802. The device layer 2804 may include features of one or more transistors 2840 (e.g., metal oxide semiconductor field-effect transistors (MOSFETs)) formed on the die substrate 2802. The transistors 2840 may include, for example, one or more source and/or drain (S/D) regions 2820, a gate 2822 to control current flow between the S/D regions 2820, and one or more S/D contacts 2824 to route electrical signals to/from the S/D regions 2820. The transistors 2840 may include additional features not depicted for the sake of clarity, such as device isolation regions, gate contacts, and the like. The transistors 2840 are not limited to the type and configuration depicted in FIG. 28 and may include a wide variety of other types and configurations such as, for example, planar transistors, non-planar transistors, or a combination of both. Non-planar transistors may include FinFET transistors, such as double-gate transistors or tri-gate transistors, and wrap-around or all-around gate transistors, such as nanoribbon, nanosheet, or nanowire transistors.

Returning to FIG. 28, a transistor 2840 may include a gate 2822 formed of at least two layers, a gate dielectric and a gate electrode. The gate dielectric may include one layer or a stack of layers. The one or more layers may include silicon oxide, silicon dioxide, silicon carbide, and/or a high-k dielectric material.

The high-k dielectric material may include elements such as hafnium, silicon, oxygen, titanium, tantalum, lanthanum, aluminum, zirconium, barium, strontium, yttrium, lead, scandium, niobium, and zinc. Examples of high-k materials that may be used in the gate dielectric include, but are not limited to, hafnium oxide, hafnium silicon oxide, lanthanum oxide, lanthanum aluminum oxide, zirconium oxide, zirconium silicon oxide, tantalum oxide, titanium oxide, barium strontium titanium oxide, barium titanium oxide, strontium titanium oxide, yttrium oxide, aluminum oxide, lead scandium tantalum oxide, and lead zinc niobate. In some embodiments, an annealing process may be carried out on the gate dielectric to improve its quality when a high-k material is used.

The gate electrode may be formed on the gate dielectric and may include at least one p-type work function metal or n-type work function metal, depending on whether the transistor 2840 is to be a p-type metal oxide semiconductor (PMOS) or an n-type metal oxide semiconductor (NMOS) transistor. In some implementations, the gate electrode may consist of a stack of two or more metal layers, where one or more metal layers are work function metal layers and at least one metal layer is a fill metal layer. Further metal layers may be included for other purposes, such as a barrier layer.

For a PMOS transistor, metals that may be used for the gate electrode include, but are not limited to, ruthenium, palladium, platinum, cobalt, nickel, conductive metal oxides (e.g., ruthenium oxide), and any of the metals discussed below with reference to an NMOS transistor (e.g., for work function tuning). For an NMOS transistor, metals that may be used for the gate electrode include, but are not limited to, hafnium, zirconium, titanium, tantalum, aluminum, alloys of these metals, carbides of these metals (e.g., hafnium carbide, zirconium carbide, titanium carbide, tantalum carbide, and aluminum carbide), and any of the metals discussed above with reference to a PMOS transistor (e.g., for work function tuning).

In some embodiments, when viewed as a cross-section of the transistor 2840 along the source-channel-drain direction, the gate electrode may consist of a U-shaped structure that includes a bottom portion substantially parallel to the surface of the die substrate 2802 and two sidewall portions that are substantially perpendicular to the top surface of the die substrate 2802. In other embodiments, at least one of the metal layers that form the gate electrode may simply be a planar layer that is substantially parallel to the top surface of the die substrate 2802 and does not include sidewall portions substantially perpendicular to the top surface of the die substrate 2802. In other embodiments, the gate electrode may consist of a combination of U-shaped structures and planar, non-U-shaped structures. For example, the gate electrode may consist of one or more U-shaped metal layers formed atop one or more planar, non-U-shaped layers.

In some embodiments, a pair of sidewall spacers may be formed on opposing sides of the gate stack to bracket the gate stack. The sidewall spacers may be formed from materials such as silicon nitride, silicon oxide, silicon carbide, silicon nitride doped with carbon, and silicon oxynitride. Processes for forming sidewall spacers are well known in the art and generally include deposition and etching process steps. In some embodiments, a plurality of spacer pairs may be used; for instance, two pairs, three pairs, or four pairs of sidewall spacers may be formed on opposing sides of the gate stack.

The S/D regions 2820 may be formed within the die substrate 2802 adjacent to the gate 2822 of individual transistors 2840. The S/D regions 2820 may be formed using an implantation/diffusion process or an etching/deposition process, for example. In the former process, dopants such as boron, aluminum, antimony, phosphorous, or arsenic may be ion-implanted into the die substrate 2802 to form the S/D regions 2820. An annealing process that activates the dopants and causes them to diffuse farther into the die substrate 2802 may follow the ion-implantation process. In the latter process, the die substrate 2802 may first be etched to form recesses at the locations of the S/D regions 2820. An epitaxial deposition process may then be carried out to fill the recesses with material that is used to fabricate the S/D regions 2820. In some implementations, the S/D regions 2820 may be fabricated using a silicon alloy such as silicon germanium or silicon carbide. In some embodiments, the epitaxially deposited silicon alloy may be doped in situ with dopants such as boron, arsenic, or phosphorous. In some embodiments, the S/D regions 2820 may be formed using one or more alternate semiconductor materials such as germanium or a group III-V material or alloy. In further embodiments, one or more layers of metal and/or metal alloys may be used to form the S/D regions 2820.

Electrical signals, such as power and/or input/output (I/O) signals, may be routed to and/or from the devices (e.g., transistors 2840) of the device layer 2804 through one or more interconnect layers disposed on the device layer 2804 (illustrated in FIG. 28 as interconnect layers 2806-2810). For example, electrically conductive features of the device layer 2804 (e.g., the gate 2822 and the S/D contacts 2824) may be electrically coupled with the interconnect structures 2828 of the interconnect layers 2806-2810. The one or more interconnect layers 2806-2810 may form a metallization stack (also referred to as an "ILD stack") 2819 of the integrated circuit device 2800.

The interconnect structures 2828 may be arranged within the interconnect layers 2806-2810 to route electrical signals according to a wide variety of designs; in particular, the arrangement is not limited to the particular configuration of interconnect structures 2828 depicted in FIG. 28. Although a particular number of interconnect layers 2806-2810 is depicted in FIG. 28, embodiments of the present disclosure include integrated circuit devices having more or fewer interconnect layers than depicted.

In some embodiments, the interconnect structures 2828 may include lines 2828a and/or vias 2828b filled with an electrically conductive material such as a metal. The lines 2828a may be arranged to route electrical signals in a direction of a plane that is substantially parallel with a surface of the die substrate 2802 upon which the device layer 2804 is formed. For example, the lines 2828a may route electrical signals in a direction in and out of the page and/or in a direction across the page from the perspective of FIG. 28. The vias 2828b may be arranged to route electrical signals in a direction of a plane that is substantially perpendicular to the surface of the die substrate 2802 upon which the device layer 2804 is formed. In some embodiments, the vias 2828b may electrically couple lines 2828a of different interconnect layers 2806-2810 together.

The interconnect layers 2806-2810 may include a dielectric material 2826 disposed between the interconnect structures 2828, as shown in FIG. 28. In some embodiments, dielectric material 2826 disposed between the interconnect structures 2828 in different ones of the interconnect layers 2806-2810 may have different compositions; in other embodiments, the composition of the dielectric material 2826 between different interconnect layers 2806-2810 may be the same. The device layer 2804 may include a dielectric material 2826 disposed between the transistors 2840 and a bottom layer of the metallization stack as well. The dielectric material 2826 included in the device layer 2804 may have a different composition than the dielectric material 2826 included in the interconnect layers 2806-2810; in other embodiments, the composition of the dielectric material 2826 in the device layer 2804 may be the same as a dielectric material 2826 included in any one of the interconnect layers 2806-2810.

A first interconnect layer 2806 (referred to as Metal 1 or "M1") may be formed directly on the device layer 2804. In some embodiments, the first interconnect layer 2806 may include lines 2828a and/or vias 2828b, as shown. The lines 2828a of the first interconnect layer 2806 may be coupled with contacts (e.g., the S/D contacts 2824) of the device layer 2804. The vias 2828b of the first interconnect layer 2806 may be coupled with the lines 2828a of a second interconnect layer 2808.

The second interconnect layer 2808 (referred to as Metal 2 or "M2") may be formed directly on the first interconnect layer 2806. In some embodiments, the second interconnect layer 2808 may include via 2828b to couple the lines 2828 of the second interconnect layer 2808 with the lines 2828a of a third interconnect layer 2810. Although the lines 2828a and the vias 2828b are structurally delineated with a line within individual interconnect layers for the sake of clarity, the lines 2828a and the vias 2828b may be structurally and/or materially contiguous (e.g., simultaneously filled during a dual-damascene process) in some embodiments.

The third interconnect layer 2810 (referred to as Metal 3 or "M3") (and additional interconnect layers, as desired) may be formed in succession on the second interconnect layer 2808 according to similar techniques and configurations described in connection with the second interconnect layer 2808 or the first interconnect layer 2806. In some embodiments, the interconnect layers that are "higher up" in the metallization stack 2819 in the integrated circuit device 2800 (i.e., farther away from the device layer 2804) may be thicker that the interconnect layers that are lower in the metallization stack 2819, with lines 2828*a* and vias 2828*b* in the higher interconnect layers being thicker than those in the lower interconnect layers.

The integrated circuit device 2800 may include a solder resist material 2834 (e.g., polyimide or similar material) and one or more conductive contacts 2836 formed on the interconnect layers 2806-2810. In FIG. 28, the conductive contacts 2836 are illustrated as taking the form of bond pads. The conductive contacts 2836 may be electrically coupled with the interconnect structures 2828 and configured to route the electrical signals of the transistor(s) 2840 to external devices. For example, solder bonds may be formed on the one or more conductive contacts 2836 to mechanically and/or electrically couple an integrated circuit die including the integrated circuit device 2800 with another component (e.g., a printed circuit board). The integrated circuit device 2800 may include additional or alternate structures to route the electrical signals from the interconnect layers 2806-2810; for example, the conductive contacts 2836 may include other analogous features (e.g., posts) that route the electrical signals to external components. The conductive contacts 2836 may serve as any of the conductive contacts described throughout this disclosure.

In some embodiments in which the integrated circuit device 2800 is a double-sided die, the integrated circuit device 2800 may include another metallization stack (not shown) on the opposite side of the device layer(s) 2804. This metallization stack may include multiple interconnect layers as discussed above with reference to the interconnect layers 2806-2810, to provide conductive pathways (e.g., including conductive lines and vias) between the device layer(s) 2804 and additional conductive contacts (not shown) on the opposite side of the integrated circuit device 2800 from the conductive contacts 2836. These additional conductive contacts may serve as any of the conductive contacts described throughout this disclosure.

In other embodiments in which the integrated circuit device 2800 is a double-sided die, the integrated circuit device 2800 may include one or more through silicon vias (TSVs) through the die substrate 2802; these TSVs may make contact with the device layer(s) 2804, and may provide conductive pathways between the device layer(s) 2804 and additional conductive contacts (not shown) on the opposite side of the integrated circuit device 2800 from the conductive contacts 2836. These additional conductive contacts may serve as any of the conductive contacts described throughout this disclosure. In some embodiments, TSVs extending through the substrate can be used for routing power and ground signals from conductive contacts on the opposite side of the integrated circuit device 2800 from the conductive contacts 2836 to the transistors 2840 and any other components integrated into the die 2800, and the metallization stack 2819 can be used to route I/O signals from the conductive contacts 2836 to transistors 2840 and any other components integrated into the die 2800.

Multiple integrated circuit devices 2800 may be stacked with one or more TSVs in the individual stacked devices providing connection between one of the devices to any of the other devices in the stack. For example, one or more high-bandwidth memory (HBM) integrated circuit dies can be stacked on top of a base integrated circuit die and TSVs in the HBM dies can provide connection between the individual HBM and the base integrated circuit die. Conductive contacts can provide additional connections between adjacent integrated circuit dies in the stack. In some embodiments, the conductive contacts can be fine-pitch solder bumps (microbumps).

Figure 29:
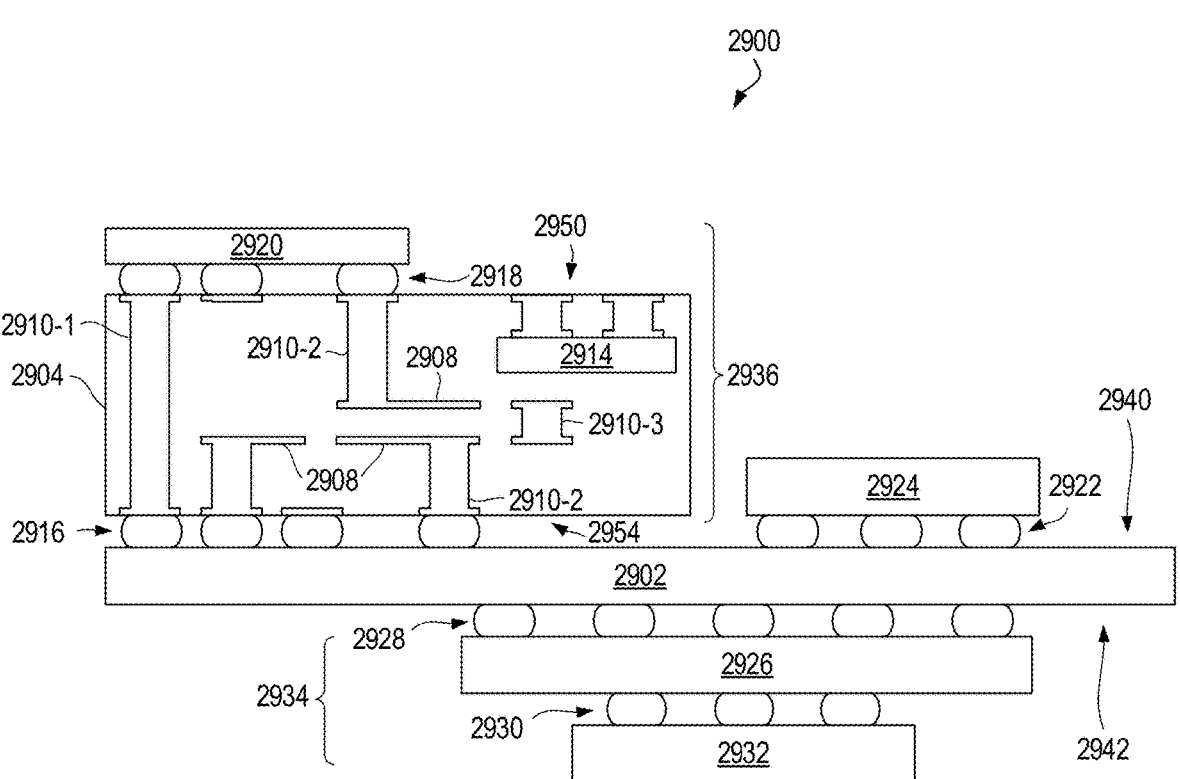
FIG. 29 is a cross-sectional side view of an integrated circuit device assembly that may include a microelectronic assembly, in accordance with any of the embodiments disclosed herein.

FIG. 29 is a cross-sectional side view of an integrated circuit device assembly 2900 that may include any of the embodiments disclosed herein. In some embodiments, the integrated circuit device assembly 2900 may be a microelectronic assembly. The integrated circuit device assembly 2900 includes a number of components disposed on a circuit board 2902 (which may be a motherboard, system board, mainboard, etc.). The integrated circuit device assembly 2900 includes components disposed on a first face 2940 of the circuit board 2902 and an opposing second face 2942 of the circuit board 2902; generally, components may be disposed on one or both faces 2940 and 2942. Any of the integrated circuit components discussed below with reference to the integrated circuit device assembly 2900 may take the form of any suitable ones of the embodiments of the microelectronic assemblies 100 disclosed herein.

In some embodiments, the circuit board 2902 may be a printed circuit board (PCB) including multiple metal (or interconnect) layers separated from one another by layers of dielectric material and interconnected by electrically conductive vias. The individual metal layers comprise conductive traces. Any one or more of the metal layers may be formed in a desired circuit pattern to route electrical signals (optionally in conjunction with other metal layers) between the components coupled to the circuit board 2902. In other embodiments, the circuit board 2902 may be a non-PCB substrate. The integrated circuit device assembly 2900 illustrated in FIG. 29 includes a package-on-interposer structure 2936 coupled to the first face 2940 of the circuit board 2902 by coupling components 2916. The coupling components 2916 may electrically and mechanically couple the package-on-interposer structure 2936 to the circuit board 2902, and may include solder balls (as shown in FIG. 29), pins (e.g., as part of a pin grid array (PGA), contacts (e.g., as part of a land grid array (LGA)), male and female portions of a socket, an adhesive, an underfill material, and/or any other suitable electrical and/or mechanical coupling structure. The coupling components 2916 may serve as the coupling components illustrated or described for any of the substrate assembly or substrate assembly components described herein, as appropriate.

The package-on-interposer structure 2936 may include an integrated circuit component 2920 coupled to an interposer 2904 by coupling components 2918. The coupling components 2918 may take any suitable form for the application, such as the forms discussed above with reference to the coupling components 2916. Although a single integrated circuit component 2920 is shown in FIG. 29, multiple integrated circuit components may be coupled to the interposer 2904; indeed, additional interposers may be coupled to the interposer 2904. The interposer 2904 may provide an intervening substrate used to bridge the circuit board 2902 and the integrated circuit component 2920.

The integrated circuit component 2920 may be a packaged or unpacked integrated circuit product that includes one or more integrated circuit dies (e.g., the die 2702 of FIG. 27, the integrated circuit device 2800 of FIG. 28) and/or one or more other suitable components. A packaged integrated circuit component comprises one or more integrated circuit dies mounted on a package substrate with the integrated circuit dies and package substrate encapsulated in a casing material, such as a metal, plastic, glass, or ceramic. In one example of an unpackaged integrated circuit component 2920, a single monolithic integrated circuit die comprises solder bumps attached to contacts on the die. The solder bumps allow the die to be directly attached to the interposer 2904. The integrated circuit component 2920 can comprise one or more computing system components, such as one or more processor units (e.g., system-on-a-chip (SoC), processor core, graphics processor unit (GPU), accelerator, chipset processor), I/O controller, memory, or network interface controller. In some embodiments, the integrated circuit component 2920 can comprise one or more additional active or passive devices such as capacitors, decoupling capacitors, resistors, inductors, fuses, diodes, transformers, sensors, electrostatic discharge (ESD) devices, and memory devices.

In embodiments where the integrated circuit component 2920 comprises multiple integrated circuit dies, they dies can be of the same type (a homogeneous multi-die integrated circuit component) or of two or more different types (a heterogeneous multi-die integrated circuit component). A multi-die integrated circuit component can be referred to as a multi-chip package (MCP) or multi-chip module (MCM).

In addition to comprising one or more processor units, the integrated circuit component 2920 can comprise additional components, such as embedded DRAM, stacked high bandwidth memory (HBM), shared cache memories, input/output (I/O) controllers, or memory controllers. Any of these additional components can be located on the same integrated circuit die as a processor unit, or on one or more integrated circuit dies separate from the integrated circuit dies comprising the processor units. These separate integrated circuit dies can be referred to as "chiplets". In embodiments where an integrated circuit component comprises multiple integrated circuit dies, interconnections between dies can be provided by the package substrate, one or more silicon interposers, one or more silicon bridges embedded in the package substrate (such as Intel® embedded multi-die interconnect bridges (EMIBs)), or combinations thereof.

Generally, the interposer 2904 may spread connections to a wider pitch or reroute a connection to a different connection. For example, the interposer 2904 may couple the integrated circuit component 2920 to a set of ball grid array (BGA) conductive contacts of the coupling components 2916 for coupling to the circuit board 2902. In the embodiment illustrated in FIG. 29, the integrated circuit component 2920 and the circuit board 2902 are attached to opposing sides of the interposer 2904; in other embodiments, the integrated circuit component 2920 and the circuit board 2902 may be attached to a same side of the interposer 2904. In some embodiments, three or more components may be interconnected by way of the interposer 2904.

In some embodiments, the interposer 2904 may be formed as a PCB, including multiple metal layers separated from one another by layers of dielectric material and interconnected by electrically conductive vias. In some embodiments, the interposer 2904 may be formed of an epoxy resin, a fiberglass-reinforced epoxy resin, an epoxy resin with inorganic fillers, a ceramic material, or a polymer material such as polyimide. In some embodiments, the interposer 2904 may be formed of alternate rigid or flexible materials that may include the same materials described above for use in a semiconductor substrate, such as silicon, germanium, and other group III-V and group IV materials. The interposer 2904 may include metal interconnects 2908 and vias 2910, including but not limited to through hole vias 2910-1 (that extend from a first face 2950 of the interposer 2904 to a second face 2954 of the interposer 2904), blind vias 2910-2 (that extend from the first or second faces 2950 or 2954 of the interposer 2904 to an internal metal layer), and buried vias 2910-3 (that connect internal metal layers).

In some embodiments, the interposer 2904 can comprise a silicon interposer. Through silicon vias (TSV) extending through the silicon interposer can connect connections on a first face of a silicon interposer to an opposing second face of the silicon interposer. In some embodiments, an interposer 2904 comprising a silicon interposer can further comprise one or more routing layers to route connections on a first face of the interposer 2904 to an opposing second face of the interposer 2904.

The interposer 2904 may further include embedded devices 2914, including both passive and active devices. Such devices may include, but are not limited to, capacitors, decoupling capacitors, resistors, inductors, fuses, diodes, transformers, sensors, electrostatic discharge (ESD) devices, and memory devices. More complex devices such as radio frequency devices, power amplifiers, power management devices, antennas, arrays, sensors, and microelectromechanical systems (MEMS) devices may also be formed on the interposer 2904. The package-on-interposer structure 2936 may take the form of any of the package-on-interposer structures known in the art. In embodiments where the interposer is a non-printed circuit board The integrated circuit device assembly 2900 may include an integrated circuit component 2924 coupled to the first face 2940 of the circuit board 2902 by coupling components 2922. The coupling components 2922 may take the form of any of the embodiments discussed above with reference to the coupling components 2916, and the integrated circuit component 2924 may take the form of any of the embodiments discussed above with reference to the integrated circuit component 2920.

The integrated circuit device assembly 2900 illustrated in FIG. 29 includes a package-on-package structure 2934 coupled to the second face 2942 of the circuit board 2902 by coupling components 2928. The package-on-package structure 2934 may include an integrated circuit component 2926 and an integrated circuit component 2932 coupled together by coupling components 2930 such that the integrated circuit component 2926 is disposed between the circuit board 2902 and the integrated circuit component 2932. The coupling components 2928 and 2930 may take the form of any of the embodiments of the coupling components 2916 discussed above, and the integrated circuit components 2926 and 2932 may take the form of any of the embodiments of the integrated circuit component 2920 discussed above. The package-on-package structure 2934 may be configured in accordance with any of the package-on-package structures known in the art.

Example Embodiments

Illustrative examples of the technologies described throughout this disclosure are provided below. Embodiments of these technologies may include any one or more, and any combination of, the examples described below. In some embodiments, at least one of the systems or components set forth in one or more of the preceding figures may be configured to perform one or more operations, techniques, processes, and/or methods as set forth in the following examples.

Example 1 includes an optical module, comprising: an electronic integrated circuit (EIC); a photonic integrated circuit (PIC) to send or receive optical signals; and a pluggable optical coupling connector (POCC) adjacent to the PIC, wherein the POCC comprises a pluggable interface to optically couple a fiber array to the PIC; wherein the EIC, the PIC, and the POCC are embedded in a mold.

Example 2 includes the optical module of Example 1, further comprising: a pluggable fiber array unit (PFAU), wherein the PFAU comprises the fiber array, and wherein the PFAU is configured to plug into the pluggable interface of the POCC to optically couple the fiber array to the PIC.

Example 3 includes the optical module of Example 2, wherein the POCC further comprises a collimation lens to collimate light that passes through the POCC.

Example 4 includes the optical module of any of Examples 2-3, wherein the PFAU further comprises a refocusing lens to refocus light that passes through the PFAU.

Example 5 includes the optical module of any of Examples 2-4, wherein: the PIC is face down in the mold, wherein the PIC is configured to emit light from a backside of the PIC; the POCC is aligned with the backside of the PIC; and the PFAU further comprises an angled mirror to orthogonally reflect light that passes through the PFAU; wherein, when the PFAU is plugged into the pluggable interface of the POCC, light emitted from the backside of the PIC is directed through the POCC, into the PFAU, and reflected orthogonally by the angled mirror in the PFAU into the fiber array.

Example 6 includes the optical module of Example 5, wherein the PIC further comprises a collimation lens to collimate light that passes through the backside of the PIC.

Example 7 includes the optical module of any of Examples 2-6, wherein the PFAU further comprises an optical isolator to restrict a direction in which light passes through the PFAU.

Example 8 includes the optical module of any of Examples 2-7, wherein: the POCC further comprises a first angled mirror to orthogonally reflect light that passes through the POCC; and the PFAU further comprises a second angled mirror to orthogonally reflect light that passes through the PFAU.

Example 9 includes the optical module of any of Examples 2-8, further comprising: a hybrid interposer embedded in the mold, wherein the hybrid interposer comprises: one or more electrical interconnections between the EIC and the PIC; and one or more optical interconnections between the PIC and the POCC.

Example 10 includes the optical module of Example 9, wherein: the hybrid interposer comprises a glass structure for the one or more optical interconnections; and the glass structure comprises one or more through-glass vias for the one or more electrical interconnections.

Example 11 includes the optical module of any of Examples 9-10, wherein the hybrid interposer further comprises a parabolic mirror to collimate light that passes between the PIC and the POCC through the hybrid interposer.

Example 12 includes the optical module of Example 11, wherein the POCC further comprises a refocusing lens to refocus light that passes between the hybrid interposer and the fiber array through the POCC.

Example 13 includes the optical module of any of Examples 9-12, wherein the hybrid interposer further comprises an angled mirror to orthogonally reflect light that passes between the PIC and the POCC through the hybrid interposer.

Example 14 includes the optical module of Example 13, wherein: the POCC further comprises a second angled mirror to orthogonally reflect light that passes between the hybrid interposer and the PFAU through the POCC; and the PFAU further comprises a third angled mirror to orthogonally reflect light that passes between the POCC and the fiber array through the PFAU.

Example 15 includes the optical module of any of Examples 1-14, wherein the mold comprises a dielectric material.

Example 16 includes a computing device, comprising: processing circuitry; memory circuitry; and communication circuitry, wherein the communication circuitry comprises an optical transceiver to send and receive optical transmissions, wherein the optical transceiver comprises: an electronic integrated circuit (EIC); a photonic integrated circuit (PIC); and a pluggable optical coupling connector (POCC) adjacent to the PIC, wherein the POCC comprises a pluggable interface to optically couple a fiber array to the PIC; wherein the EIC, the PIC, and the POCC are embedded in a mold.

Example 17 includes the computing device of Example 16, wherein the optical transceiver further comprises: a pluggable fiber array unit (PFAU), wherein the PFAU comprises the fiber array, and wherein the PFAU is configured to plug into the pluggable interface of the POCC to optically couple the fiber array to the PIC.

Example 18 includes the computing device of any of Examples 16-17, wherein the optical transceiver further comprises: a hybrid interposer embedded in the mold, wherein the hybrid interposer comprises: one or more electrical interconnections between the EIC and the PIC; and one or more optical interconnections between the PIC and the POCC.

Example 19 includes a method of packaging an optical module, comprising: forming interconnect structures on a wafer; bonding an electronic integrated circuit (EIC) and a photonic integrated circuit (PIC) face down on the wafer, wherein the EIC and the PIC are aligned with the interconnect structures; bonding a pluggable optical coupling connector (POCC) on a backside of the PIC, wherein the POCC comprises: a pluggable interface to optically couple a fiber array to the PIC; and a temporary cover lid to protect the pluggable interface from contamination; embedding the EIC, the PIC, and the POCC in a mold; grinding a top surface of the mold to remove the temporary cover lid of the POCC; releasing the wafer; forming a ball array below the optical module; and singulating the optical module.

Example 20 includes the method of Example 19, further comprising: plugging a pluggable fiber array unit (PFAU) into the POCC, wherein the PFAU comprises the fiber array, and wherein the PFAU is configured to plug into the pluggable interface of the POCC to optically couple the fiber array to the PIC.

In the foregoing description, various aspects of the illustrative implementations will be described using terms commonly employed by those skilled in the art to convey the substance of their work to others skilled in the art. However, it will be apparent to those skilled in the art that the present disclosure may be practiced with only some of the described aspects. For purposes of explanation, specific numbers, materials and configurations are set forth in order to provide a thorough understanding of the illustrative implementations. However, it will be apparent to one skilled in the art that the present disclosure may be practiced without the specific details. In other instances, well-known features are omitted or simplified in order not to obscure the illustrative implementations.

Various operations will be described as multiple discrete operations, in turn, in a manner that is most helpful in understanding the present disclosure. However, the order of description should not be construed to imply that these operations are necessarily order dependent. In particular, these operations may not be performed in the order of presentation.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The terms "over," "under," "between," "above," "on," and/or "near" as used herein may refer to a relative position of one material layer or component with respect to other layers or components. For example, one layer disposed over or under another layer may be directly in contact with the other layer or may have one or more intervening layers. Moreover, one layer disposed between two layers may be directly in contact with the two layers or may have one or more intervening layers. Similarly, a first layer "on" a second layer may be in direct or indirect contact with that second layer. Similarly, unless explicitly stated otherwise, one feature disposed between two features may be in direct contact with the adjacent features or may have one or more intervening features.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or more elements are in direct contact.

In various embodiments, the phrase "a first feature formed, deposited, or otherwise disposed on a second feature" may mean that the first feature is formed, deposited, or disposed over the second feature, and at least a part of the first feature may be in direct contact (e.g., direct physical and/or electrical contact) or indirect contact (e.g., having one or more other features between the first feature and the second feature) with at least a part of the second feature.

Where the disclosure recites "a" or "a first" element or the equivalent thereof, such disclosure includes one or more such elements, neither requiring nor excluding two or more such elements. Further, ordinal indicators (e.g., first, second, or third) for identified elements are used to distinguish between the elements, and do not indicate or imply a required or limited number of such elements, nor do they indicate a particular position or order of such elements unless otherwise specifically stated.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. As used herein, "computer-implemented method" may refer to any method executed by one or more processors, a computer system having one or more processors, a mobile device such as a smartphone (which may include one or more processors), a tablet, a laptop computer, a set-top box, a gaming console, and so forth.

The invention claimed is:

1. An optical module, comprising:
an electronic integrated circuit (EIC);
a photonic integrated circuit (PIC) to send or receive optical signals;
a pluggable optical coupling connector (POCC) adjacent to the PIC, wherein the POCC comprises a pluggable interface to optically couple a fiber array to the PIC; and
a hybrid interposer, wherein the hybrid interposer comprises:
one or more electrical interconnections between the EIC and the PIC; and
one or more optical interconnections between the PIC and the POCC;
wherein the EIC, the PIC, the POCC, and the hybrid interposer are embedded in a mold.

2. The optical module of claim 1, further comprising:
a pluggable fiber array unit (PFAU), wherein the PFAU comprises the fiber array, and wherein the PFAU is configured to plug into the pluggable interface of the POCC to optically couple the fiber array to the PIC.

3. The optical module of claim 2, wherein the POCC further comprises a collimation lens to collimate light that passes through the POCC.

4. The optical module of claim 2, wherein the PFAU further comprises a refocusing lens to refocus light that passes through the PFAU.

5. The optical module of claim 2, wherein:
the PIC is face down in the mold, wherein the PIC is configured to emit light from a backside of the PIC;
the POCC is aligned with the backside of the PIC; and
the PFAU further comprises an angled mirror to orthogonally reflect light that passes through the PFAU;
wherein, when the PFAU is plugged into the pluggable interface of the POCC, light emitted from the backside of the PIC is directed through the POCC, into the PFAU, and reflected orthogonally by the angled mirror in the PFAU into the fiber array.

6. The optical module of claim 5, wherein the PIC further comprises a collimation lens to collimate light that passes through the backside of the PIC.

7. The optical module of claim 2, wherein the PFAU further comprises an optical isolator to restrict a direction in which light passes through the PFAU.

8. The optical module of claim 2, wherein:
the POCC further comprises a first angled mirror to orthogonally reflect light that passes through the POCC; and
the PFAU further comprises a second angled mirror to orthogonally reflect light that passes through the PFAU.

9. The optical module of claim 1, wherein:
the hybrid interposer comprises a glass structure for the one or more optical interconnections; and
the glass structure comprises one or more through-glass vias for the one or more electrical interconnections.

10. The optical module of claim 1, wherein the hybrid interposer further comprises a parabolic mirror to collimate light that passes between the PIC and the POCC through the hybrid interposer.

11. The optical module of claim 10, wherein the POCC further comprises a refocusing lens to refocus light that passes between the hybrid interposer and the fiber array through the POCC.

12. The optical module of claim 1, wherein the hybrid interposer further comprises an angled mirror to orthogonally reflect light that passes between the PIC and the POCC through the hybrid interposer.

13. The optical module of claim 12, wherein:

the POCC further comprises a second angled mirror to orthogonally reflect light that passes between the hybrid interposer and the PFAU through the POCC; and the PFAU further comprises a third angled mirror to orthogonally reflect light that passes between the POCC and the fiber array through the PFAU.

14. The optical module of claim 1, wherein the mold comprises a dielectric material.

15. A computing device, comprising:

processing circuitry;

memory circuitry; and communication circuitry, wherein the communication circuitry comprises an optical transceiver to send and receive optical transmissions, wherein the optical transceiver comprises:

an electronic integrated circuit (EIC);

a photonic integrated circuit (PIC);

a pluggable optical coupling connector (POCC) adjacent to the PIC, wherein the POCC comprises a pluggable interface to optically couple a fiber array to the PIC; and a hybrid interposer, wherein the hybrid interposer comprises:

one or more electrical interconnections between the EIC and the PIC; and one or more optical interconnections between the PIC and the POCC;

wherein the EIC, the PIC, the POCC, and the hybrid interposer are embedded in a mold.

16. The computing device of claim 15, wherein the optical transceiver further comprises:

a pluggable fiber array unit (PFAU), wherein the PFAU comprises the fiber array, and wherein the PFAU is configured to plug into the pluggable interface of the POCC to optically couple the fiber array to the PIC.

17. A method of packaging an optical module, comprising:

forming interconnect structures on a wafer;

bonding a hybrid interposer on the wafer, wherein the hybrid interposer is aligned with the interconnect structures, and wherein the hybrid interposer comprises:

one or more electrical interconnections between the EIC and the PIC; and one or more optical interconnections between the PIC and the POCC;

bonding an electronic integrated circuit (EIC) and a photonic integrated circuit (PIC) face down on the hybrid interposer;

bonding a pluggable optical coupling connector (POCC) on a backside of the PIC, wherein the POCC comprises:

a pluggable interface to optically couple a fiber array to the PIC; and a temporary cover lid to protect the pluggable interface from contamination;

embedding the EIC, the PIC, the POCC, and the hybrid interposer in a mold;

grinding a top surface of the mold to remove the temporary cover lid of the POCC;

releasing the wafer;

forming a ball array below the optical module; and singulating the optical module.

18. The method of claim 17, further comprising:

plugging a pluggable fiber array unit (PFAU) into the POCC, wherein the PFAU comprises the fiber array, and wherein the PFAU is configured to plug into the pluggable interface of the POCC to optically couple the fiber array to the PIC.

* * * * *